United States Patent [19]
Ching

[11] Patent Number: 6,078,901
[45] Date of Patent: Jun. 20, 2000

[54] QUANTITATIVE SUPPLY AND DEMAND MODEL BASED ON INFINITE SPREADSHEET

[76] Inventor: Hugh Ching, P.O. Box 461, Berkeley, Calif. 94701

[21] Appl. No.: 08/834,741

[22] Filed: Apr. 3, 1997

Related U.S. Application Data

[60] Provisional application No. 60/015,025, Apr. 8, 1996.

[51] Int. Cl.[7] .................................................... G06F 17/60
[52] U.S. Cl. ................................................. 705/35; 705/36
[58] Field of Search .............................. 705/4, 8, 35, 36; 395/208, 236, 500; 273/240

[56] References Cited

U.S. PATENT DOCUMENTS

| | | | |
|---|---|---|---|
| 4,588,192 | 5/1986 | Laborde | 273/240 |
| 5,148,365 | 9/1992 | Dembo | 705/36 |
| 5,557,773 | 9/1996 | Wang et al. | 395/500 |
| 5,615,109 | 3/1997 | Eder | 705/8 |
| 5,761,442 | 6/1998 | Barr et al. | 705/36 |
| 5,799,287 | 8/1998 | Dembo | 705/36 |
| 5,812,988 | 9/1998 | Sandretto | 705/36 |

FOREIGN PATENT DOCUMENTS

| | | | |
|---|---|---|---|
| 0666534 | 8/1995 | United Kingdom | G06F 9/44 |

OTHER PUBLICATIONS

Bahrenburg et al., "Tokyo Market Strategy Review: Mar./Apr.—Topical Report", Mar. 17, 1993.
Chee, "Singapore Residential Property—Industry Report", Dec. 9, 1991.
Richter, "Hospital Management and Health Services—Industry Report", Nov. 15, 1990.
Fitzpatrick, "Market Banking on Temp Bunking", Crain's New York Business, Mar. 10, 1997, pp. 23.
Abrams, "Mortgage Debt Capital", Hotel & Motel Management, Nov. 18, 1996, pp. 54.
Durham, "Apartment Rents and the Bottom Line: Maximizing the Owner's Investment", Units, Jun. 1995, pp. 18.
"Seniors Housing Poised for Long–Term Role in the Nation's Care System", Units, Jul. 1994, pp. 45.
Peterson, "Putting Risk Managers on the Solvency Alert", Risk Management, Jun. 19912, pp. 26.
"Iraq Invasion Adds to Chemicals Woes", Chemical Marketing Reporter, Aug. 13, 1990, pp.

Primary Examiner—Eric W. Stamber
Assistant Examiner—M. Irshadullah

[57] ABSTRACT

Calculating devices for non-arbitrary price determination and rational decision making. The historical problem of value has been solved in this invention. The solution represents the first major breakthrough in social science. Value is defined as the sum total of all the future benefits and losses. An infinite spreadsheet establishes a deterministic relationship—described by an equal number of equations and unknowns—between the price and all the factors affecting the price in an expected time space extending from now to the infinite future. The infinite spreadsheet expands the current finite spreadsheet to infinity. It does not assume a resale price in the determination of the price. The current finite spreadsheet for planning and decision making should not be allowed because it hides material information, namely, the future beyond the finite time. The scientific method based on empirical verification is not always applicable in social science. In particular, the solution to price cannot be empirically verified because deterministic sets of data can never be collected when the infinite future, which will never arrive, is involved. In order to carry the calculation to infinity, the inputs are expressed as approximate time-invariant variables. Since the present price depends on the future price, the calculation is done in a time-reversed fashion. The law of supply and demand, or the general economic equilibrium analysis, emphasizes the spatial dependence of the price and has neglected the importance of the temporal consideration, which is investigated in detail in the infinite spreadsheet. A quantitative supply and demand model for multiple commodities with similar functionality and with a uniform price can be constructed by summing over the quantities whose various prices are determined individually by the infinite spreadsheet. In turn, the quantitative model can be used to obtain the inputs for the infinite spreadsheet, with which it forms a new quantitative foundation for economics and ushers in a new age of social science.

1 Claim, 29 Drawing Sheets

Knowledge

Pre-Science ( ? - 1500 )

Science ( 1500 - 2000 )

Post-Science ( 2000 - ? )

FIGURE 1

Physical, Social, and Life Sciences
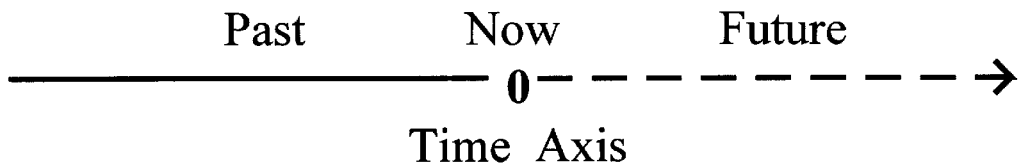
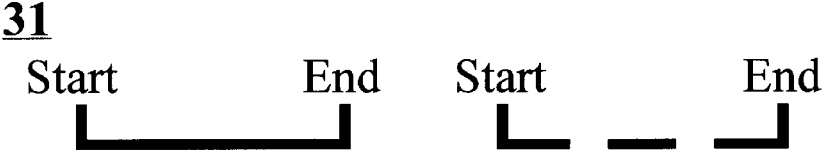
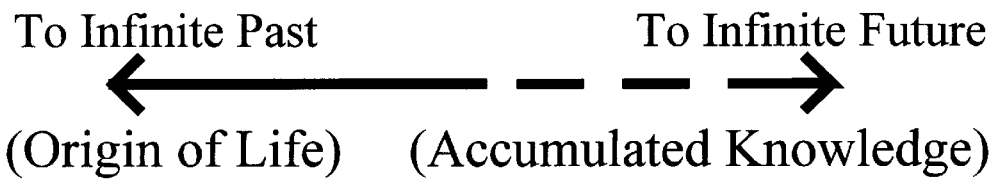
FIGURE 3

| Type of Investment | Expected Average Rate of Return | Investment Period |
| --- | --- | --- |
| Real return (without inflation) | 4% +/- 2% | 4 years |
| Nominal return in USA | 10% +/- 4% | 4 years |
| Long-term bonds; Single family houses; condos | 10% +/- 3% | 4 years |
| Prime commercial buildings; small apartments | 15% +/- 3% | 4 years |
| Large professionally managed apartments | 20% +/- 5% | 4 years |
| Large corporations | 25% +/- 10% | 4 years |
| National franchises | 35% +/- 5% | 4 years |
| Business opportunities (small businesses) | 40% +/- 10% | 4 years |
| Hotels and motels | 40% +/- 5% | 4 years |
| Commercialization of research projects | 100% +/- 50% | 4 years |
| Real estate developments | 100% +/- 50% | Duration of development |
| Basic research projects | 1000% +/- 100% | 4 years |
| Public funded projects (outside private sector) | less than 10% and greater than 1000% | 4 years |

(1) % Increase of net income = % of (Income-Vacancy-Expense)

(2) % Advanced rents and deposits as percentage of income (3) % Closing cost paid by buyer as percentage of price (4) % After tax %interest on cash flow = %Reinvestment rate (5) % Resale expenses to seller as percentage of price (6) % Buyer's tax bracket as percentage of buyer's income (7) % Cost recovery method as percentage of price (8) Recovery period (9) % Land value as percentage of price Tax Laws (10) - (11):

(10) % Capital gain as percentage of gain, proportional to price

(11) Some inputs here are not proportional to price (These are man-made laws contradicting requirements of laws of nature.)

(12) % Loan amount as percentage of price

(13) % Interest rate as percentage of loan amount

(14) Terms (number of years of the loan)

(15) %Loan points percentage of loan amount

(16) % Prepayment penalty as percentage of loan amount

(17) % Capitalization rate (net income/prices)

(18) % Appreciation of price (Resale prices)

(19) % Return on investment as percentage of down payment

(20) % Resale return on investment

(21) Investment period

(22) Resale investment period

FIGURE 12

| INPUTS | | | | | |
|---|---|---|---|---|---|
| 0. Comments:(Address, Date, etc.) | Address: | | | | |
| 1. End of Year (Year) | 0 (1996) | 1 (1997) | 2 (1998) | 3 (1999) | 4 (2000) |
| 2. Annual Gross Income | | 100,000 | 100,000 | 100,000 | 100,000 |
| 3. Annual Operating Expenses | | 0 | 0 | 0 | 0 |
| 4. Annual %Operating Expenses(Vacancy) | | 0.00% | 0.00% | 0.00% | 0.00% |
| 6. % Increaseof Net Income | | 0.00% | 0.00% | 0.00% | 0.00% |
| 8. Advanced Rents & Deposits (%Income) | | 8.33% | 8.33% | 8.33% | 8.33% |
| 9. Closing Cost to Buyer | 1% | 1% | 1% | 1% | 1% |
| 10. Interest on CashFlow(AfterTax%Reinvt.) | 7% | 7% | 7% | 7% | 7% |
| 11. Resale Expenses(Comm., termite, etc.) | 6% | 6% | 6% | 6% | 6% |
| 12. Buyer's % Tax Bracket | 28% | 28% | 28% | 28% | 28% |
| 13. Depreciation Method | 100% | 100% | 100% | 100% | 100% |
| 14. Resale Depreciation Method | 100% | 100% | 100% | 100% | 100% |
| 15. Depreciation Life of Real Property | 31.5 | 31.5 | 31.5 | 31.5 | 31.5 |
| 16. Land Value(Nondepreciable) as %Price | 25.00% | 25.00% | 25.00% | 25.00% | 25.00% |
| 17. Personal Property Value as % of Price | 0% | 0% | 0% | 0% | 0% |
| 18. Depreciation Life of Personal Property | 4 | 4 | 4 | 4 | 4 |
| 19. Tax laws: Capital Gain | 100% | 100% | 100% | 100% | 100% |
| 20. Maximum Deduction | 25,000 | 25,000 | 25,000 | 25,000 | 25,000 |
| 21. Adjusted Gross Income (AGI) | 0 | 0 | 0 | 0 | 0 |
| 22. Phase Out Threshold of AGI | 100k-150k | 100k-150k | 100k-150k | 100k-150k | 100k-150k |
| 23. Passive Losses From Other Sources | 0 | 0 | 0 | 0 | 0 |
| 24. First Year: Loan Amount(in %, $, Ratio) | 50% | 50% | 50% | 50% | 50% |
| 25. Interest rate | 14% | 14% | 14% | 14% | 14% |
| 26. Term of the Loan (Years) | 15 | 15 | 15 | 15 | 15 |
| 27. Monthly Payment per $100,000 | 1,166.67 | 1,166.67 | 1,166.67 | 1,166.67 | 1,166.67 |
| 28. Loan Points as % of Loan Amount | 3 | 3 | 3 | 3 | 3 |
| 29. First Investment ( Holding) Period | 4 | 4 | 4 | 4 | 4 |
| 30. Second and Later Investment Periods | 4 | 4 | 4 | 4 | 4 |
| 31. % Average Resale Expected Return | 15% | 15% | 15% | 15% | 15% |
| 32. %Average Annual Return on Investment | | | | | 15.00% |
| | | | | | |
| 1. End of Year (Year) | 5 (2001) | 6 (2002) | 7 (2003) | 8 (2004) | 9 (2005) |
| 2. Annual Gross Income | 100,000 | 150,000 | 150,000 | 150,000 | 150,000 |
| 3. Annual Operating Expenses | | 0 | 0 | 0 | 0 |
| 4. Annual %Operating Expenses(Vacancy) | | 0.00% | 0.00% | 0.00% | 0.00% |
| 6. % Increaseof Net Income | | 0.00% | 0.00% | 0.00% | 0.00% |
| 1. End of Year (Year) | 10 (2006) | 11 (2007) | 12 (2008) | 13 (2009) | 14 (2010) |
| 2. Annual Gross Income | 150,000 | 225,000 | 225,000 | 225,000 | 225,000 |
| 3. Annual Operating Expenses | | 0 | 0 | 0 | 0 |
| 4. Annual %Operating Expenses(Vacancy) | | 0.00% | 0.00% | 0.00% | 0.00% |
| 6. % Increaseof Net Income | | 0.00% | 0.00% | 0.00% | 0.00% |
| 1. End of Year (Year) | 15 (2011) | 16 (2012) | 17 (2013) | 18 (2014) | 19 (2015) |
| 2. Annual Gross Income | 225,000 | 337,500 | 337,500 | 337,500 | 337,500 |
| 3. Annual Operating Expenses | | 0 | 0 | 0 | 0 |
| 4. Annual %Operating Expenses(Vacancy) | | 0.00% | 0.00% | 0.00% | 0.00% |
| 6. % Increaseof Net Income | | 0.00% | 0.00% | 0.00% | 0.00% |
| 6.Future % Increaseof Net Income | End of yr 20 = 50%; End of yr 21 = -10%; Future = 4% | | | | |

FIGURE 15

| OUTPUTS | | | | | |
|---|---|---|---|---|---|
| 0. Comments:(Address, Date, etc.) | Address: | | | | |
| 1. End of Year (Year) | 0 (1996) | 1 (1997) | 2 (1998) | 3 (1999) | 4 (2000) |
| 2. Annual Gross Income | | 100,000 | 100,000 | 100,000 | 100,000 |
| 3. Annual Operating Expenses | | 0 | 0 | 0 | 0 |
| 4. Annual %Operating Expenses(Vacancy) | | 0.00% | 0.00% | 0.00% | 0.00% |
| 5. Net Income | | 100,000 | 100,000 | 100,000 | 100,000 |
| 6. % Increaseof Net Income | | 0.00% | 0.00% | 0.00% | 0.00% |
| 7. Total Loan | 796,155 | 792,748 | 788,966 | 784,767 | 780,108 |
| 8. Total Loan Payment | | 90,984 | 90,984 | 90,984 | 90,984 |
| 9. Interest Payment | | 87,577 | 87,202 | 86,789 | 86,324 |
| 10. Principal Payment | | 3,407 | 3,782 | 4,198 | 4,660 |
| 11. Before Tax Cash Flow | | 9,016 | 9,016 | 9,016 | 9,016 |
| 12. Depreciation Allowance | | 25,612 | 25,612 | 25,612 | 25,612 |
| 13. Accumulated Depreciation | | 25,612 | 51,224 | 76,835 | 102,447 |
| 14. After Tax Cash Flow | | 13,173 | 13,068 | 12,951 | 12,822 |
| 15. Accumulated After Tax Cash Flow | | 13,173 | 27,163 | 42,015 | 57,779 |
| 16. Price $$$$$$$$$$$$$$$$$$$$$$$$$$ | 1,061,540 | 1,128,479 | 1,207,758 | 1,299,783 | 1,405,593 |
| 17. %Rate Increase of Price(Appreciation) | | 6.31% | 7.03% | 7.62% | 8.14% |
| 18. Gross Multiplier (Gross Income/Price) | 10.62 | 11.28 | 12.08 | 13 | 14.06 |
| 19. Capitalization Rate (Net Income/Price) | 9.24% | 8.86% | 8.28% | 7.69% | 7.11% |
| 20. Resale Expenses | | 67,709 | 72,465 | 77,987 | 84,336 |
| 21. Gain Tax | | 3,984 | 32,021 | 63,413 | 98,434 |
| 22. Cash from Resale | 283,593 | 260,019 | 310,137 | 369,298 | 438,259 |
| 23. % Return on Cash from Resale | | -367.00% | 24.30% | 23.25% | 22.14% |
| 24. %Average Annual Return on Investment | | -367.00% | 9.06% | 13.19% | 15.00% |

FIGURE 16

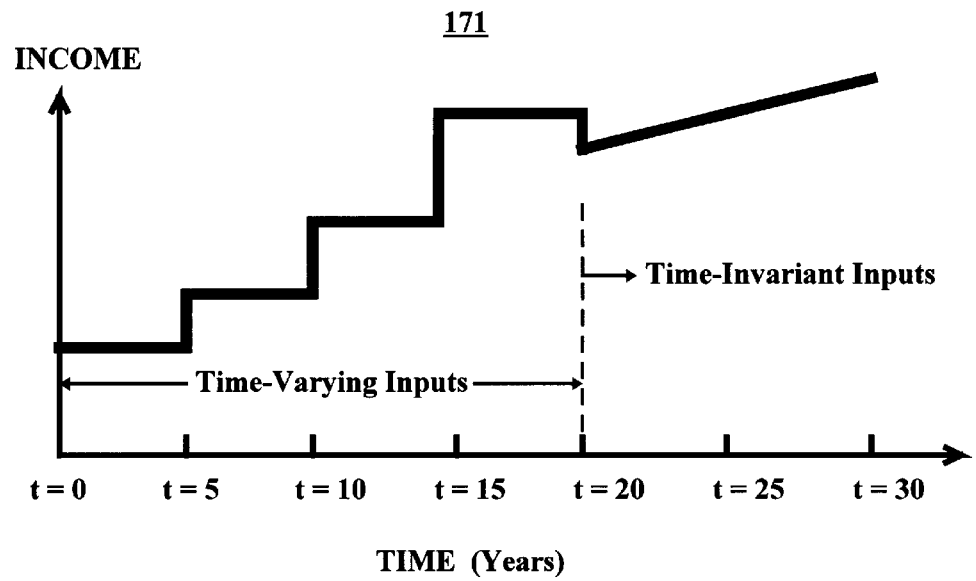
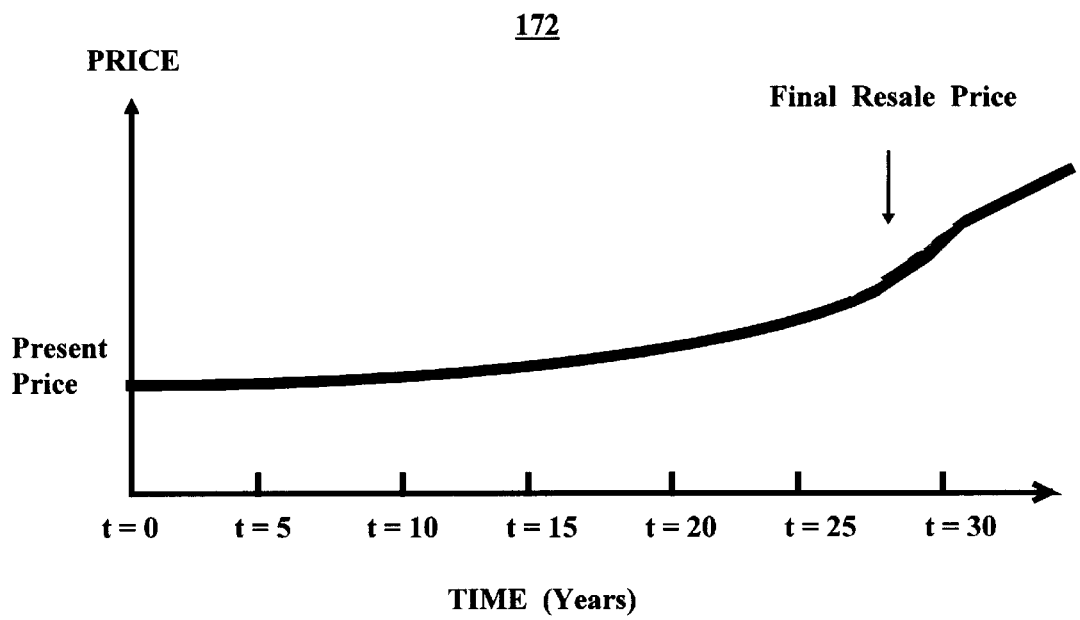
FIGURE 17

| Time-Invariant Inputs | | | | | |
|---|---|---|---|---|---|
| INPUTS | | | | | |
| 0. Comments:(Address, Date, etc.) | | | | | |
| 1. End of Year (Year) | 1996 | | | | |
| 2. Annual Gross Income | 100,000 | | | | |
| 3. Annual Operating Expenses | 0 | | | | |
| 4. Annual %Operating Expenses(Vacancy) | 0% | | | | |
| 6. % Increaseof Net Income | 0% | | | | |
| 8. Advanced Rents & Deposits (%Income) | 8.33% | | | | |
| 9. Closing Cost to Buyer | 1% | | | | |
| 10. Interest on CashFlow(AfterTax%Reinvt.) | 7% | | | | |
| 11. Resale Expenses(Comm., termite, etc.) | 6% | | | | |
| 12. Buyer's % Tax Bracket | 28% | | | | |
| 13. Depreciation Method | 100% | | | | |
| 14. Resale Depreciation Method | 100% | | | | |
| 15. Depreciation Life of Real Property | 31.5 | | | | |
| 16. Land Value(Nondepreciable) as %Price | 25.00% | | | | |
| 17. Personal Property Value as % of Price | 0% | | | | |
| 18. Depreciation Life of Personal Property | 4 | | | | |
| 19. Tax laws: Capital Gain | 100% | | | | |
| 20. Maximum Deduction | 25,000 | | | | |
| 21. Adjusted Gross Income (AGI) | 0 | | | | |
| 22. Phase Out Threshold of AGI | 100k-150k | | | | |
| 23. Passive Losses From Other Sources | 0 | | | | |
| 24. First Year: Loan Amount(in %, $, Ratio) | 50% | | | | |
| 25. Interest rate | 14% | | | | |
| 26. Term of the Loan (Years) | 15 | | | | |
| 27. Monthly Payment per $100,000 | 1,166.67 | | | | |
| 28. Loan Points as % of Loan Amount | 3 | | | | |
| 29. First Investment ( Holding) Period | 4 | | | | |
| 30. Second and Later Investment Periods | 4 | | | | |
| 31. % Average Resale Expected Return | 15% | | | | |
| 32. %Average Annual Return on Investment | 15% | | | | |
| | | | | | |
| OUTPUTS | | | | | |
| 0. Comments:(Address, Date, etc.) | Address: | | | | |
| 1. End of Year (Year) | 0 (1996) | 1 (1997) | 2 (1998) | 3 (1999) | 4 (2000) |
| 2. After Tax Cash Flow | | 16,167 | 20,627 | 25,350 | 30,351 |
| 3. Price $$$$$$$$$$$$$$$$$$$$$$$$$$$$ | 1,024,218 | | | | |

FIGURE 18

MARKET COMPARABLES

---

191

CitTSt.#StreetnameUnitPriceRatio%E%N%RMultAge%Int.MDDYTelephone SRec

Explanation of Items:
Cit = City (3 characters)
T = Type (A=Apartment; C=Commercial; B=Business opportunity; K=Sale and Lease Back; L=Land; M=Motel and Hotel; H=House; R=Research project; etc.)
St.# = Street number
Unit = Number of units or square feet x 1000
Price = Asking or selling price
Ratio = Appraised price/Asking price
%E = Expenses + Vacancy as % of Gross Income
%N = Average % increase of net income or rent
%R = Average % investment return
Mult = Gross multiplier (Price/Gross income)
Age = Age of building
%Int. = % Interst rate
MDDY= Month (N=November; D=December); Day (two digits); Year (last digit)
S = Status (F=For sale; T=Trade; S=Sold; O=Owner carry; U=Unknown; etc)
Rec = Record number

---

192

CitTSt#Street nameUnitPriceRatio%E%N%RMultAge%Int.MDDYTelephone SRec
SFRC2453 Industrial 50 1000000 1.00 0  6 15 10.2 0   11.0   0006   5486483 K 1
SFRL2453 Industrial100 262500 1.00 0   100     0   12.0   0006   5486483 K 2
BERA1204 Elm St.  30 1400000 0.95 40 6 20  7.5 25  8.5    N204   6557582 F 3
BERC547 Oak St.   20 1200000 0.89 50 6 15  8.5 10  8.75   1075   8435189 F 4
OAKH801 Franklin   1  105000 0.95 30 6 10  9.0 15  8.0    2025   8364501 T 5
BERA2612 Hillegass 10  650000 0.90 38 6 15  8.2 35  9.0    3155   8435189 F 6

Total number of listings = 6

Determination Of Land Price

Introduction: The price of a piece of land depends on how the land will be developed. This program calculates the land price immediately before development (the price of the land for the present can be calculated when the future land price is known). During development, parts of the land price and of the construction cost are financed, and thus only their down payment (including all the cash outlay) is counted as the initial investment.

$P = Appraised price of developed property
$C = Construction cost (including all hard and soft cost, not the land)
%D1 = % Down payment on land (part of initial investment)
%D2 = % Down payment on construction cost (part of initial investment)
$H = Additional initial cash investment (part of initial investment)
%R = % Investment return on initial investment
$L = Land price From the definition: Cash Return = $Initial Investment x (1 + %R) = $Total Profit $$\%R = \frac{\$Total\ Profit}{\$Initial\ Investment} - 1 = \frac{\$P - \$C - \$L}{\%D1 \times \$L + \%D2 \times \$C + \$H} - 1$$

$$\$L = \frac{\$P - \$C - \%D2 \times \$C - \$H - \%R \times \%D2 \times \$C - \%R \times \$H}{1 + \%D1 + \%R \times \%D1}$$

*****************************************************************

RESULTS:
$P = $1,000,000
$C = $400,000
%D1 = 30 % of land price
%D2 = 10 % of construction cost
$H = %50,000
%R = 100 % over the development period
$Land price = $262,500
%Land price = 39.62 % of (land + cost of construction)
           = 26.25 % of price of the developed property
%R1 = % Ration of profit to liabilities $$\%R1 = \frac{\$Total\ Profit}{\$Total\ Liabilities} = \frac{\$P - \$C - \$L}{\$C + \$L} = 50.94\ \%$$

FIGURE 21

SOFTWARE VALUATION

231 DEMAND CURVE

Demand Factors: (1) Population, (2) Income, and (3) Education, etc.

From Manual to Computerization

Income = Hours of work saved per year x $ per hour.

Examples of time saved typically are:
- Spreadsheet: 90% time saved over manual process
- Mathematics, Engineering, and Science: 95% time saved
- Word processor: 50% time saved
- Accounting Data Management: 30% time saved.

The contributions to the initial and the future expenses are:
- Initial hardware cost
- Learning Curve
- Maintenance
- Obsolescence.

From Old to New Versions of Software

The benefits and the expenses are:

Income = Speed increases in hours/year x $ per hour
- Reduction of learning curve
- Reduction of maintenance expenses
- Reduction of Obsolescence.

Expenses contributions are from:
- Additional hardware cost
- Additional learning Curve
- Additional maintenance
- Additional obsolescence.

232 SUPPLY CURVE

Supply Factors:
- Quantities of commodities
- Economy of scale
- Software Metrics
- Technology
- Efficiency in manufacturing
- Cost of raw materials
- Transportation
- Labor cost
- Marketing cost
- Packaging
- Documentation

FIGURE 23

QUANTITATIVE SUPPLY AND DEMAND MODEL BASED ON INFINITE SPREADSHEET

This application claims the benefit of U.S. provisional Application Ser. No. 60/015,025 filed Apr. 8, 1996, entitled Quantitative Supply and Demand Model Based on Infinitive Spreadsheet.

BACKGROUND OF THE INVENTION

1. Field of the Invention

This invention relates to computing devices for price determination. The economic law of supply and demand has been quantified in this invention. In particular, this invention deals with a deterministic infinite spreadsheet for calculating the price of a single commodity and a quantitative supply demand model for determining the price of multiple commodities of similar functionality. Also, it deals with the related computing devices and computer software for price and value determination and for rational decision making based on valuation. In a deterministic method, the number of equations equals the number of unknowns, and the deterministic solution is generally non-arbitrary. The quantitative supply and demand model quantifies the qualitative supply and demand model, or the general economic equilibrium analysis, which currently constitutes the foundation of microeconomics.

2. Background of the Invention

Price is still an unsolved problem. It is a problem that has puzzled experts and laymen alike for over five thousand years, or for as long as history can recall. In spite of claims of breakthroughs by past thinkers and modern social scientists, all the current solutions to the problem of price determination cannot produce any deterministic, or non-arbitrary, price in practice. This invention is not just the first correct solution to price determination, but possibly the only usable deterministic method for price determination.

In practice, the solution to price determination in this invention involves a deterministic infinite spreadsheet and a quantitative supply and demand model. Because reality is infinite, the current finite spreadsheet is actually a misrepresentation of reality. A typical example of finite spreadsheet is a good four years economic plan which ignores a possible economic downturn in the fifth year. The infinite spreadsheet is for determining the price of a single commodity and is used to derive the quantitative supply and demand model, which determines the price of multiple commodities which have uniform functionality and, because of competition, necessarily one uniform price.

There is a mutually dependent relationship between the infinite spreadsheet and the quantitative supply and demand model. Conceptually, most of the inputs of the infinite spreadsheet, such as the rent, the interest, etc., are prices themselves. But, these prices are mostly determined through the quantitative supply and demand model. Being averaged quantities, the market determined prices by supply and demand are generally more stable than the price determined by the infinite spreadsheet. Thus, they are suitable as inputs in the infinite spreadsheet.

The accuracy of the inputs and the outputs in price determination needs only to be within a reasonable range. In general, it has been found that while physical science is precise, social science needs only to be quantitative; as long as the values of social and economic factors are expressed in terms of numbers, which do not need to be as precise as those for physical science, reasonable inputs will produce reasonable outputs. The quantitative supply and demand model quantifies the current supply and demand model which is only qualitative.

One of the most important concepts introduced in this invention involves the distinction between empirically verifiable solutions and empirically non-verifiable solutions. Solutions of deterministic systems in physical science involving finite time intervals are examples of verifiable solutions. In fact, physical science deals primarily with verifiable solutions. Price, on the other hand, is an empirically non-verifiable solution. The price in this invention is determined from the relatively time-invariant economic factors affecting the price. When a variable is relatively time-invariant, it is approximately empirically verifiable during the time interval in which it is approximately invariant. In practice, the time-variant price needs to be constantly calculated with changing economic conditions.

A decision, like the price, is also the final resultant after considering all the consequences of the decision. Accordingly, decisions are empirically non-verifiable. Thus, price determination and decision making with their empirically non-verifiable and time-variant nature mark a major departure from our familiar concepts in physical science and signal a distinct extension in the scope of human knowledge.

Identifying the differences between physical science and social science provides an introduction to the background of this invention. The introduction leads logically to a refutation of nearly all the current claims of correct or practical solutions to price; in terms of the progress of human knowledge, the solution to price determination is beyond the current scientific method and outside the understanding of the present social science.

The failure to carry the success achieved in physical science into social science must rank among the major disappointments of the twentieth century. In fact, the rigorous standard of physical science has contributed to the rejection of most solutions in social science. On the other hand, because it is not concerned with value determination, physical science by itself cannot produce definitive value increases, by which social progress should be measured.

This invention shows that the social scientific problem of price determination is not within the domain of problems solvable by the scientific method; the problem is beyond physical science, and is in the field of post-scientific knowledge, or post-science. Post-science deals with the infinite reality with complexity orders of magnitude greater than that of physical science. It tries to solve realistic problems in their entirety rather than to obtain partial solutions in the controlled finite environment as in physical science. Physical science is based mostly on rigorous scientific analysis. All the human faculties, which include perception and imagination, in addition to the analytic ability, are needed in solving the complex problems in post-science. Formulating the problem of price, for example, requires a great deal of perceptive ability.

Reality is conceptually infinite in time and space. Examples of entities, which involve infinite time, are knowledge, materials, real estates, decisions, of which price is an important representative, corporations, everything that affects corporations or businesses, DNA of the living organism, and everything that affects living organisms, particularly human beings. It appears that upon close observation, most things are infinite in nature, and, thus, they are within the domain of post-science. Post-scientific life science even tries to design permanent information systems, such as DNA and non-obsolescent software systems, which in turn can create things which will last forever. A reference for permanent software can be found in a patent of this author entitled "Completely Automated And Self-generating Software System" U.S. Pat. No. 5,485,601.

Empirical verification is the bulwark of physical science, but is possible only when a deterministic event, described by an equal number of equations and unknowns, occurs within a finite time interval; scientific predictions rely on the possibility of fitting deterministic future phenomena onto deterministic past phenomena. Physical science deals primarily with properties of matter, which can generally be studied within finite time.

Value, the foundation of social science, can be defined as the sum total of all the future benefits and losses in a semi-infinite time space. Deterministic sets of data can never be collected in value determination when the infinite future, which will never arrive, is involved. Therefore, empirical verification, or predictions based solely on past data, is generally not possible in social science. The influence of the scientific method with its reliance on empirical verifications based on past data is partly responsible for our inability to solve post-scientific problems. In post-science, acceptance of solutions must rely as much on logic and mathematical and scientific rigor as on empirical verification. Because post-scientific solutions are not always empirically verifiable, the training in physical science and demonstration of the ability in solving scientific problems should become a prerequisite for working in post-science.

In physical science, when a problem starts and terminates within a finite time interval, the past data can give a precise account of the entire problem. In social science involving infinity in time, a problem must be defined in a combined past and future space, because the infinite future never arrives and, thus, can never be a part of the past. Accordingly, physical science will provide not only an important starting point in the progress of reliable knowledge for prediction but also a reference point for post-science, to which appropriately it lends a part of its name.

Post-science deals with solutions beyond physical science; it involves social and life sciences, particularly, the determination of value and the study of life. According to post-science, nature, and nature alone, imposes unbreakable laws in physical and social sciences. The discovery of a first significant law of nature in social science, namely the solution to value and price, should immediately call to question the validity of all the man-made laws, customs, and traditions, and the entire legal system based on man-made laws. The solution to price, value, or decision making implies that in our current society no one knows how to make rational decisions. The solution to price is, therefore, a proof that our society is still not rational.

In practice, we should not make laws but should discover laws of nature, which are the only laws needed to be obeyed and could be far more stringent than any man-made laws. Nature also specifies that the essence of life, represented by DNA, is the ability to last forever. This condition of permanence imposed by nature on the creation of life, and also on the design of computer software, should be one of the most important of all design criteria, for a permanent creation should be infinitely more, or less, valuable than one with temporary life. It is necessary not only to know from post-scientific social science how to determine value, but also to know from post-scientific life science how to develop the correct sense of value, in particular about DNA of the living organism, a permanent software which possess the ability to improve itself based on an evolutionary design and for which all the other values exist.

In conclusion, from the point of view of post-science, most of the pre-scientific and scientific knowledge are either incorrect or irrelevant, and current human civilization with only five thousand years of recorded history is still at an early stage of knowledge development. which should be expected to last for at least a few more millions or billions of years. Generally speaking, pre-science deals with relevant problems with incorrect solutions, and science deals with correct solutions to problems which are relatively irrelevant. Post-science will start to deal with correct solutions to relevant problems. It will provide an understanding of human progress from an overall historical perspective and presents a view of our knowledge as a coherent whole. It will show that knowledge advances from relatively simple physical science to more complex social science, of which physical science is a part, and finally to life science, in which complexity seems to be unlimited and where domain covers both physical and social sciences. In terms of value, post-science foretells a future far more rational and pleasant than the present non-rational human condition, which is but a reflection of the state of the current knowledge.

Price determination is a historical problem. To prove that this invention is the first correct solution to the problem of price determination, it would be necessary to discredit all the existing theories and methods of price determination. All the current methods of price determination will be refuted summarily by categorizing them into six groups, each of which is then dismissed by pointing out one of more general defects of each of the groups in reference to the correct solution. Thus, before criticizing other methods, a brief description of the method of the present invention is necessary so that it can be used as a reference.

Because price determination is one of the most relevant problems, it would be extremely desirable to present the problem in a simple enough fashion so that it can be understood by all. A great deal of effort has been spent in finding a simple introduction which will appeal to the general audience. After extensive deliberation and testing, a novel concept called "infinite spreadsheet" is picked to introduce the problem in this invention. As its name implies, the infinite spreadsheet in merely the current finite spreadsheet spread to infinity. The infinite spreadsheet also has the advantage of bypassing most mathematical concepts.

The infinite spreadsheet is simply a manual or computerized spreadsheet which is extended to infinity in time. It is formed by piecing together an infinite number of finite spreadsheets, which are not overlapping due to their distinct time periods. It attempts to relate the price to the expected cash flows, the expected average rates of return, and all the resale prices in a numerically consistent fashion. It is merely an accounting of the expected future cash flows with the intention of determining the price based on the expected rate of return. Thus, the problem of price determination is the problem of filling in the values of the price and all the resale prices in the infinite spreadsheet in such a way that they are numerically consistent with the given expected cash flows and the given expected rate of returns. The quantitative supply and demand in this invention is based on the price determined by the infinite spreadsheet, which calculates just the price of one commodity. The quantitative supply and demand model sums up the calculations for each and every buyer or manufacturer or group of buyers or manufacturers of commodities with uniform functionality or utility to form respectively the demand and the supply. It then derives deterministically from the intersection of the supply and the demand curves the uniform price for all the commodities.

In this invention, the problem of price is derived from the fundamental problem of value. Since decisions are made based on value judgment, this invention could provide the basis for rational decision making. As a solution to value, it could also be the foundation of social science. Value is defined in this invention as the sum total of all the expected future benefits and losses. Value is the total return, which is the sum of the monetary and the non-monetary returns. The total rate of return can be expected to be roughly constant because the market treats all investments equally. Thus, as a measure of such seemingly non-quantifiable entities as risk, happiness, pride of ownership, etc., non-monetary rate, represented by the difference between the total and the monetary rates of return, can be quantified in this solution to value.

This invention deals primarily with the monetary rate of return, which can be easily calculated from the cash amount of the monetary return. Briefly, the monetary return is derived from the realistic accounting of the expected cash flows and any expected cash from resale of the entity being priced. The cash flows depend on all the factors affecting the price, such as income, expenses, vacancy, rent increases, taxes, transaction costs, finance, etc. This formulation establishes a deterministic relationship between the price and all the factors affecting the price in an expected time space extending from now to the infinite future.

Defining the problem of price determination as the problem of filling up the infinite spreadsheet has the advantage of easily identifying the unknown variables. In the calculation for the monetary return, the unknown variables to be determined are the price and the resale price, which is the future price after a given investment period. To be logically consistent, the same procedure for calculating the price should be applied to the resale price, the resale price of the resale price, and, in fact, all the future resale prices to infinity. Thus, the problem of price determination as described by the infinite spreadsheet has been reduced down to the problem of determining all the resale prices, from which the present price can be readily calculated.

There is a practical problem, which has been often raised and should be resolved in this invention, relating to the inputs of the infinite spreadsheet. Almost all decisions are made based on some future expectations. While it is true that the calculated price will only be as accurate as the accuracy of the expectations of cash flows and resale expenses, it would be only logical to obtain the most reliable expectations, if any expected value is to be used. Reasonable inputs should result in reasonable outputs, provided that the system for relating the inputs to the outputs is rigorously derived. Furthermore, a correct method of price determination will play a crucial role in providing the incentive for making expectations accurate.

Price depends on the future returns. In particular, the present price depends on the future resale prices. Therefore, the logical procedure in the determination of the price is to start from the infinite future and to calculate the succeeding resale prices backward in a time-reversed fashion. The time-reversed procedure of calculating the price is a novelty of this invention and is useful only when there is a first resale price to start the calculation. The determination of this first resale price depends on how the variables in the infinite spreadsheet are defined. Solving for this first resale price, in particular, requires that the expectations can be expressed in a semi-infinite time space.

Taking the future expectations to infinity can be done by borrowing one of the most central concepts in physical science. Physical science and, particularly, the method of empirical verification work because they deal mainly with time-invariant variables. Time-invariant variables are quantities that do not change with time, such as the gravitational constant, the speed of light in vacuum, the Planck's constant, etc. The concept of time-invariant variables can be modified for its application in social science, in general, and price determination, in particular. Only approximate and equivalent time-invariant variables can be identified in social science. Still, it is desirable to define variables in social science in such a way that they are as time-invariant as possible. Expressing the variables in the infinite spreadsheet as approximate time-invariant variables is a necessity because of the involvement of infinity and is one of the novelties of this invention.

The method for creating approximate time-invariant variables in this invention is to express the inputs as dimensionless terms, such as a percentage of price or income. Pegging an input to the price directly, or indirectly through the income or the loan amount, usually helps stabilize the input. In the infinite spreadsheet, all the inputs, except for an initial finite time interval, have to be expressed as equivalent time-invariant variables. One main advantage of approximate time-invariant variables is that they can be easily replaced by equivalent time-invariant variables, which are used to calculate the first future resale price in the infinite spreadsheet.

The price is one of the most famous time variants because of its central economic role, which prevents it from being easily pegged to another term, except itself, in terms of price appreciation. Expressing future resale prices in terms of price appreciation converts the resale prices to dimensionless terms, or approximate time-invariant variable. As hard and as controversial as it is to accept, almost all social decisions are time-variant variables for the same reasons as those for the price. Thus, without a correct solution to value, our decisions and also our societies are irrational. The general application of the concept of time-invariant variables should be further widened because the concept can be used to resolve the historical dilemma of why pre-scientific social science cannot, as physical science can, be used to predict the future precisely. The overwhelming significance of the concept can be demonstrated by a general explanation of the role of our past experiences in predicting future events.

There are two types of experiences. One type can be used to predict the future, and the other type cannot be used to predict the future. Physical science provides us with examples of the type of experiences that can be used to predict the future. Prices, which according to this invention cannot be determined based fully on past experiences, belong to the other type. The main reason that physical science can predict the future is that it deals with experiences which occur and terminate within finite time intervals and, therefore, can be transported from the past to the future in their entirety. Prices, generally involving infinite future, cannot be transported in their entirety because the infinite future never arrives. The only types of experiences, which should be used to predict the future, are those involving time-invariant variables of both physical and social sciences, because they do not change with time. The prediction of the time-invariant price must involve an analytic relationship in an expectation space, such as the infinite spreadsheet.

Unlike physical science, social science generally does not have exact constants of nature or true time-invariant variables. There are many social and economic factors which are suspected to be approximate time-invariant variables of social science. One of the most important approximate time-invariant variables in economics could be the speed of circulation of money, which in USA historically varies from 2 to 3. The most important one concerning, the deterministic solution to price could be the expected average rate of return on investment, which can be empirically surveyed when actual sales prices are known. In calculating the rate of return, the past and future expected data, instead of just the past actual data, except the actual sales price, should be used. Empirical investigations in social science is a very subtle problem because it always tends to involve the infinite expectation space. There is little chance of making the results exact; social science is at best quantitative in nature. In particular, time-invariant variables of social science are approximate, but still useful.

Thus, time-invariant variables, though not exact, can be empirically studied in social science. And, only potential time-invariant variables should be studied empirically. For instance, most time series analyses of prices will not produce useful results because price is a time variant, even after being made dimensionless using its own rate of appreciation. One important reason that the inputs should be expressed as approximate time-invariant variables is that they can then be empirically surveyed to see if they are qualified to be considered time-invariant variables of social science. The deterministic method is necessary for empirical studies in social science because it is needed to identify the factors to be used as its inputs and to provide the analytic relationships among all the factors.

The strategy of price determination in this invention involves two stages. First, the procedure for the deterministic calculation of the price of one single commodity or service is described. The first stage contains most of the novelties and, therefore, is the major part of this invention. It provides the basis for a quantitative derivation of the second stage, which is a deterministic solution of the price for multiple commodities based on the supply and demand model, which occupies the central position in current economics.

In its first stage, the deterministic solution to price deals mainly with a single-commodity price system and is based on the following realistic expected condition. Expecting a certain averaged rate of return on investment after a certain investment period, a buyer 1 purchases a certain commodity or service. Said buyer 1 also expects that if the commodity or service is sold to a buyer 2 at the end of the first investment period, said buyer 2 can expect to receive a certain rate of investment return. Similarly, the buyer 1 expects that a buyer 3 will buy from the buyer 2, and a buyer n will buy from a buyer n−1 for certain rates of return on investment. Either this process of expectation continues to infinity or the commodity or service is totally used up somewhere along the process, in which case considering the process to infinity is no longer necessary.

The deterministic solution to price can derive deterministically and quantitatively the supply and demand model. The model is obtained by summing over the quantities relating to the deterministic prices, which are provided by the deterministic method. The deterministic solution to price, with some key approximate time-invariant variables of economics and the quantitative supply and demand model, forms the foundation for post-scientific economics.

Physically the deterministic method of price determination demands that the problem of value be solved in its entirety, for what is beneficial here and now may not be beneficial everywhere and in the future, and what is good for one person may not necessarily be good for the society as a whole. To be included in the problem are the considerations of infinity not only in time, but also in space. In the formulation of the deterministic method, the spatial factors enter the derivation through microeconomics terms, such as population, tax laws, interest rates, etc., which involve the influences of the whole economy and need consideration to infinity in space. For example, people will borrow money at the lowest interest rate regardless of where it is offered, tax laws are based on the condition of the economy as a whole, and the demand for quantities of products depends on population.

The deterministic method has been used to value numerous goods and services and to check against actual investment markets. At first, it might be suspected that the past data and the markets would not yield sufficient information or information accurate enough to produce useful results. It turns out that for many investment markets, especially those requiring a multiple-commodity price model to describe, inputs obtained under budget constraints were insufficient or not stable enough to provide reliable results; it would require a very large amount of resources for collecting, updating and analyzing the data.

However, there is and will be one important exception. This exception is the real estate market. Even with very limited resources, reasonable inputs could be obtained for all the needed variables of the real estate market. Reasonable inputs are here defined as those which will be accepted by both the buyer and the seller, the two opposing parties in a transaction. In fact, the real estate market provided more inputs than is requested by the deterministic method and, thus, would cause serious contradictions in the infinite spreadsheet.

The real estate market represents a mature and stable industry. It is ready to provide all the information needed by the deterministic method for analyses. When the information is inputted into and checked by the deterministic method, it is generally found to be mathematically inconsistent. For example, the price does not match the expected rate of investment return. The market is generally irrational.

To further demonstrate this important market constraint, the following simple case is used as an illustration. The equation $x+y=z$ with three variables, instead of the minimum of about 50 variables for the real estate market, is used for this example. What the market is saying, in essence, is that $x=2$, $y=3$, and $z=7$ (which should be $z=2+3=5$), while the law of mathematics dictates that the third variable, namely z, should be determined from the equation after the first two variables have been assumed. Similarly, the deterministic method specifies that the market or the investor can assume all but the last variable. A market which decides all the inputs without knowing the relationship of the inputs is irrational according to the deterministic solution to price. The Savings and Loan (S&L) crisis of the 1980s and the 1990s verifies this conclusion empirically; in this crisis, the final outcome of the investment, the actual (disastrous and unexpected) investment return, is determined by the market after the market participant, unaware of the constraint of the deterministic solution to price, has overvalued the market price.

The deterministic method of price determination can be used to make price predictions when all but the price and all the resale prices are known. The possibility of predicting social and economic phenomena implies the existence of laws of nature in social science, which constrains our behavior, as our current ability to predict physical phenomena implies the existence of absolute laws in physical science, which constrain the motion of material objects.

There are countless ways to look at the implications of the deterministic solution to price. From the point of view of the progress of knowledge, the problem can be considered an extension of the concept of the laws of nature in physical science. However, it is a post-scientific law of nature because its predictions might not always be empirically verified as those in physical science.

The deterministic solution to price is an unbreakable law of nature in post-scientific social science because its derivation is based on mathematics and rigorous problem formulation, not solely on empirical verification. The deterministic solution to price defines the extent of our free will, that is, that we may choose freely values for all but that of the final variable. Time and space provide a great deal of flexibility to our behavior. On the other hand, without the constraint provided by the condition at infinity, our behavior, in theory, is arbitrary.

In practice, the deterministic method only requires that the inputs be reasonable, since the reasonable inputs should result in reasonable outputs. However, the outputs should be recalculated every time where there is a change in the inputs, reflecting a change in expectations. Social, economic, and financial disasters can be avoided when the calculated outputs staying within a tolerable range defined by the flexibility of the economy.

In physical science, all the laws of nature are discovered and not made by people. The laws of nature have to be satisfied regardless of whether they have been discovered or not. The social and economic disasters of the past and the future could be traced to the violations of the laws of nature. Just as modern machines are designed based on laws in physical science, rational societies must be based on laws which are derived from the laws of nature in social science.

Furthermore, man-made laws which are not based on laws of nature might come into conflict with the corresponding laws of nature. In particular, to avoid our past economic mistakes, our economy should be kept free from unnecessary regulations or arbitrary planning, that which are not based on laws of nature. Conversely, any social system which does not violate laws of nature should be tolerated. History has provided ample evidences of the ill-effects of overly regulated political and economic systems; the S&L crisis, though significant, is pale in comparison to the collapse of the centralized planned economies.

Then, how should a society reconcile the laws of nature with the existing laws that are man-made? Can laws in social science be used to predict social changes, as laws in physical science are used to predict motions of material objects? First of all, it should be noted that the number of man-made laws in physical science is exactly zero. The deterministic solution to price could be the first time a major law of nature in social science is discovered. The current social scientists and policy makers, having never seen nor used a law of nature in social science, tend to believe that social science deals with ideologies or ideas, not laws of nature or solutions based on laws of nature, and that only guess gasworks, not predictions, of social and economic trends are possible. This popular belief not only points out the main difference between current physical science and social science but also confirms the uniqueness of this invention. The experience gained from the market testing of the deterministic method shows that based on mathematics, the method is nearly infallible and the market, on the other hand, composed of irrational participants is generally incorrect, as borne out by the S&L, the banking, and the junk bond crises of the 1980s.

In the late 1980s and the early 1990s, the monetary authorities in the United States of America are faced with a banking crisis caused by massive loan defaults. According to the government, the crisis was unpredictable and thus non-preventable. If the government is right, future economic disasters will also be unavoidable. The deterministic solution to price predicted the real estate slump of the 1980s and should be able to predict and prevent future economic and financial disasters. In the following, a detailed account of the real estate market of the 1980s will be provided, and the method of prevention will be described.

As the inflation of the 1970s subsided and the expectation of rent and housing prices increases remained high in the early 1980s, the real estate market changed from under-priced to over-priced. The problem with the market price is that it may not respond correctly to economic changes. A market price comparison appraisal gives the market price before the price has fully responded to the economic changes. The determination of price and, in general, decision making should be based on future financial expectations not past market data.

The market comparison approach by overvaluing real estate prices is one of the major causes of the S&L (Savings and Loan) crisis. However, the current mortgage default crisis brought about by the over-valuation represents but a symptom of a much more deeply rooted economic problem which was exposed only when the S&Ls were deregulated in the early 1980s.

The fundamental cause of the S&L crisis involves the banking deregulation policies which permit S&Ls to use deposits, which S&Ls can get from depositors at very low interest rates (around 4 to 8%), to invest in high-risk business ventures with high-return rates (40 to 100%). Since the deposits are insured by the U.S. government, S&Ls can get large amounts of funds at the relatively low interest rates. The government has upset the market equilibrium by insuring the deposits at insurance rates too low to justify the risk under the free market conditions created by irrational market participants.

The situation is aggravated in many regions of the country by economic downturns which cause the market comparison approach to overvalue the real estate market. In this regard, it is only fair to add that had the economy been stable or improved, S&Ls might become the heroes of the business community, instead of the villains as they are now being portrayed.

In addition, the unethical conduct and practices of the S&L managers contributed significantly to the severity of the S&L crisis under the absence of a correct method of valuation. The deregulation and, more importantly, the government's guarantee of the deposits provide the managers the legalized right and opportunity to risk depositors' money. When a risk-taking S&L gets caught in a bad economic situation, it may turn to even more risky or high-return, not excluding unethical, ventures to recapture its losses, especially when its losses have reached such a point that the S&L feels that it has little to lose and everything to gain financially by taking the risks.

Furthermore, if the deregulation-induced fraudulent practices by S&L officials occur in the later stages of a S&L failure, they should be understood to be caused by rather than the cause of the S&L failure, particularly if considered from the point of view that the frauds are the result of business owners' trying to save themselves from their desperate predicaments. Over-emphasizing fraud as the main cause of the S&L, crisis is distracting attention from the basic cause, which is a lack of the correct knowledge about the market. It should be emphasized here that, as a general principle, real social progresses can only be made through advancements in knowledge.

If the stability of the U.S. banking system is too important to be left in the hands of the "unstable" free market, the only alternative would be to predict the insurance rates of the free market. The insurance rate should be proportional to the risk which is reflected in the rate of return on investment. Risk is a negative % non-monetary return which must be made up by the % monetary return in order to satisfy the constant % total return (roughly 10% for USA) of the economy. To determine the rate of return on investment, the calculation, as in the case of price determination, must involve the consideration, in general, of a future extended to infinity. The deterministic method is needed to determine the rate of investment return by inputting the selling price to determine the return.

In conclusion, the interest rate should include in it the insurance rate increase, which reflects the risk. The rate of return may also be raised in order to justify the investment risk. For example, the interest rate for small business loans could be, and should be, much higher than the current going rates (around 6 to 16%) without seriously affecting the businesses because the rate of investment return for small businesses is around 40%. Also, for real estate development projects the rate of investment return is around 50 to 100%. A reasonable insurance rate increase should be added to the current interest rate to protect the government and ultimately the public in case of default.

An investment opportunity or a loophole is created by the government when the insurance rate is not proportional to the rate of return, for both quantities reflect the risk of the investment. The loophole cannot be eliminated without a method for the determination of the rate of return. From the California rent control court cases, which tries to determine the justified rate of return for landlords as required by the California State Constitution, it is realized that no method can deterministically calculate the rates of return for real estate investments. A market survey of the expected rate of return using actual sales data, where prices are known, can be done with the valuation system based on the deterministic method by inputting the price to determine the return.

To summarize, the valuation system based on the deterministic solution to price establishes in a semi-infinite time space a complete mathematical relationship among all the market factors, including, in particular, the price and the rate of investment return. Thus, it can translate changes in the values of the inputs of the market variables immediately into changes in the price. In relation to solving the S&L crisis, the deterministic solution to price can (1) translate (for market participants) market changes, such as changes in tax laws, inflation and interest rates, immediately into price changes, (2) determine the expected rates of investment return, which reflect the risks and, thus, to which the insurance rates should be proportional, and (3) keep the loan amount below the economic value, which can be derived by the deterministic method using economically reasonable inputs.

The traditional methods of appraisal, which have contributed to the S&L crisis, were made into official regulation of the government in the late 1980s. The formal recognition of the proven incorrect methods of appraisal indicates that the society is still ignorant of the existence of this deterministic solution to price determination and that this invention is completely novel.

Numerous theoretical discussions had been had with experts on price systems, particularly on the supply and demand model of price determination, known mathematically as the general economic equilibrium analysis. Robert Dorfman expresses in his later writings that the investment model for price determination is more valid that the supply and demand model, contradicting his earlier statement that the investment model is of little use.

During one of the several discussions, Kenneth Arrow asked one crucial question: "What is wrong with the method of discounted cash flow?" The discounted cash flow method or the present value calculation is incorrect because the average rate of return depends on the investment period which is generally different from the time to maturity or the actual holding period. The investment period should be a reasonable finite hypothetical time period chosen along with the investment return as the investment criterion. This error is made, for example, in the classical book *Theory Of Value* by Gerard Debreu, On page 34 of the book, an infinite investment period is used in the calculation of the rate of return. The infinite investment period is unrealistic and will make market comparison difficult. In reality the investment period is almost never infinite. The book is still considered the most authoritative source in the field of the general economic equilibrium analysis, or the supply and demand model, and has provided a comprehensive picture of the price system in an infinite spatial and temporal domain. Unfortunately, the book emphasized the spatial dependence of the price and neglected the temporal dependence, which has been investigated in detail in the infinite spreadsheet.

Milton Friedman has made major contributions in applying the scientific rigor to social science, particularly in finding significant market invariant variables, such as the velocity of circulation of money in which the velocity $V=M_2/PQ$ where $M_2$ is the money supply, P is the price, and Q is the quantities of goods and services, the natural rate of unemployment or vacancy, and the rate of return on investment, achieving the scientific rigor and relevance in social science which other thinkers, such as Adam Smith, John Stuart Mill, David Ricardo, Karl Marx, John Maynard Keynes, and John Von Neumann, tried but could not accomplish. The significance of the constancy of the speed of circulation of money, being a proven practical solution in controlling inflation, cannot be overstated; the California environmental car license plate $PQ=VM_2$ is owned by Friedman.

However, social science due to its involvement with infinity is not entirely empirical in nature; the infinite future never arrives and, therefore, can never be empirically verified. Having stayed within the range of problems solvable by the scientific method based on empirical verification, Friedman's method of studying time-invariant variables supports the rational process of obtaining the inputs as approximate time-invariant variables for the deterministic method of valuation and extends the scientific method into social science.

In a private communication on the subject of the S&L crisis, Friedman made a radical suggestion that money from the depositor should be kept unaltered in the bank vault so that there would be 100% reserve. The 100% reserve policy would necessarily mean a negative interest rate paid to, or a positive storage fee from, the depositor. However drastic Friedman's view may appear, the S&L crisis in the absence of a rational method of investment by the bank seemed to have verified his rigorous conclusion that in the end, after bailing out the S&L losses, the depositor did received a negative interest in the form of raised taxes!

The general economic equilibrium analysis, unable to provide a practical method for price determination, in recent years no longer occupies the mainstream of the research in price determination. Now the field for valuation methods is wide-open for non-traditional ideas. However, the valuation system used in this invention still belongs to the long line of the historical mainstream traditional approach based on fundamental thoughts in economics. Most non-traditional methods for the practical purpose of producing a value for the price are based on the calculation of the return on investment. They suffer mainly from two defects: (1) the calculations, especially for intellectual properties, are not taken to infinity in time and (2) the rate of return, from the deterministic solution to price, should be a market invariant, a constant, which once found should stay approximately the same for a particular type of investment, and should not be the quantity to be calculated once it is known; the price a market variant, should be calculated based on the rate of return. In this regard, it should be noted that the actual rate of return is generally different from the expected rate of return, which is an approximate time-invariant variables and is the rate of return generally used in the deterministic method of valuation.

To summarize the background information for this invention, the following listing of valuation concepts have been categorized into seven groups, the first six of which relate to the current methods, and the last of which describes this invention. The defects of the first six groups are stated immediately under the group title, which is represented by a most popular representative and a general description for the group. No detailed description of the items are given because the listing is intended to be a way to summarily refuting the uncountable number of methods claiming to be solutions or partial solutions to price determination. The list is by no means exhaustive, but the most popular current valuation methods should fall within one of the first six groups.

I. Supply and Demand Model (Spatial Oriented Approaches—Present)
(Defect: The temporal consideration is inadequate.)
Arrow-Debrue Theory
Assets
Capital
Ceteris Paribus
Competitive Pricing
Control Theory
Covariance
Efficient Market Theory
Efficient Set
Empirical General Equation Model
Expected Return
Financial Statement
Fixed Point Theory
Game Theory
General Economic Equilibrium Analysis
Graphical Method
Gross Revenue or Income
Income Statement
Indifference Curve
Inventories
Law of Supply and Demand
Leontief Model
Liabilities
Linear Programming
Marginal Usefulness
Market
Marshalliam Model
Mathematical Economics
Microeconomics
Monopolistic Pricing
Neoclassical G.E. Model
Net Revenue or Income
Net Worth
Phillips Curve
Price/Earning Ratio
Production Function
Profit
Set Theory
Simplex Method
Social Accounting Matrix Model
Standard Deviation
Swap
Utility Function
von Neumann-Morgenstern Theorem II. Income Approach (Temporal Oriented Approach—Future)
Defect: The average rates of return for different years are generally different. Therefore, different discount rates should be used generally for each and every year.)
Accounting
Annuities
Arbitrage Pricing Theory (APT)
Business Appraisal
Capital Allocation Theory
Capital Asset Pricing Model (CAPM)
Capitalization Method
Causal Forecasting Model
Continuing-Value Formula
Corner Portfolios
Debt-Free Valuation Method
Depreciation
Discounted Cash Flow Method
Dividend Discount Models (DDMs)
Earning Approach
Economic Value
Finance
Forecasting
Free Cash Flow Perpetuity Formula
Holding Period
Income Approach
Interest
Investment Horizon
Investment Value
Internal Rate of Return
Modern Portfolio Theory
Multiple Regression Analysis
Optimal Resource Allocation Over Time
Perpetuity Calculation
Portfolio Theory
Present Value
Profit Maximization Model
Rate of Return Calculation
Rational Expectation Model
Regression Model
Rental Rate
Reversion
Spreadsheet
Taxation
Terminal Value
Theory of Investment
Time Cost of Money
Time Series Analysis
Uncertainty
Value-Driver Formula III. Market Comparison Approach and Time Series Analysis (Empirical Methods—Past)

(Defect: The inputs for price determination should be approximate time-invariant variables, but price, involving infinite future, is a time variant. Empirical method is useful only for time-invariant variables and is useless for time variants.)
Acid Test Ratio
Actuary Science
Asset Utilization Ratio
Balance-Sheet
Bayes' Theorem
Bayesian Decision Rule
Book Value
Buy-Sell Agreement
Capitalization Rate
Comparative Ratio Analysis
Comparative Value
Computer Simulation
Current Ratio
Debt to Equity Ratio
Debt Service Ratio
Econometrics
Empirical Approach to Value
Empirical Time Series Analysis
Equity to Total Asset Ratio
Expected Utility
Expected Value
Fair Market Value
Going-Concern Value
Going Public
Gross Multiplier
Historical Data
Income Statement Coverage Ratio
Insurance
Legal Definition of Price (Willing buyers and willing sellers arriving at Fair Market Price)
(Defect: It is an endorsement of the Market Comparison Approach. Irrational market participants determine irrational market price.)
Leverage Ratio
Long-term Debt to Total Capital Ratio
Market Comparison Method
Marketability
Markowitz Approach
Neural Network
Operating Performance Ratio
Peer Review Process
Probability
Quadratic Programming
Quick Ratio
Return on Investment Ratio
Scientific Approach to Value
Selling Out
Simulation
Statistical Technique
Time-Series Analysis
Total Debt to Total Asset Ratio
IV. Cost Approaches (Construction, manufacturing, replacement, development or building cost)
(Defect: Value depends on future benefits and losses, not the cost.)
Budget
Capital Cost
Cost Approach
Duality
Expenditure
Labor Cost
Liquidation Approach
Liquidation Value
Maintenance
Manufacturing Cost
Rent
Replacement Cost
Salary
Scheduling
Social Cost
Wage
V. Factor Methods (Combination of Empirical and Statistical)
(Defect: Weight factors can be obtained from sensitivity analysis when a correct method of valuation is available.)
Artificial Intelligence
Factor Analysis
Factor Approach
Factor Method
Formula Approach
Garbage In: Garbage Out
Hierarchy Problem Solving
Sensitivity Analysis
Structured Modeling
VI. Ethics (Subjective Methods and Others)
(Defect: Only laws of nature in physical and social sciences must be obeyed.)
Appraisal
Assessment
Banks
Beta: The measure of systematic risk
Bonds
Business
Capitalism
Claims
Collateral
Combination Approach
Common Stock
Communism
Complex Option
Convertible Bond
Copyright
Corporation
Court
Crime and Punishment
Currency
Decision Making
Economic Welfare
Eminent Domain
Environmental Economics
Ethics
Estimation
Evaluation
Exchange Value
Expert System
Externalities
Fair Value
Feelings
Futures
General Theory of Value
Good and Evil
Ground Fields
Guessing
Hedonism
Intellectual Properties
Intrinsic or Fundamental Value
Intuition
Irrational Investors
Just Price Labor Theory of Value
Land
Land Economics
Law of Uniformity
Legal System of Justice
Linquistic Approach
Man-made Laws
Money
Money Supply
Moral Progress
Monetary Value
Morality
Noisy Payoffs
Nominal Securities
Non-cash Benefits
Non-monetary Return
Nonprofit Organization
Normative Economics
Objectivity
Observation
Optimal Decision
Optimization Hypothesis
Options on Future Contracts
Option Theory
Patent
Permanent Entity
Policy Making
Polynomial Rings
Positive Economics
Positive—Nonnative Distinction
Pre-Scientific Approach
Price Determination
Privatization
Property
Public Goods
Public Utilities
Real Estate
Research and Development Firm
Risk
Risk Assessment
Risk Aversion
Risk Information
Risk Coverage Analysis
Risk Management
Savings and Loan Association
Scientific Economics
Scientific Method
Securities
Small Business
Social Choice Theory
Socialism
Stocks
Subjective Expected Utility
Surplus Value
Theory of Evolution
Thrift Institutions
Unexpected Past
Utility Analysis
Value
Value In Exchange
Value In Use
Warrants
Wealth
Welfare Economics
Worth
VII. Quantitative Theory of Value (A law of nature in social science)
(Realistic Accounting of Expected Returns to Infinity In Time) (Reality is conceptually infinite in time and space.)
Deterministic method of price determination
Deterministic Solution to value and price
Expected Future
Expected Past
Infinite Reality
Infinite Spreadsheet
Laws of Nature in Social Science
Market Invariant Variables As Inputs
Market Variant As Output
Number of Equations Equal Number of Unknowns
Post-Scientific Knowledge
Post-Scientific Social Science
Quantitative Supply and Demand Model
Quantitative Theory of Value
Rational Behavior
Rational Decision Making The Financial Institutions Reform, Recovery and Enforcement Act of 1989 requires real estate appraisers to pass examinations on the proper methods of valuation. It should be a matter of great urgency that a correct solution to valuation be found to replace the current valuation methods, which, as recognized by knowledgeable real estate appraisers, are obviously incorrect and, in fact, one of the major causes of the Savings and Loan crisis, for which the law of 1989 was passed. Here is a prime example that a law of man is in conflict with a law of nature. Generally, pain and suffering are the means that nature let people or animals know that laws of nature have been violated. The preoccupation of religions with suffering is an indication that the laws of nature in social science are not yet known to us in the twentieth century.

Furthermore, the National Competitiveness Technology Transfer Act encourages scientists to look into the commercial values of research results. However, determining the value of a research project is even more important before it is carried out than after it has been done. The deterministic method could also lead to a rational method for determining research priorities, which, being a part of the big picture of decision making, should become a necessary knowledge for all policy makers. Risks and unexpected benefits, which are a form of positive risk, are examples of the non-monetary return which should be reflected in the change in the pure monetary rate of return. Thus, all research projects can be consistently treated as investments. In particular, public funding should be justified by public good. Knowledge in physical science is necessary not only in carrying out a research project but also in the valuation of the research result.

OBJECTS AND ADVANTAGES

Reality is infinite in time and space. Post-scientific knowledge deals with the infinite reality. This invention solves deterministically the novel one-commodity, infinite-time problem first, and, then, by summing the one-commodity results, provides a deterministic derivation of the multiple-commodity, infinite-space problem. The deterministic multiple-commodity problem quantifies the qualitative supply and demand model in current economics.

The post-scientific solution of price determination involving infinity in time and space could formally signal the beginning of the age of social science in which it will be realized that laws of nature in social science will constrain human behavior as laws of nature in physical science have constrained the behavior of material objects in the age of science. This invention is the first formal presentation of the deterministic solution to value, price and decision making involving the infinite spreadsheet and the quantitative supply and demand model.

Post-scientific knowledge involves social and life sciences and works mainly in the expected space existing in the future. Physical science and empirical verification are also concerned with the expected future, but since they deal mainly with deterministic phenomena of finite duration, the future can always be represented in its entirety by the past, thus, giving the illusion that physical science deals exclusively with past empirical data. In physical science, the past provides many time-invariant variables for the predictions of the future through experimentation. The success of physical science, in turn, relies on empirical verification. No exact time-invariant variable can be obtained in social science, but the concept of time-invariant variables is useful and even necessary in obtaining deterministic solutions in social science.

Post-scientific knowledge maps in the mind the expected rational future reality. Because of the involvement of infinity, the rational design of the future is unlike problems in physical science and is not fully under the control of the designer. Solutions of post-scientific knowledge are verified in a manner very different from that of physical science and are far more subtle. Social, economic, and financial disasters, or on a personal scale pain and suffering, would usually mean that a post-scientific solution has been contradicted, but the absence of disasters would not necessarily mean the solution is correct; due to the involvement of infinity, the process of correct verification needs also last to infinity, which, however, never arrives by definition.

The ultimate goal of the verification process, as is the initial aim of the deterministic solution, is for the expectations and the part of the reality, that is the past, to merge, within a tolerable range of error, as the future gradually unfolds and becomes the past. The expectation is allowed to be adjusted continually, before disasters occur. From market testing, ten or twenty percent difference in the valuation of real estates or of businesses is still within the tolerable range; a major disaster usually requires an in access of fifty or even one hundred percent.

The novel concept of infinite spreadsheet is used to introduce the problem of solving deterministically for the price. The infinite spreadsheet is a spreadsheet which extends to infinity in time and consists of infinite layers each of which represents an imaginary buyer at a given time period. The problem of price determination then becomes the problem of filling up the infinite spreadsheet with numerically consistent values.

There are five basic requirements of the infinite spreadsheet: (1) correspondence to reality, (2) variables which can be expressed to infinity, (3) mathematical consistency, (4) reasonableness of the inputs, (5) usefulness in practice. Briefly, the requirements are satisfied in this invention: item (1) above by a realistic accounting method; (2) is by the concept of approximate time-invariant variables; (3) is by time-reversed calculation. Items (4) and (5) are not always possible but have, at least, been successful in real estate and business valuations.

The novel procedure of time-reversed calculation starting from the infinite future back to the present and the novel concept of expressing all the inputs of the infinite spreadsheet in the form of approximate time-invariant variables are employed to arrive at a deterministic solution to price on the infinite spreadsheet. The problem of price determination is formulated by following the realistic accounting of monetary returns. The rate of non-monetary return can be estimated from the difference between the rate of total return and the rate of monetary return. Thus, value is quantified in the deterministic solution to price.

The infinite spreadsheet is a generalized spreadsheet; it includes all the finite spreadsheets. The infinite spreadsheet can often serve as a good approximation for any finite spreadsheet which covers a large number of investment periods. The validity of the approximation can be verified by a few detailed calculation of the finite cases with time varying inputs. Entities with finite life simply require that their final resale prices need not be calculated and are often equal to zero. The finite boundary condition supplies one additional equation to eliminating one unknown in the infinite spreadsheet.

Another important novel feature of the invention is that an expected average rate of investment return is always given in conjunction with an expected investment period. Together they form an expected investment criterion. When the calculation has to extend to infinity in time, there are infinite numbers of investment periods. But, even when an investment only involves finite duration, there should still be a finite number of investment periods. This is conceptually correct because the rate of return should be different for different investment period. This novel feature points out a major defect in most discounted cash flow calculations.

It is another novel procedure to use expected rather than actual inputs, except in the case when the actual sales price is used to determine the expected average rate of return on investment. It is a part of a novel procedure to assume that for similar types of investment, the rate of return is an approximate time-invariant variable. Thus, in the calculation for the rate of return, the present and all the future resale rate of return should all have the same value.

It is a part of a novel procedure to assume that for income producing investments under highest and best use, the capitalization rate, which is the ratio between the net income and the price, is a time-invariant variable under stable economic condition. The capitalization rate is assumed to be constant in the calculation of the first resale price, inferring that the rate of increase of the price is the same as the rate of increase of the net income.

In a sense, the deterministic method is imposing a rational plan on the future. The market responds by rewarding investors using the deterministic method with just, or overly favorable, rewards for their investments. When most of the market participants use the deterministic method, the method will dictate the market. As all the investors receive the fair returns for their investment, there will be little chance for speculations, and the market will become stable as dictated by the deterministic method. The stability of the market feeds back into the expectations of the deterministic method forming a feedback loop between the market and the deterministic method, resulting in a more stable market.

If the market finds the imposition by the expectations of deterministic method acceptable on both the long-term and the short-term bases, predictions then become self-fulfilling prophecies. Today, in order to predict the irrational market price, the irrational market expectations must be used. For investors, when the rationally appraised price is greater than the market price, it is time to invest in this undervalued market. The recent banking crisis, on the other hand, was caused mainly by an overvalued real estate market.

The deterministic solution to price starts from the temporal consideration of one commodity. The results of the one-commodity price determination can be accumulated to quantitatively derive the multiple-commodity supply and demand curves for the supply and demand model, which conceptually is spatially infinite in its consideration. The deterministic method can be used to calculate the number of willing buyers and sellers deterministically. It determines the quantities at given deterministic prices. The demand curve is then the accumulated quantities from the price to the maximum price or to infinity, resulting generally in a decreasing function. The supply curve is derived by summing the quantities from the minimum price to the price, resulting generally in an increasing function.

The deterministic method of price determination has demonstrated its usefulness in many applications, the most significant among which are:

(1) It predicts real estate prices—both the correct price based on economic considerations and the irrational market price.

(2) It unifies the three traditional approaches of real estate appraisal, which are the market comparison, the income, and the cost approaches.

(3) The deterministic solution to price determination is, to a large extent, also the solution to the economy. It, in fact, is the only correct one among the four major methods of valuation: (1) general economic equilibrium analysis or the law of supply and demand, (2) discounted cash flow analysis or present value calculation, which corresponds to the income approach in real estate appraisal, (3) time series analysis, which is the general form of the market comparison method in real estate appraisal, and (4) the deterministic solution to price determination. The general economic equilibrium analysis, which is a mathematical description of the supply and demand model, emphasizes the spatial dependence of the price and has neglected the importance of the temporal dependence, which is considered in detail in the deterministic solution. In particular, the general economic equilibrium analysis uses the discounted cash flow analysis in its temporal calculation. The method of discounted cash flow, or present value calculation, does not correspond to realistic situations and is not applicable in practice because the discount rates are generally different for different investment periods, to apply the method correctly, a different rate has to be used for each and every year. Price, like value, depends on the future, not necessarily the past. The time series analysis (and the market comparison method) tries to make economic predictions based on past data. However, unlike that in physical science, deterministic sets, which involve an equal number of equations and unknowns, of past data can never be collected in value determination simply because infinite future will never arrive. The time series analysis should be used for time-invariant market variables, such as the velocity of money, but not for prices.

(4) It provides the only available method for determining the expected rate of return on investment from sales data.

(5) It can make certain types of economic predictions by noting that the rate of return should be higher than the interest rate and the interest rate, higher than the rate of inflation. For example, economic stagnation occurs when the interest rate, pushed up by the inflation rate, is near or above the rate of return, which is an approximate time-invariant quantity.

(6) It helps sharpen the focus on the collection of data relating to the inputs.

(7) Decisions are made based on value judgment. Logically, there is no way a rational decision can be made without considering all the consequences of the decision to infinity in time. Since all actions are for the purpose of increasing value, the deterministic solution to value offers a rational decision-making criterion. Here, being rational is defined as being completely reasonable, (8) The deterministic solution to price not only challenges the common practice of most government agencies, which quantify only the cost in the budget or funding, but also introduces a rational method for decision-making. In particular, a proposed budget for a project generally corresponds to the cost approach of valuation. The agency which evaluates the proposal should compare the budget to the proposed project's expected worth, which depends on the future investment return and is obtainable using the income approach. The deterministic solution could give an overall view of the process of decision-making based on valuation.

(9) Additionally, the "peer review" funding process could be a hindrance to progress, for it is identical to the market comparison valuation method, which caused the banking crisis of late 1980s and early 1990s. In general, because new knowledge by its very nature is unpredictable, funding should avoid designating specific areas of research or particular types of recipients. For example, the Nobel Committee of Sweden influences the areas of research by its awards, and, in particular, its emphasis on physical science is drawing away those who could be doing research in post-science. The National Science Foundation of USA does not only dictates the topics of research or where new discoveries in knowledge can and should be made, but also specified the researchers to make the new discoveries (!), thus, taking away both their originality and their independence. Money should not dictate knowledge, but knowledge in the form of valuation should decide funding or investments. The progress of our society should be measured by the advancement of knowledge and be described from the point of view of valuation. A rational system to encourage the contribution to new knowledge would be to have a "knowledge tax" and to pay contributors of knowledge with the receipts of this tax after their knowledge has been proven worthwhile. The Nobel Prizes without specifying the areas of awards would satisfy this rational system.

(10) The deterministic solution to price derives a deterministic procedure for constructing the quantitative supply and demand model, which is in contrast to the qualitative nature of the supply and demand model in current economics. Thus, the deterministic solution extends beyond the single-commodity model to a multiple-commodity model and makes a connection to the foundation of current economics. By including the spatial effects, in particular personal income and population, the method of price determination of this invention becomes generally applicable. Post-scientific social science should considers the infinite space as well as the infinite time.

(11) Physical science has demonstrated that the outcomes of certain physical phenomena can be predicted. The greatest contribution of the deterministic solution to value will be in demonstrating effectively for the first time that the laws of nature in social science can be used to predict social and economic trends. Thus, post-scientific social science will finally put an end to arbitrary traditions, customs, faith, principles, rights, or ideologies, which are formed based on past experiences, and will establish laws of nature as the rational guides for societies.

In practice, the main differences between the devices based on the deterministic method and other existing devices in the determination of prices are that (1) nowhere in the application of this device is there a need to assume a price, a resale price or any rate of increase of the price, except that the capitalization rate is assumed to be a time-invariant variable at the time boundary involving infinity, (2) all the financial factors affecting the price have been specified all the way to infinity in time in this device, and, therefore, (3) this is the first and only device in existence today that can produce a deterministic or non-arbitrary price.

SUMMARY OF THE INVENTION

The invention deals with devices designed based on a completely mathematically consistent and logically rigorous method of price determination. It seems that almost anything can contribute to the change in price. The only safe way to insure the correct determination of price is to take everything into consideration. In the deterministic method, an investment decision is made by taking into consideration all the future expected consequences as the result of the decision. The accounting process of all the future consequences must be quantitative and must not miss anything or count anything more than once.

The scientific method, which customarily isolates phenomena within finite space and time for controlled study, is found to be insufficient for solving this problem. It is necessary to appeal to a more rigorous concept of solution. The deterministic method used in the device for price determination considers all the factors that can possibly affect the price and lumps them into a finite number of variables whose mathematical relationships have been established in a time space extending from the present to the infinite future. In this method, the number of unknown prices exactly equals the number of equations when all the other financial factors are given. Therefore, it is unnecessary and even incorrect to assume any resale price because the device can determine the resale price.

Generally, because of the involvement of infinity, straightforward or brute-force methods are lengthy, if not totally impossible even with the aid of a calculator or computer. Since the design specifications of this device are novel and even the problem is novel, this application is filed. The patent will serve to disclose formally a critically important knowledge whose presence in the current archives of human knowledge may be somewhat out of place and ahead of the time but whose basic principles have enabled the construction of devices which are immediately applicable in providing financial and investment guidelines.

Although the invention is particularly designed for arbitrating the price between the buyer and the seller, it could be modified to arbitrate all human conflicts, anything from rent control to international disputes. Furthermore, the general concept, dealing with the principle of fair trade, could offer a rational foundation for a system of legal justice based solely on laws of nature.

The problem of price is solved in its entirety in this device using extremely rigorous concepts, that is that the problem takes into consideration practically all the factors affecting the price for all times. Historically, the very possibility of solving social science problems in their entirety using concepts as rigorous as those used in science could represent a significant advancement in the progress of our civilization, for it may be argued that the ill of our current scientific age lies in its partial solutions to all our problems.

The present invention may bring to its actual practical application, and, more importantly, its popular acceptance, a knowledge that could mark the beginning of the age of social science in which laws of social science will be accepted as much as our current laws of physical science.

In conclusion, the invention is both novel and immediately useful.

It is an object of the present invention to provide a device which can give deterministic, or non-arbitrary, guidelines for real estate constructions, business and real estate investments, and other financial and economic decisions based on the single-commodity deterministic method of price determination and the multiple-commodity quantitative supply and demand model.

It is another object of the present invention to introduce the design specifications of the device and its novel process of operation which require that all the prices, including all the resale prices from now to infinity, be simultaneously determined in the single-commodity deterministic method and that the quantities for all the deterministic prices are to be summed to form the supply and demand model in the determination of the prices of all the functionally similar commodities with a uniform price.

Other objects and advantages of the present invention will become apparent when the device is considered in conjunction with the accompanying drawing wherein:

BRIEF DESCRIPTION OF DRAWINGS

FIG. 1 is an expected time schedule of the development of human knowledge exemplifying the position of the current invention in the development of human knowledge.

FIG. 3 is a pictorial representation of the nature of social science in comparison to the natures of physical and life sciences exemplifying the involvement of the infinite time period in the present invention.

FIG. 11 is a table of rates of returns on investment exemplifying an important approximate time-invariant variables in social science.

FIG. 12 is a flow diagram of block 93 of FIGS. 9 and 10 showing that all the inputs have been expressed as equivalent time-invariant variables for calculating the final resale price.

FIG. 15 is sample inputs for calculating the price based on the income approach.

FIG. 16 is a sample printout of the outputs for the sample inputs in FIG. 15 exemplifying the infinite spreadsheet.

FIG. 17 is the graphic representation of the income and the price and the resale prices of the sample inputs and outputs in FIGS. 15 and 16 respectively.

FIG. 18 is a demonstration of the validity of the assumption of the equivalent time-invariant variables assumption for the sample price determination of FIGS. 15, 16 and 17.

FIG. 19 is an illustration of the survey of market comparable data using the real estate market exemplifying a method for obtaining reasonable inputs for the deterministic method and the market comparison concept used in the unified approach in the present invention.

FIG. 21 is a demonstration of the determination of land price exemplifying the cost approach and the determination of residual value.

FIG. 23 is a list of factors used in constructing the supply and demand curves for software exemplifying the multiple-commodity nature of the quantitative supply and demand model.

DETAILED DESCRIPTION OF THE PREFERRED EMBODIMENTS

The concepts and the functional components of the device in this invention will be explained with the aid of the drawings.

Where in the historical development of human knowledge the current invention should be placed? FIG. 1 is an expected time schedule of the development of knowledge. It places the current invention after physical sciences in the development of human knowledge. It is the beginning of post-science, which starts in the year 2000.

Figure 2:
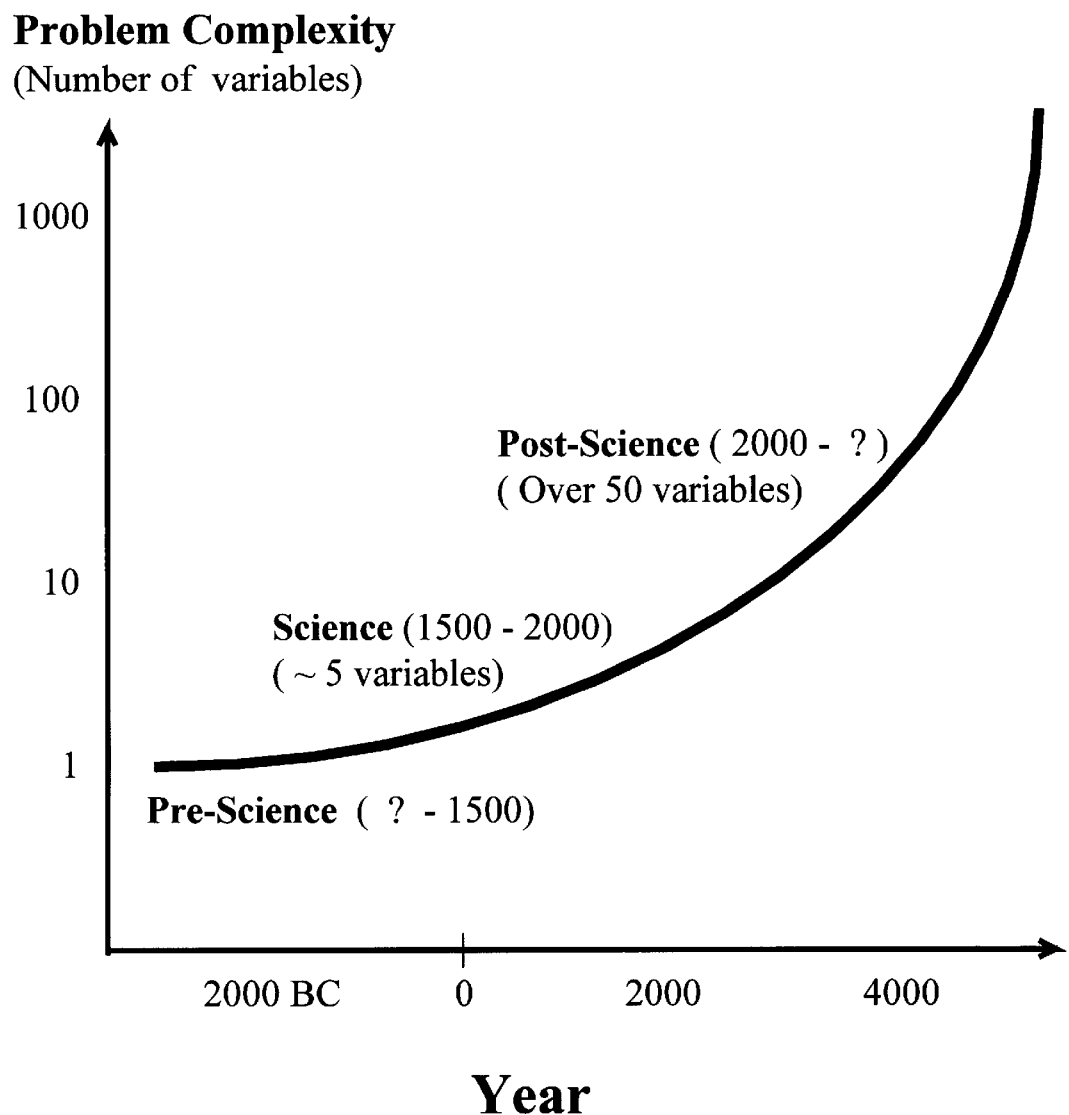
FIG. 2 gives a graphical representation of FIG. 1 in terms of the complexity of knowledge expressed in terms of the number of variables involved in the problems.

FIG. 2 gives a graphical representation of FIG. 1 and the complexity of knowledge measured in terms of the number of variables. It shows that post-scientific social science has at least 50 variable which is an order of magnitude more complex that the approximate 5 variables for science.

FIG. 3 points out one of the main differences between the nature of social science and those of physical and life sciences in terms of the duration of time of the problems which each of them study. At the top of FIG. 3 is a time axis displaying the past, the present, and the future. The time axis is to be used as a time reference for the pictorial representations in FIG. 3.

The top third of FIG. 3 shows a pictorial representation 31 of physical science. On the left-hand side of pictorial representation 31, a deterministic phenomenon occurring within a finite time interval in the past is pictorially represented by a solid line of finite length. A deterministic phenomenon is a phenomenon which contains an equal number of equations and unknowns. The past deterministic phenomenon represented by the solid line originates at a starting point marked by the word "Start" above the line and terminates at the word "End" to the right.

At the right-hand side of pictorial representation 31 is a similar deterministic phenomenon which is expected to occur in the future and is represented pictorially by a finite broken line. In FIG. 3 broken lines are used to represent pictorially phenomena expected to occur in the future.

In the middle block of FIG. 3, a pictorial representation 32 of social science shows a deterministic phenomenon expected to occur with infinite time duration. The phenomenon will terminate at infinite future regardless whether they started in the past, are starting at the present or are expected to start in the future, as shown in the pictorial representation 32, in which the broken line will never end.

Pictorial representation 31 of physical science in FIG. 3 shows that a deterministic phenomenon, in which the number of equations equals the number of unknowns, occurring within a finite time interval can be transported in its entirety from the past to the future in order to predict the future when all but one last variable are known.

Pictorial representation 32 of social science in FIG. 3 shows that a deterministic phenomenon occurs with an infinite time duration and, thus, cannot be transported in its entirety from the past to the future.

The finite time duration of phenomena in physical science allows empirical verifications and precise predictions. The method of empirical verification provides the means for physical science to discover and experimentally test constants of nature and exact time-invariant variables, which can be used in future predictions.

Social science, on the other hand, generally has to study reality in its entirety and must consider the infinite future. For example, the consequences of social and economic decisions usually last to infinity in time. With possibly one important exception, social science, in general, cannot be empirically verified simply because the infinite future will never arrive. The one exception involves the existence of time-invariant variables in social science. Since they are supposedly to be constant with respect to time, time-invariant variables should be verified by comparing them with the unchanging past expected, and the actual, data.

An important practical implication of time-invariant variables is that past data are useful and, in particular, can be used as future inputs in either physical or social science if and only if these data possess time-invariant characteristics. In other words, what matters is the reality in the future, not the past, and the future reality has connection to the past only through time-invariant variables.

The inescapable conclusion from FIG. 3 for this invention is simply that in order to obtain a deterministic solution in social science, the future expectations must be included in the consideration of the problem, which, furthermore, must be extended to infinity in time in a logically consistent fashion, almost without regard to the past. This novel conclusion signifies a complete breakaway from the principles of operation and the methods of prediction in physical science which relies on the past and the empirical verifications of past data. Deterministic solutions in social science are beyond physical science and belong to post-scientific knowledge.

In order to make predictions, post-scientific social science seeks deterministic solutions in the expected future extending to infinity. In particular, the post-scientific solution to price determination establishes in a semi-infinite time space from now to the infinite future a completely consistent mathematical relationship between the price and all the variables affecting the price.

The problem of price determination in this invention is derived from a definition of value, making the solution to price also the solution to value. Value is defined as the sum total of all the expected future benefits and losses. Value is the total return. It is the sum of the monetary and the non-monetary returns. The deterministic solution to price deals with the monetary return, which is directly quantifiable in terms of money.

However, the non-monetary return can be inferred quantitatively by expressing the returns in percentages. In particular, the percentage total return, logically, should be roughly the same for all the investments in a given economy. In practice, the percentage monetary return must be high enough to compensate for any low or negative percentage non-monetary return, and vice versa, in order to satisfy the requirement that the percentage total return is a constant. Thus, the non-monetary return, such as happiness, risk, etc., can be estimated from the difference between the percentage total return and the percentage monetary return. With the non-monetary return accounted for quantitatively, value becomes completely quantifiable.

Value is the expected future returns; value is the total return. The total return consists of the monetary return and the non-monetary return. The equation for the monetary return describes the realistic accounting of expected future cash receipts:

Monetary Return=Sum of Cash Flows+Cash from Resale which is the only equation needed in the deterministic method of price determination, but, for the sake of mathematical and logical consistency, has to be satisfied for the price and all the resale prices from now to infinity in time and from here to infinity in space.

In the equation for the monetary return, the physical model is the transaction of a "black box" which can represent anything of value. Cash will be received by a current buyer of the box during the ownership of the box and when the box is resold. The Sum of Cash Flows contains all the net cash receipts, including their interests, during the holding period of the box. The Cash from Resale is the net cash received when the box is sold by the current buyer to a future buyer. The equation involves a price and a resale price.

A similar equation for determining the resale price for a future buyer of the box when it is resold is of the exactly the same form:

Monetary Return=Sum of Cash Flows+Cash from Resale which introduces an additional resale price for the future buyer. Thus, each time an additional equation is introduced, a new resale price is added. Either this process continues to infinity or the box is completely used up somewhere along the process, in which case considering to infinity in no longer necessary. The basic equation in the deterministic method describes simply the accounting of money. It can also be considered to be a definition for the monetary return. The success of the method relies largely on the discovery that the condition involving infinity supplies the equation needed for a solution.

Figure 28:
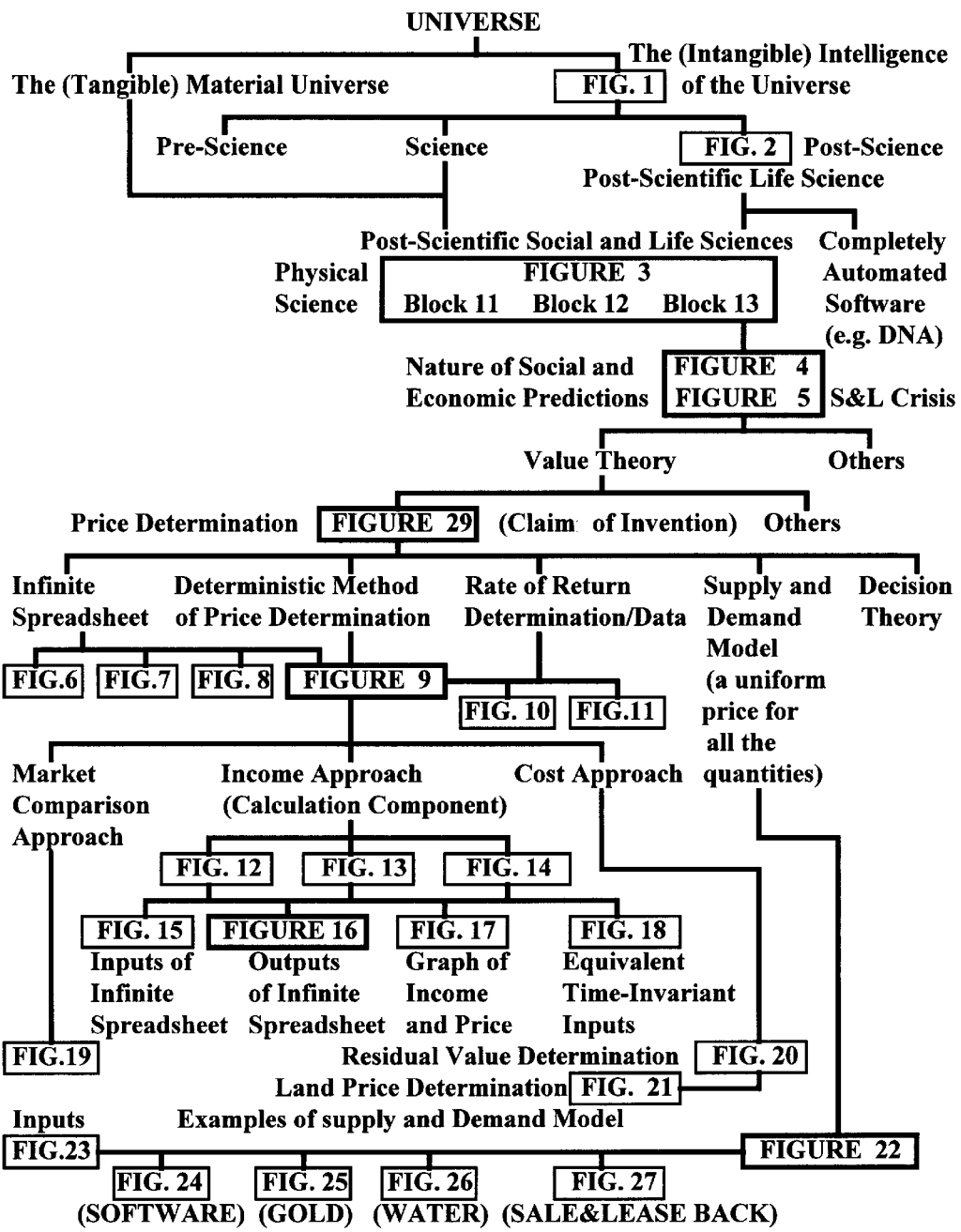
FIG. 28 is a knowledge map based on a knowledge tree for this invention arranged roughly from top down and left to right for increasing figure numbers.

To make the picture of knowledge complete, FIG. 3 includes the expected nature of post-scientific life science based on a patent by this author "Completely Automated And Self-generating Software System" which identified DNA of the living organism as a permanent software with an evolutionary design. The patent speculates that DNA could represent the accumulated wisdom of the universe from the infinite past. Thus, from a post-scientific point of view life science deals with the infinite past as well as the infinite future as graphically shown in the representation 33 of FIG. 3. It is based on the belief that the universe contains, in addition to the material, accumulated intelligence stored permanently in a form, such as DNA as indicated at the top of FIG. 28.

Figure 4:
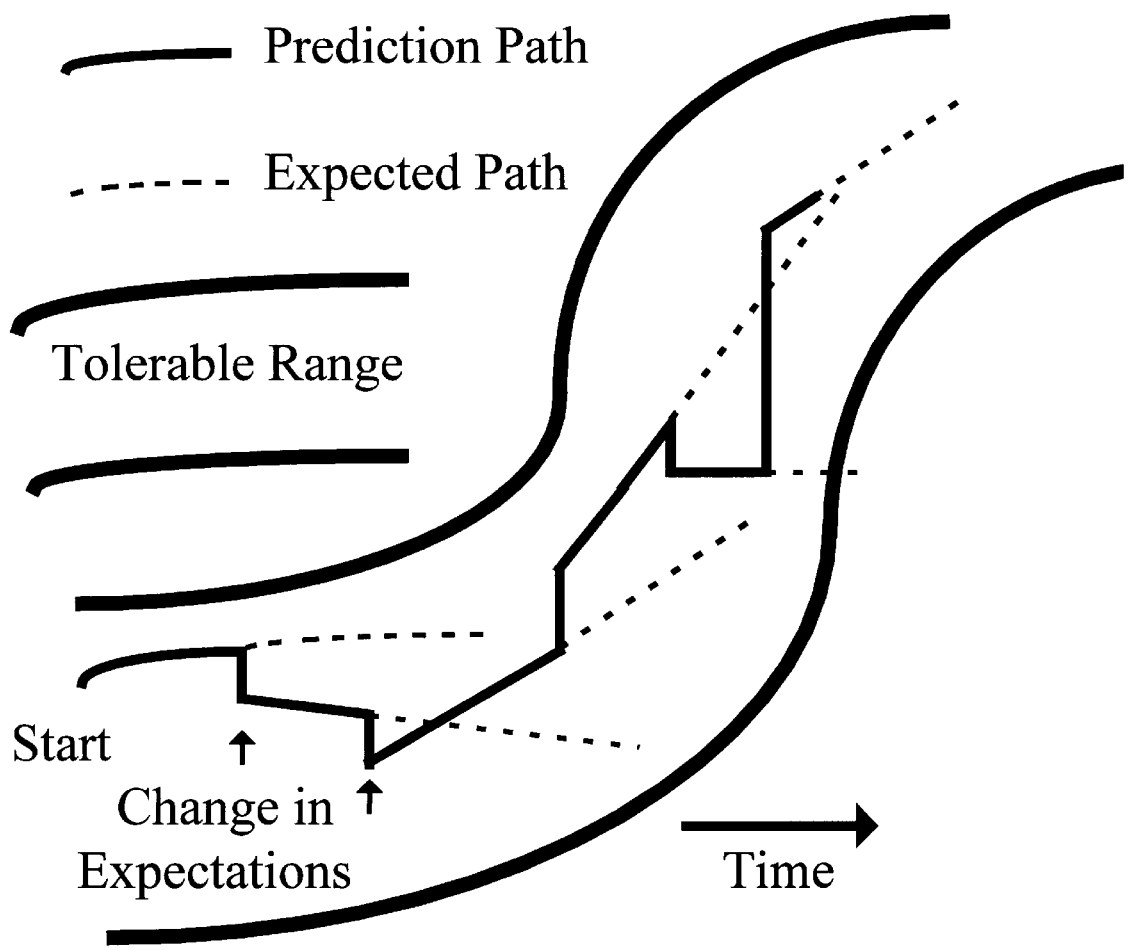
FIG. 4 shows graphically the nature of social and economic predictions exemplifying the time-variant nature of and the requirement of constant adjustments in non-arbitrary price determination and in rational decision making.

FIG. 4 shows graphically the practical nature of social and economic predictions. It emphasizes the time-variant nature of and the requirement of constant adjustments in non-arbitrary price determination and in rational decision making. This process of readjustments at every instance when the expectations change characterizes social and economic predictions and is a major departure from predictions in physical science.

Figure 5:
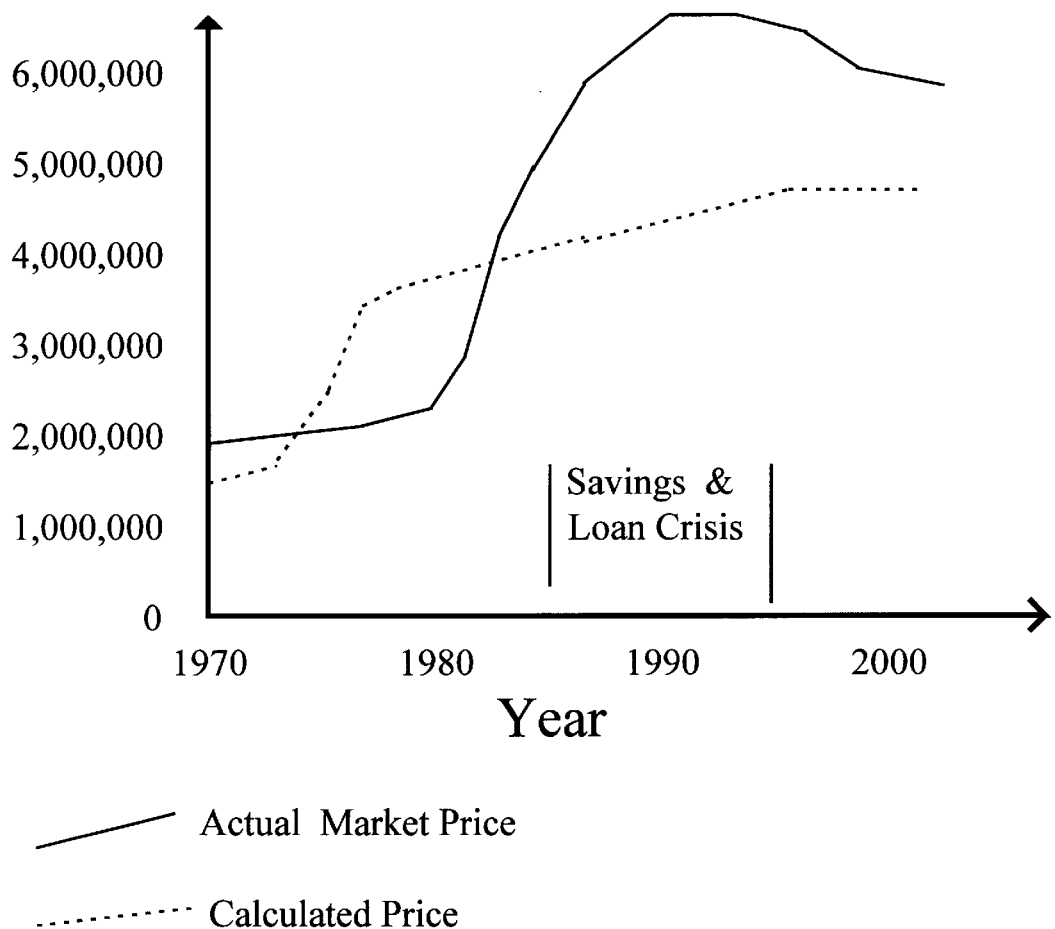
FIG. 5 shows graphically the cause of the S&L crisis in the real estate market in USA exemplifying the economic predictive power of the invention.

FIG. 5 shows graphically the cause of the S&L crisis in the real estate market in USA. It illustrates the potential economic predictive power of the invention. In FIG. 5 the actual market prices are compared to the calculated prices expected from the infinite spreadsheet. From the late 1970s and the early 1980s the real estate market was undervalued, and from the mid 1980s to the mid 1990s the real estate market was overvalued, when the S&L crisis occurred.

Figure 6:
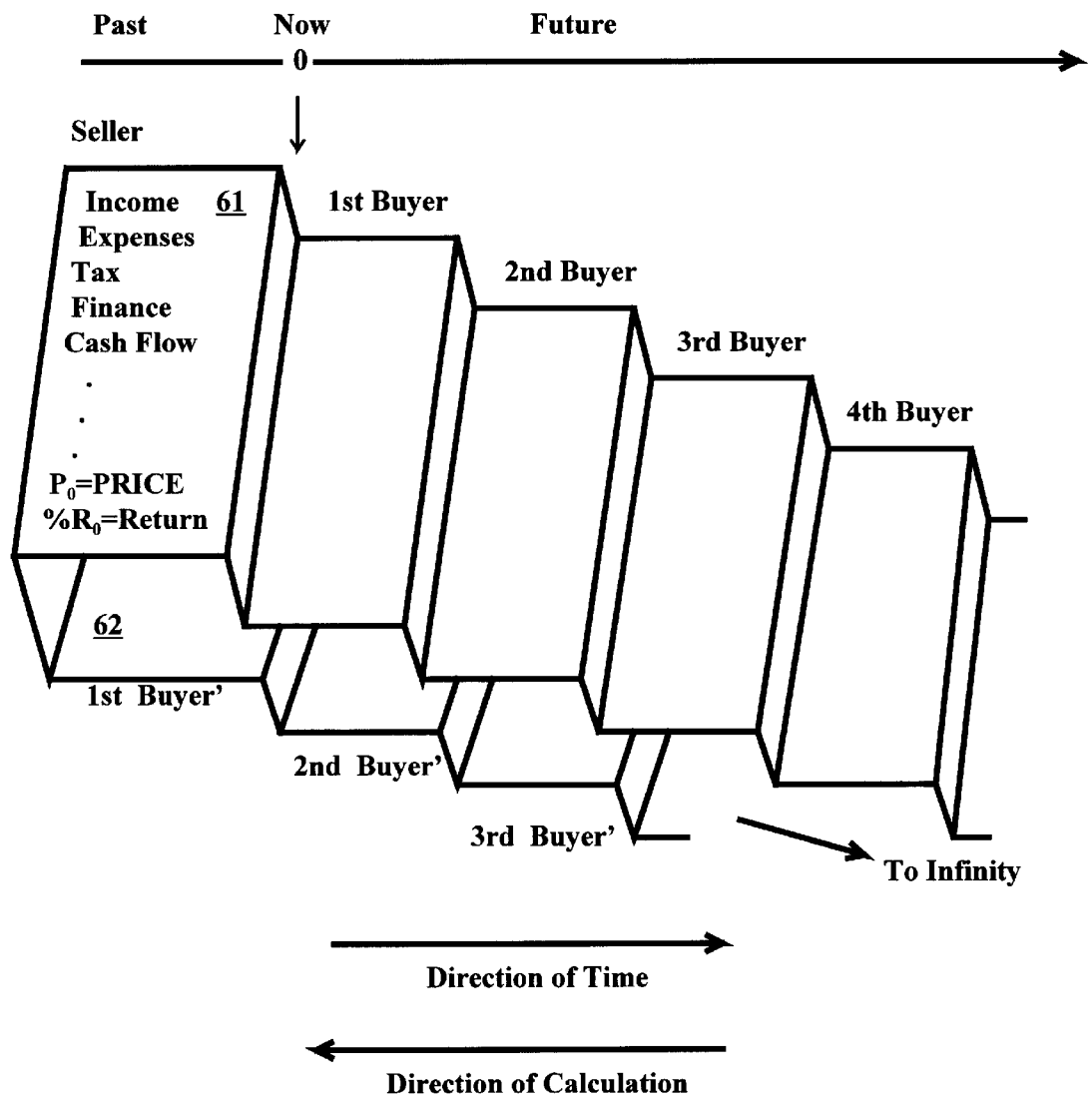
FIG. 6 is a three dimensional view of the infinite spreadsheet employed to describe the physical model of the realistic accounting process used to calculate the price exemplifying the involvement of the infinite number of different expected buyers and the time-reversed manner of calculation.
Figure 7:
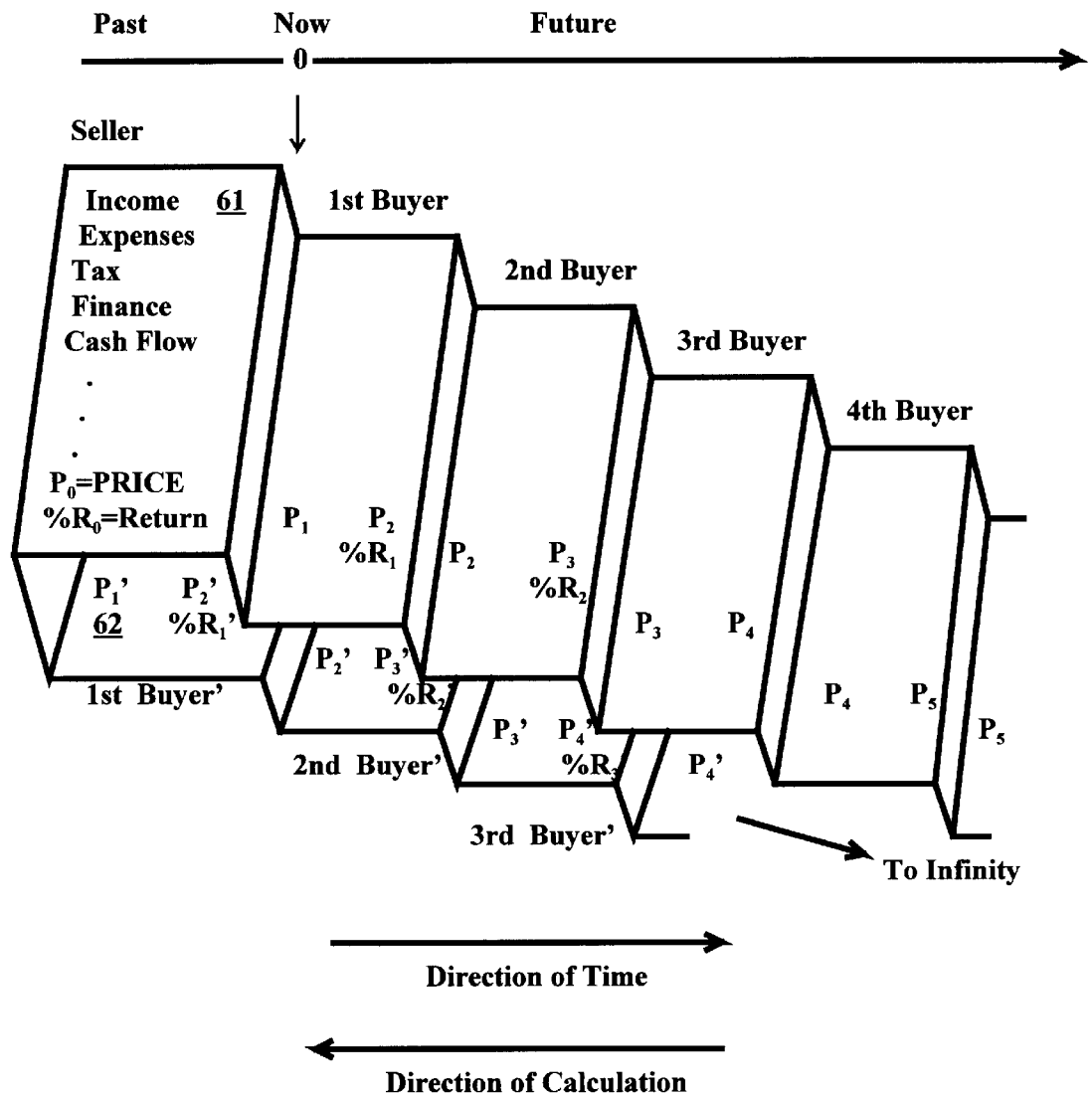
FIG. 7 is the same as FIG. 6, but, instead of calculating the price, it is a pictorial representation of the process used to calculate the expected average rate of return on investment based on the actual sales price from the past exemplifying the use of the expected past, not the actual past, inputs.
Figure 8:
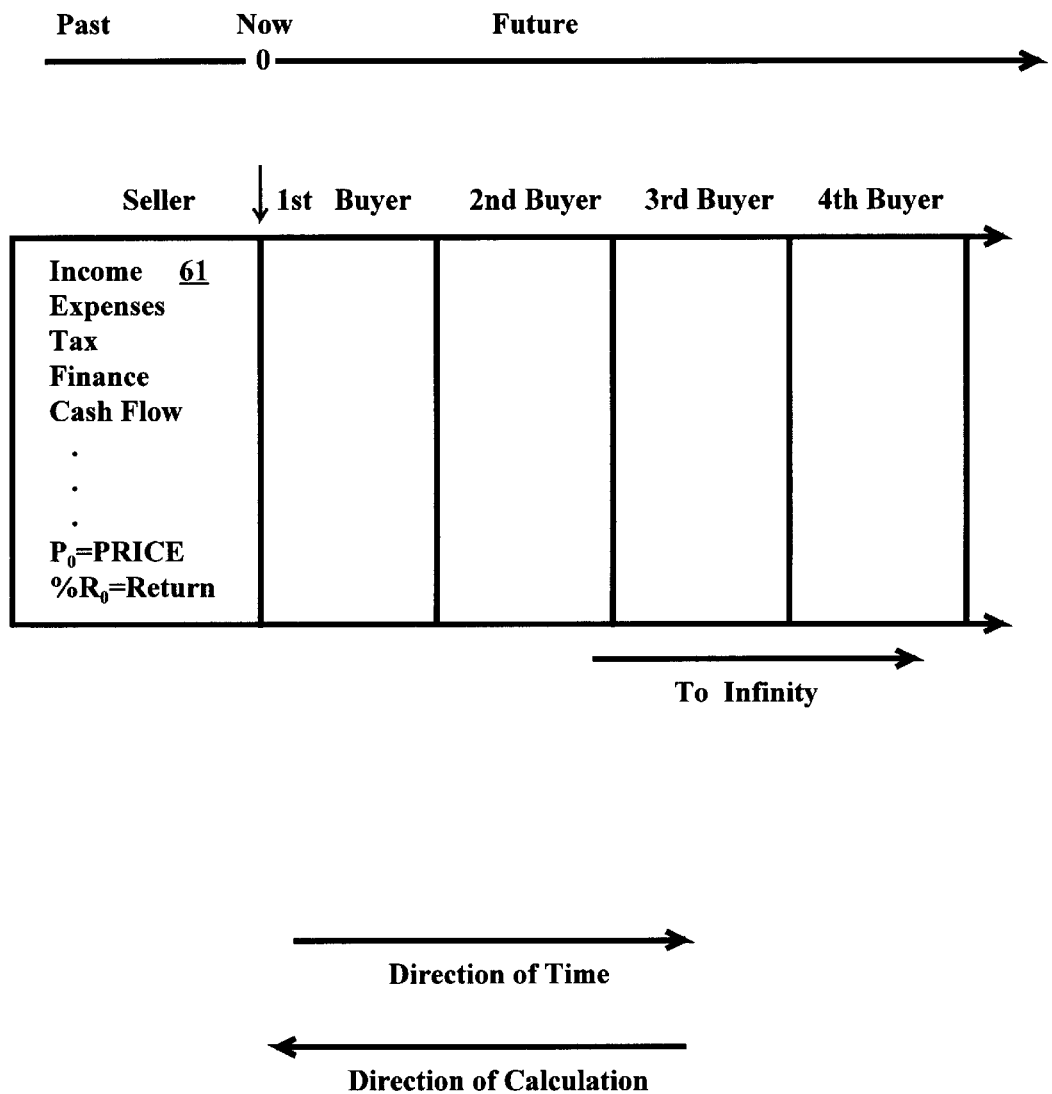
FIG. 8 is the top view of FIGS. 6 and 7 showing a flat plan of the infinite spreadsheet, which is to be filled up in a numerically consistent fashion in the present invention.

In this invention, the problem of price determination is described by a novel concept of an infinite spreadsheet as pictorially shown in FIGS. 6, 7, and 8, the first two of which are side views, and the last of which is a top view, of the infinite spreadsheet.

FIGS. 6, 7, and 8 show that there are infinite number of buyers involved in the infinite spreadsheet, which, thus, extends to infinity in time. As shown in the figures, each of the buyers occupies a finite duration on the infinite spreadsheet, during the ownership of the entity to be valued.

Actually the deterministic method for solving the infinite spreadsheet of FIGS. 6, 7, and 8 deals with the nonlinear solution of a set of an infinite number of equations of the same form. Each step in FIGS. 6 and 7 or each block in FIG. 8 corresponds to one of the infinite number of equations. The variables or unknowns in these equations correspond to market factors which can be quantified. The values of all these variables are supplied or can be inferred by market data. The deterministic solution to price demands that all the inputs and outputs must relate consistently through all space and time, such as in the infinite spreadsheet; the deterministic solution establishes a mathematically consistent relationship for all the market variables in the infinite spreadsheet of FIG. 6, 7, or 8.

The non-monetary return can be inferred from the monetary return when the returns are expressed as the % rate of return. The $ monetary return can be expressed in terms of the % monetary return by the definition:

$ Monetary Return=Initial Investment×Growth Factor where the Growth Factor is defined as:

Growth Factor=1+% Total Monetary Return for the entire holding period. Expressed in an annual basis, the Growth Factor becomes Growth Factor=$(1+\% \text{ Average Annual Monetary Return})^T$ where T is the holding period in number of years.

The % non-monetary average annual return corresponds to the difference between the % total average annual return and the % monetary average annual return. The % total return is determined from the simple observation that when there is no non-monetary return, the % total return is equal to the % monetary return. Since there is no reason for the market to discriminate one investment over another, the % total return should be roughly the same for all types of investments. For example, when the risk, which is a form of negative % non-monetary return, is high, the % monetary return of the investment must also be high enough to compensate for the negative % non-monetary return, representing the risk, in order to satisfy the constant % total return of the market. Also, work which provides great personal satisfaction, which is a common form of positive % non-monetary return, is often that with low % monetary returns. It is by this ability to account for the intangible or non-monetary factors that value is quantified in the deterministic solution to value.

An additional reason for expressing the monetary return in percentage rate of return, rather than in dollar amount, is that many % monetary returns may be relatively constant for long-term investments and, thus, may serve as useful market comparable data in the future determination of price. In fact, the rate of return is discovered in this invention as an approximate time-invariant variable. On the other hand, the $ monetary return generally changes over time.

The physical conditions for the equation of the monetary return can be relaxed by noting that the actual selling of the "black box" after the holding period is not a necessary requirement. However, the investment return must still be translated into cash before accounting is possible. The actual selling can be replaced by an imaginary selling in which an investment criterion is to be satisfied. The investment criterion is specified by the combination of the % Average Annual Monetary Return and the holding period T.

The possibility of the above formulation is guaranteed by the realistic accounting process of cash transactions. The accounting process of all the expected future benefits must not miss anything or count anything more than once. It is advisable to follow the realistic situation as closely as possible in formulating a problem of nature, or of the market in this case, because real conditions can always be simulated regardless how complex they are. The deterministic method, for example, lumps all the factors affecting the price into a finite number of market variables whose mathematical relationships are established by a realistic accounting of future cash receipts in a space extended to infinity in time.

It is important to reemphasize that the above formulation has included all the factors which can possibly affect the price. The crucial condition that the formulation is all-inclusive can be seen by noting that the deterministic method describes the buying, holding and selling of a "black box," which symbolizes anything, and from which cash is received during the expected holding period and when the "box" is expected to be sold at the end of the holding period. The transaction is completely severed from the buyer after the "box" is sold; only the total cash received matters. All the factors, monetary and non-monetary, affect the transaction through the cash receipts, the percentage non-monetary return is reflected in the percentage monetary return. Thus, the picture for quantifying value is complete.

It should be noted that the deterministic solution to price could be the only way which nature allows us to approach the problem of value correctly; there are very few all-inclusive descriptions of value. The examples of all-inclusive descriptions are the deterministic solution to price and the quantitative supply and demand model, which is based on the deterministic solution.

A top layer 61 of the steps in FIG. 6 shows in practice that the resale price $P_2$ of a 1st Buyer is the same as the purchase price $P_2$ of a 2nd Buyer, that the resale price $P_3$ of said 2nd Buyer is the same as the purchase price $P_3$ of a 3rd Buyer, and that the resale price of an nth Buyer is the same as the purchase price of an n+1 Buyer all the way to infinity.

The bottom layer 62 of the steps in FIG. 6 is drawn to emphasize the fact that at each time for each price there is a different layer of steps extending to infinity. The subtle point of layer 62 is that the consideration of inputs involves the expected, as for a 1st Buyer', not the actual data of a Seller, as shown in the 1st step of the top layer 61.

It should be noted in the steps for the Seller and the 1st Buyer of layer 61 that the actual resale price of the Seller, not shown in the figure, is not necessarily equal to the appraised price $P_1$ for the 1st Buyer. The actual market data can be arrived at irrationally by the irrational market participants. In the deterministic method of this invention the expected inputs are obtained in a reasonable fashion. The appraised price can, therefore, be expected to be reasonable, too.

In the step for the Seller of layer 61, examples of inputs used in the infinite spreadsheet are listed. In the realistic accounting process, all the factors must be considered. The three essential items in the step for the Seller of layer 61 are Cash Flow, Price, and % Return, for they are the solutions sought by the infinite spreadsheet.

The lower part of FIGS. 6, 7, and 8 also shows that the direction of calculation is opposite to the direction of time, showing the time-reversed manner of calculation in accordance with the fact that price depends on the future not the past. The calculation should start from the infinite future, in theory. But, in practice, it start from a final resale price.

FIG. 7 is used to show the determination of the rate of return based on the actual past sales price $P_0$ of the Seller in layer 61. Thus, for the determination of the rate of return, $P_1'$ of the layer 62 should be equal to $P_0$, but $P_2'$, $P_3'$, $P_4'$ etc. are to be determined based on the future expected inputs.

It usually takes an iterative calculation to determine the rate of return $R_1'$ of layer 62. The objective is to determine a reasonable rate of return $R_1'$ by adjusting the future rates of returns, $R_2'$, $R_3'$, $R_4'$ etc., all the way to infinity, within a reasonable range. The survey of the rate of return for any investment should be done when the market is stable and the price is suspected to be reasonable. A detailed description for determining the rate of return is given in conjunction with FIG. 10 in later paragraphs.

FIG. 8 shows the top view of the infinite spreadsheet, the way it is normally viewed in an two dimensional environment. It corresponds to layer 61 of FIGS. 6 and 7. As mentioned before, there is one infinite spreadsheet for each time for which the price is to be determined.

Figure 9:
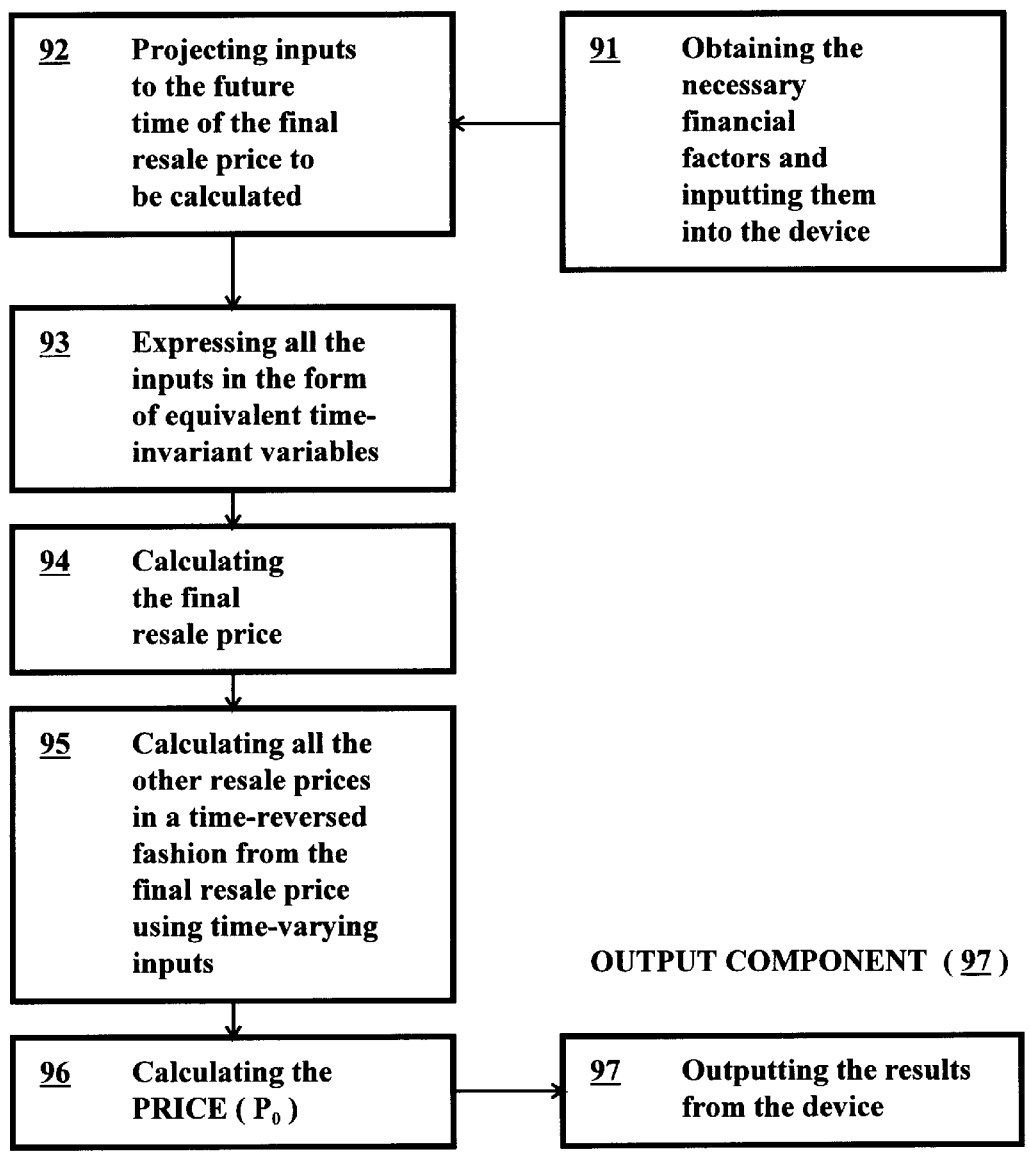
FIG. 9 is a flow diagram showing the novel procedure and the corresponding components of the device for calculating the price using equivalent time-invariant variables for all the inputs to calculate the final resale price and using the time-reversed process for calculating the time-varying part of the calculation.

Reference is made to the drawings for a detailed description of a preferred embodiment of the invention. The design specifications and the novel process of operation are the other necessary part of the present invention. Additional objects and advantages of the present invention will become apparent when the device is considered in conjunction with the device's design specifications and novel process of operation wherein;

FIG. 9 gives an overview of the novel procedure of the deterministic method of price determination and the necessary functional components to carry out the procedure. It is a flow diagram for the deterministic calculation of the price. There are three functional components, which are a block 91 representing the input component, blocks 92 to 96 representing the calculation component, and a block 97 representing output component. The function of each of the components can be performed by a physical device and/or software. For example, the input component can be a computer keyboard, the calculation component can be the software program in a computer, and the output component can be a printer.

There are seven major stages represented by the seven blocks 91 to 97 in FIG. 9 in the procedure for price determination. Each of the blocks 93, 94, and 95 are further explained in detail in FIGS. 11, 12, and 13.

Figure 10:
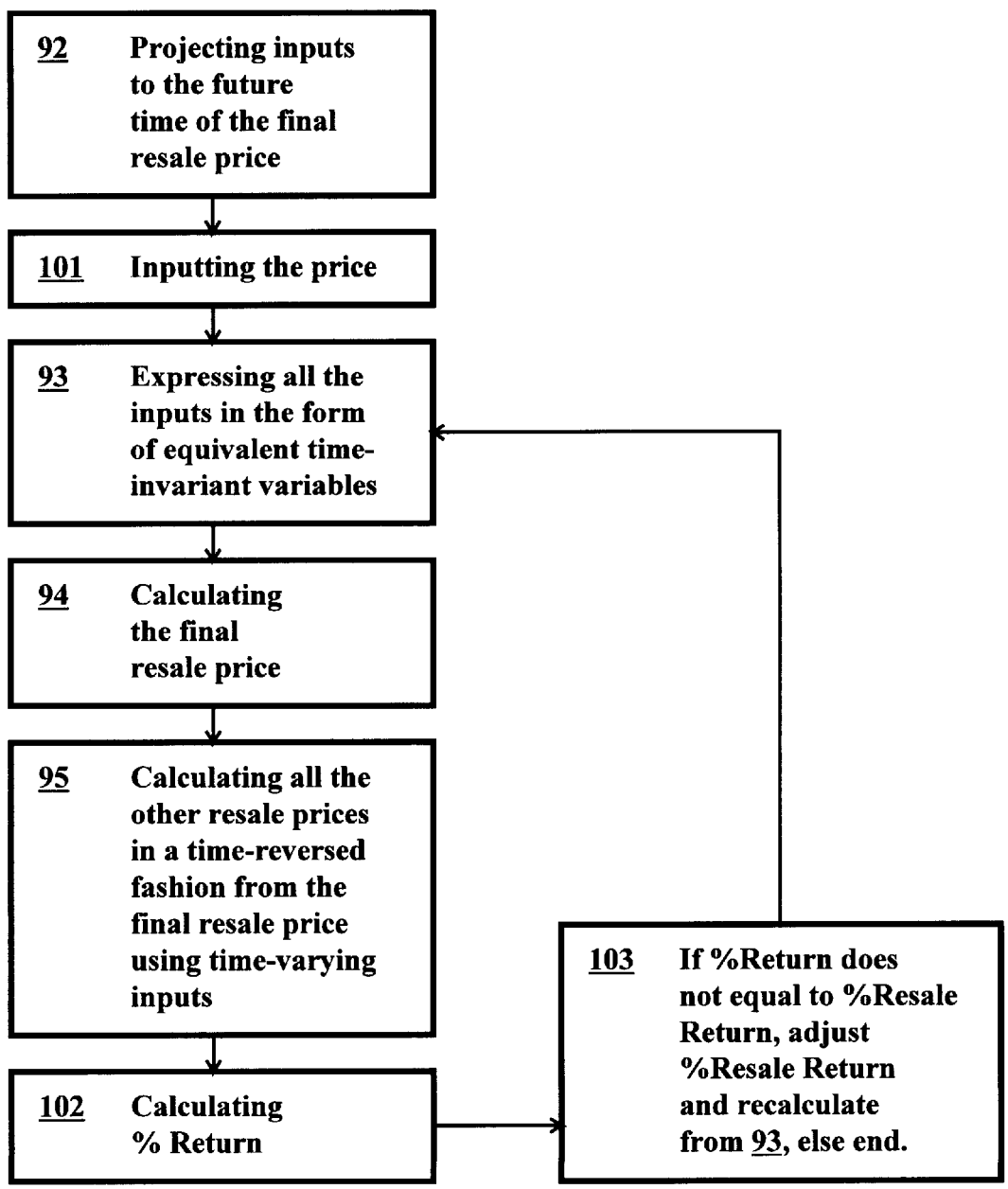
FIG. 10 is a flow diagram for the iterative calculation of the expected average rate of return on investment when the actual or expected past sales price is known.

FIG. 10 is similar to FIG. 9 and is for the deterministic calculation of the expected average rate of return on investment when the actual or expected past sales price is used as an input. FIG. 6 gives a physical picture of FIG. 9, and FIG. 7 gives a physical picture of FIG. 10. The reasons for choosing the procedures described in FIGS. 9 to 13 are given in the following theoretical description of the deterministic method of price determination with references to the related drawings.

The object is to assist the determination of the price.

Price depends on the expected investment return. Investment return is the sum total of cash flows accumulated over the holding investment period plus the cash from resale. The difficulties are:(1) the resale price is needed to determine the cash from resale which, in turn, is needed to determine the price, and (2) in order to determine the resale price in (1), another resale price is needed for determining the cash from resale corresponding to this resale price, and, thus, there is a perpetuating chain of dependence of resale prices on their corresponding resale prices to the infinite future in time.

Basically, the way to overcome the two difficulties above is to design a system or device that works backward in that it starts from sufficiently far in the future and works back to the present as described in blocks 92 to 96 in FIG. 9.

As shown in FIG. 9, the design specifications of any device to be used for the determination of price should follow the general process of operation outlined below:

(1) From the constant or time-varying growth rates projecting the income and expenses and other necessary financial factors to a sufficiently distant future, as described in block 92 in FIG. 9, after which the financial situation can be approximated by an equivalent stabilized condition.

(2) Under the stabilized condition, the growth rates of all the inputs are constant and, in particular, the ratio of price to net income, where net income is defined as income minus vacancy and minus expenses, is a constant, as described in block 93 in FIG. 9.

(3) The final resale price can be calculated knowing that the price and the net income increase at the same rate under a stabilized financial situation, as shown in block 94 in FIG. 9.

(4) Under variable financial situations, all the other resale prices can be calculated from the final resale price, as indicated by block 95 in FIG. 9. The resale prices can be determined by a iterative process until the expected rate of return for the trial price equals the calculated rate of return. Using the price for the future year as the resale price in the determination of the price for the year prior to the future year by the amount of the investment period. Thus, the device works in a backward order in time, that is from the future year back to the present under variable financial situations. Usually the iterative process must be done for each backward advancement in investment period or any suitable period. The future year in step (1) above can be set arbitrarily far from the present; therefore, this process of price determination is, in theory, completely general.

(5) Determining the present price in the final backward step making sure that the future year when the backward advancement starts is equal to the sum total of all the investment periods added to the present year, as indicated by block 96 of FIG. 9.

The inputs to the valuation system should be relatively stable compared to the price, which is to be determined; these inputs should be approximate, equivalent time-invariant variables. The basic idea of this valuation process is to use stable inputs to determine the unstable price, generally a time-variant variable. One approximate time-invariant variable of particular interest is the expected rate of return on investment. It is expressed in percentage form instead of in actual dollar amount of the return on investment because the rate is an approximate time-invariant variable and the dollar return itself is a time-variant variable. Other inputs must be similarly expressed as approximate or equivalent time-invariant variables, especially in view of the practical problem of expressing all inputs in a semi-infinite time space.

FIG. 10 shows the same calculation component of FIG. 9 with some modifications for the calculation of the rate of return, instead of the price. Blocks 92, 93, 94, and 95 in FIG. 10 remain the same as those in FIG. 9. Blocks 96 in FIG. 9 for calculating the price is replaced by blocks 101, 102, and 103 for inputting the price in block 101, calculating the rate of return in block 102, and controlling the iterative loop, which follows the path of blocks 103, 93, 94, 95, and 102, as shown in FIG. 10.

FIG. 10 uses the most common case of constant rate of return for all the price as an illustration of the calculation for the rate of return. Often, different types of investors may be involved in one process of price determination, and different expected rates of return and also different investment periods will be used.

Using the common case in FIG. 10, the objective of the iterative calculation is to find a constant rate of return. In FIG. 10, all the resale rates of return are adjusted in the iterative calculation so that the calculated rate of return for the first investment period will equal to the resale rates of return, as indicated by block 103 of FIG. 10.

In fact, one of the main tasks in price determination eventually will be to determine a reasonable range for the rate of return on the investments being undertaken. Once the rate of return has been determined, the final decision will depend simply on whether the determined price is sufficiently positive or negative, indicating respectively positive and negative values of the proposed project. Some important average rates of return are given in FIG. 11.

These rates of return can only be obtained from a deterministic valuation system using the actual sales price under stable economic conditions as an input as in FIG. 10. The expected averaged rate of return is more stable than the inflation rate because the rate of return reflects the long-term average inflation rate. Due to their stability, the rates of return in FIG. 11 can be used for cross references and for comparison with other newly surveyed value of the rates of return.

The expected rates of return are constants, or approximate time-invariant variables, with small plus or minus adjustments to reflect small variations within a given type of investments and with gradual adjustments for long-term changes in economic situations. But, not aware that the expected rates of return are constant, most financial consultants still use the final calculation for the rates of return as the deciding factor.

What should be calculated to help make the final decision of whether a project is worthwhile is the worth, or the price, not generally the return. If the price is greater than the cost of the project, or if the worth is sufficiently greater than zero when the cost is already figured into the inputs of the valuation, the project should be carried out. Even when people insist on calculating for the rate of return, which needs an assumption of an arbitrary price, or a given—generally incorrect—market price, they still need to compare their calculated rates to the rational rates, which can only be surveyed when a deterministic valuation method is available, in order to make a decision.

Figure 13:
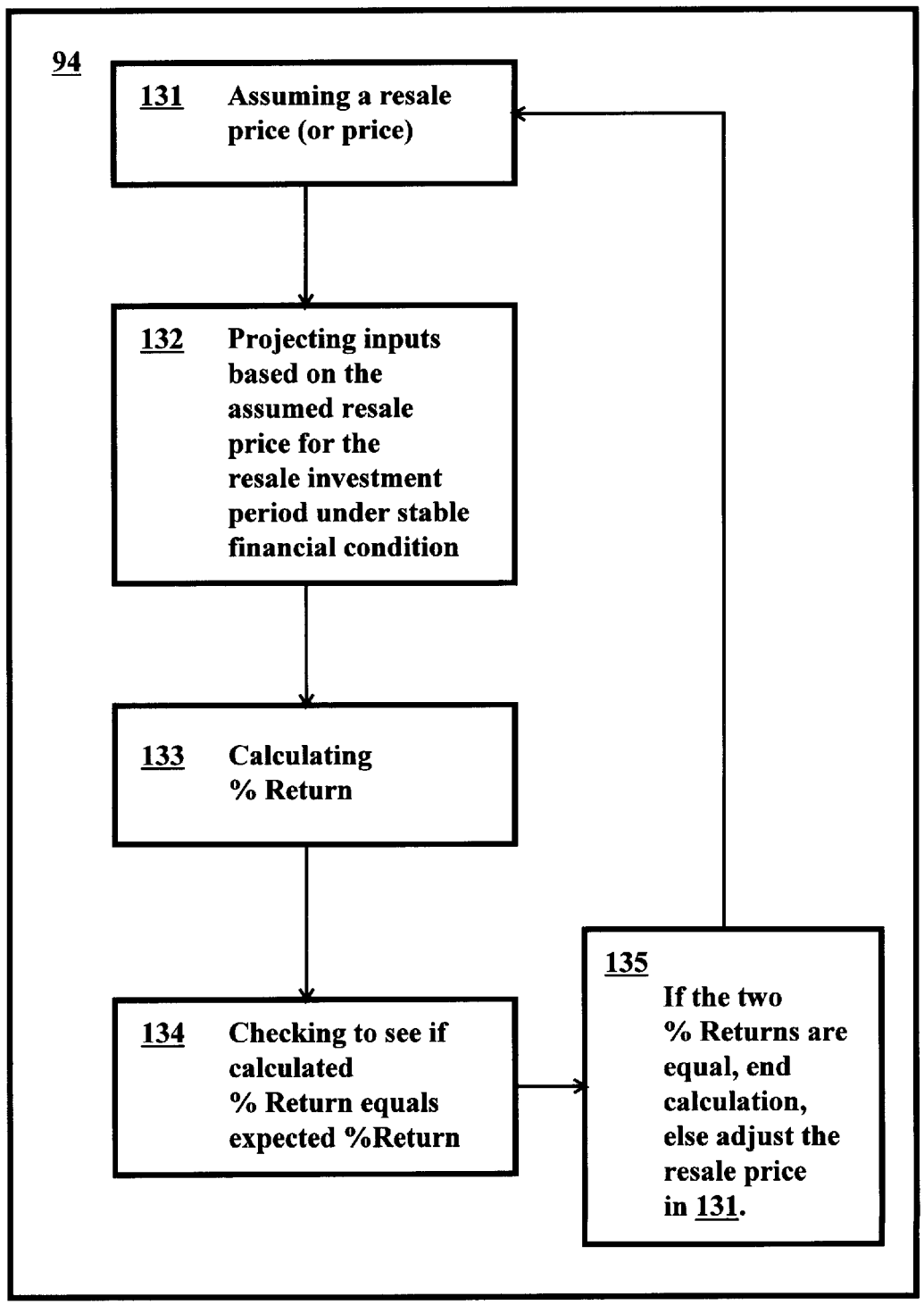
FIG. 13 is a flow diagram of block 94 of FIGS. 9 and 10 showing the iterative calculation for the final resale price by adjusting the resale price until the calculated rate of return equals the expected rate of return.
Figure 14:
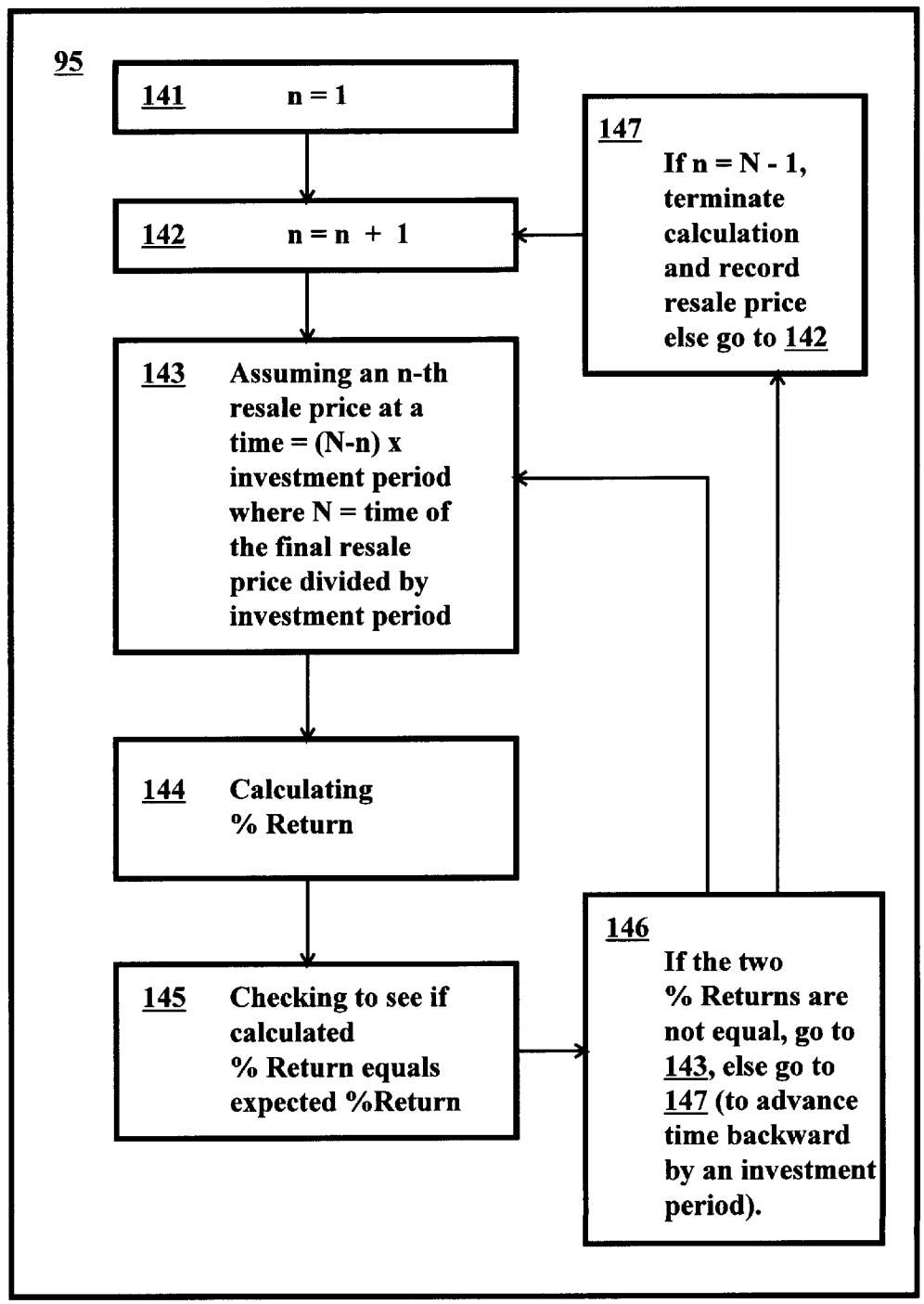
FIG. 14 is a flow diagram of block 95 of FIGS. 9 and 10 showing the time-reversed and iterative calculation for all the other resale prices using the final future resale price and the time-varying inputs.

The detailed descriptions of blocks 93, 94, and 95 in FIGS. 9 and 10 are given in FIGS. 12, 13, and 14 respectively. FIG. 12 relates to the stabilization condition, in which all the inputs are expressed in the form of equivalent time-invariant variables. FIG. 12 actually gives an example of a complete list of all the equivalent time-invariant inputs.

FIG. 12 shows that all the items from (1) to (22), except (11) can be expressed as equivalent stable inputs. Item (11) causes problems because it is specified by man-made laws, which is in conflict with the corresponding laws of nature. As a simple example, if a maximum tax deduction is set at $25,000 by law, due to inflation this $25,000 must be adjusted in the future and, therefore cannot be correct forever in a calculation involving infinity. The following paragraph will give an example showing from where the items in FIG. 12 come.

The equation for the CASH INVESTMENT RETURN is:

CASH INVESTMENT RETURN=SUM OF CASH FLOWS+ CASH FROM RESALE.

As examples of the actual elements of the above equation, the CASH INVESTMENT RETURN can be defined as CASH INITIAL INVESTMENT (or DOWN PAYMENT) times the quantity, (1+% INVESTMENT RETURN) to the power of the INVESTMENT PERIOD. Also, the SUM OF CASH FLOWS can be NET INCOME−FINANCING DEBT PAYMENT+TAX BENEFITS, and the CASH FROM RESALE can be RESALE PRICE−REMAINING DEBT−RESALE EXPENSES−GAIN TAX. The SUM OF CASH FLOWS is generally dependent of the price, and the CASH FROM RESALE is generally dependent of the price and the resale price. However, when the price increases at the same rate as the net income, the resale price is just a known constant times the price. Thus, the equation for the CASH INVESTMENT RETURN has only one unknown factor, namely the price, and becomes determinable when all the other financial factors have been assigned.

The assumption of the stabilization condition depicted in FIG. 12 at the time boundary involving infinity will be one of the most controversial, and novel, points of this invention. However, today computers can easily calculate hundreds or even thousands of years back from the future within a matter of minutes or even seconds. And the worst case scenario would be to allow the expected inputs to vary in 500 or 1000 years. Since it took 500 to 1000 to change from the age of religion to the age of science, it can be speculated that in 500 years human civilization could be in the age of social science and the economy could well satisfy the stabilization condition.

Finding the exact conditions under which the ratio between the price and the net income is a constant is a mathematical process, which also depends on the actual market condition or the acceptable market model. The constancy of the ratio of the price to the net income is not always guaranteed under general market condition, and, therefore, should always be verified by analytical or numerical processes before the fact is used. The validity of the constancy of the ratio increases as the market becomes more stable as a result of our improved understanding of the price system, in particular, from this invention.

A correct method of price determination must take into consideration all the factors that can possibly affect price and must relate all these factors from now to infinity in a mathematically consistent fashion. The present invention is a practical application of such a method. The basic concept used is based on the general principle of investment return, which simply states that for each action taken (investment), there is an expected reward (return). The same principle also describes motivation.

The quantity to be solved is the price. The expected condition is the following: Expecting a certain investment return, a buyer 1 purchases a certain commodity or service. Said buyer 1 keeps it for $T_1$ years after which it is sold to a buyer 2, who keeps it for $T_2$ years. After $T_2$ years said buyer 2 sells it to a buyer 3, who keeps it for $T_3$ years and then sells it to a buyer 4. Either this process continues to infinity, such as in the case of a corporation, or the commodity or service is totally used up somewhere along the process, in which case considering the process to infinity is no longer necessary.

An important fact to be realized in the above process is that the description is all-inclusive, that is that it has included all the factors that can possibly affect the return or the price when the process is taken to infinity.

The basic equation for the buyer 1 is of the form:

$$\$R = (\text{expected}) \text{ Cash investment return} = CF + CR$$

where CF=Cumulated cash flow
=Cumulated sum over $T_1$ years of
(Income−Expenses−Loan payments+Tax benefits+etc.)
and CR=Cash from resale
=Resale price−Remaining loan−Gain tax−Sales fee to be paid by buyer 1+etc.

The expected average annual percentage investment return, %R can be physically defined as a simple interest compounded annually. %R relates to $R through the expression:

$$\$R = I \times (1 + \%R)^{T_1}$$

where I=Initial investment
=$P_1 - L_1 + E_1$+etc.
where $P_1$=Price paid by the buyer 1,
$L_1$=Loan borrowed by the buyer 1, and
$E_1$=Additional sales expenses to be paid by the buyer 1.

The reason that %R is used, instead of, say, $R, is that %R may be relatively constant for any given type of investment and, thus, may serve as a useful market comparable variable of the inputs in the future determination of the price.

The provision, which allows the comparison of any and all the factors affecting the price, unifies the income approach, which determines the price based on income, and the market comparison approach, which previously only compares just the prices. The unified approach provides means for comparing economic factors, such as rates of rent increases, rates of investment returns, interest rates, expenses to income ratios, etc., as well as the prices, which may not always have suitable comparable data. With the correct method and all the inputs obtained directly from the market, it should become almost impossible not to predict market prices.

The total return, $TR, is the sum of the monetary return, $R, and the non-monetary return, $NR. The corresponding %TR of $TR should be relatively constant for all types of investment because the market should treat all investments the same. %TR can be determined from the simple fact that %TR=%R when there is no non-monetary return in the investment, that is $NR=0. Value judgment can be identified as the non-monetary return, and, thus, can be quantified from the known %TR and %R. One of the first obstacle encountered in social science is the problem of value judgment, which, used to be considered subjective, has been quantified in the above method. In fact, social science can be defined as knowledge involving value judgment because social interactions are motivated by value judgment. It could almost be considered self-evident the statement that the purpose of any rational action taken by an individual or a society is to enhance value, if not for now, for the future. Thus, in the absence of a correct method for determining value, the fashion of social progress can at best be described as a random walk. Since the determination of value provides the proper direction for social progress, price should be considered the ultimate determinant of social priorities. Furthermore, of all the priorities, the search for a correct method of price determination should be among the first, since it is based on the availability of such a method that the other priorities can be properly assigned.

Expressing in terms of %R, the equation for the buyer 1 becomes $$I \times (1 + \%R)^{T_1} = CF + CR$$

In general, I and CF are dependent of the price $P_1$ and CR is dependent of $P_1$ and the resale price, $P_2$. Thus, there are two unknown prices for only one equation. For the buyer 2, $P_2$ becomes the price, and a new resale price $P_3$ is introduced. The holding period, $T_1$, is replaced by $T_2$. Similar equations as the above can be written for all the future buyers. However, every time an equation is introduced a new unknown price is added to the system, and the number of unknown prices is always one greater than the number of equations.

When the problem is considered only for a finite time period, no matter how long or how many resells, it is generally possible to make the price $P_1$ arbitrarily large or small by adjusting the last resale price. Thus, the solution to the above problem is arbitrary when considered only for a finite time period.

Using the equation for a buyer j, it is possible to express $P_j$ as a function of its resale price $P_{j+1}$ $$P_j = P_j(P_{j+1}).$$

Similarly, $$P_{j-1} = P_{j-1}(P_j(P_{j+1})),$$

$$P_{j-2} = P_{j-2}(P_{j-1}(P_j(P_{j+1}))), \ldots$$

and finally $$P_1 = P_1(P_2(P_3 \ldots (P_{j-3}(P_{j-2}(P_{j-1}(P_j(P_{j+1}))))) \ldots )).$$

Thus, if $P_{j+1}$ is known, $P_1$ can be determined.

For buyer i, where i is greater than j, an equivalent stabilized financial condition is approximated. This approximation is by no means unique. That is that there could be other possibilities. The mathematical requirement of stability is that the price is a linear function of the net income $NI_i$ that is $$P_i(A \times NI_i) = A \times P_i(NI_i)$$

where A is a constant. Thus, if $NI_k = B \times NI_i$ where B is a constant, then $$P_k(NI_k) = P_k(B \times NI_i)$$

$$= B \times P_i(NI_i)$$

$$= (NI_k/NI_i) \times P_i(NI_i).$$

In particular, $P_{j+1} = (NI_{j+i}/NI_j) \times P_j$ supplies the additional equation without introducing any additional unknown.

To illustrate the mathematical process involved in checking the mathematical self-consistency of the stability assumption, the following example is given. Without loan and tax considerations, the equation for cash investment return becomes for a buyer n $$P_n \times (1 + \%R)^{T_1} = NI_n \times \text{Sum of } ((1 + \%N)^i \text{ from } i=1 \text{ to } i=T_n) + P_{n+1}$$

where %N is the constant rate of increase of the net income. Using $$NI_{n+1} = (1 + \%N)^{T_n} \times NI_n \text{ and } P_{n+1} = (NI_{n+1}/NI_n) \times P_n,$$

the above equation becomes $$P_n \times (1+\%R)^{T_n} = NI_n \times \text{Sum of } ((1+\%N)^i \text{ from } i=1 \text{ to } i=T_n) + (1+\%N)^{T_n} \times P_n$$

$$NI_n = \frac{\text{Sum of } (1+\%N)^i \text{ from } i=1 \text{ to } i=T_n}{(1+\%R)^{T_n} - (1+\%N)^{T_n}}$$

Thus, the price is a linear function of the net income, and the assumption has no contradiction and is mathematically self-consistent.

For more complicated market conditions involving loans, taxes, etc., either numerical or analytical methods for checking self-consistency can be used. In the case of using numerical methods of checking, the results, which are already known, can be checked by straightforward calculations. When analytical verification of self-consistency is used, it is usually easier to check the mathematical self-consistency factor by factor; for example, the tax and the loan effects can be checked separately, as it is done for the net income above, realizing that linear effects can be superimposed. Other methods of verification are also possible. The variation of market conditions is inexhaustible.

The justification of the stabilization condition is more of a task of properly defining the problem rather than one of finding the solution. Thus, the goal is to find a problem that is a reasonable description of the actual market condition and that will satisfy the stabilization condition, such as one having all the growth rates being constant.

The method used in this invention is completely mathematically consistent. That is that mathematically the method is infallible. Physically the validity of the method, upon which this invention is based, relies on the correctness of the observation that for any fluctuating market condition, there can generally be found an equivalent stabilized condition. The approximation by a stabilized condition is especially good when the error in estimating the expected investment return diminishes with the increase in the time of the final resale price.

FIG. 13 is a detailed flow diagram for calculating the final resale price as indicated by block 94 in FIGS. 9 and 10. FIG. 13 shows an iterative loop starting from block 131, where a trial final resale price is assumed. The calculation then moves to block 132, where the inputs are projected based on the assumed resale price under a stable financial condition, to block 133, where the rate of return is calculated based on the assumed resale price, to block 134, where the calculated rate of return is compared to the expected rate of return. The calculation finally moves to block 135, where the calculation is terminated if the two rates are within a tolerable accuracy of each other or has to restart from block 131 with a different trial final resale price, if the two rates are not within the acceptable range of accuracy.

FIG. 14 is a detailed flow diagram for calculating all the other resale price as indicated by block 95 in FIGS. 9 and 10. FIG. 14 shows two iterative loops initiated by block 141, where a counter n is set to 1. The first iterative loop starts from block 142, where n is advanced by 1, and which initiates the second iterative loop. The second iterative loop starts from block 143, where an nth trial resale price is assumed at a time equal to the investment period multiplying by the number of investment period from the present. The calculation then moves to block 144, where the rate of return is calculated based on the assumed resale price, and to block 145, where the calculated rate of return is compared to the expected rate of return. The calculation finally moves to block 146, where the calculation is moved to block 147, if the two rates are within a tolerable accuracy of each other or has to restart from block 143 with a different trial final resale price, if the two rates are not within the acceptable range of accuracy. In block 147, if the time is one investment period from the present, the calculation is terminated, and, otherwise, the calculation moves to block 142.

Block 96 and 97 in FIGS. 9 and 10 represents the calculation of the present price. The procedure is similar to the inner loop made of blocks 143, 144, 145, and 146 in FIG. 14. For the output component block 97, the items to be saved from the calculation are the price and all the resale prices, because from these prices the infinite spreadsheet can be filled to as far as the resources of the device permit.

To summarize FIGS. 12, 13, and 14, the steps of operation, which is necessary for the proper application of the device, are (1) Choosing the appropriate set of input values of financial factors in the determination of the final resale price,
(2) Projecting the net income to the last or Nth year after which a stabilized financial condition can be approximated where N should be chosen so that it is an integer multiple of the investment period or equals the sum of all the investment periods,
(3) Finding the resale price by an iterative process using inputs derived from a stable financial condition,
(4) Using the final resale price found in (3) as the resale price in the determination of the price for the (N−T$_1$)th year, where now T$_1$ represents the investment period for the next to the last resale price, and T$_n$ represents the investment period for the nth to the last resale price,
(5) Choosing the appropriate inputs of financial factors in the determination of the price for the (N−T$_1$)th year,
(6) Picking a best guess of a trial price for the (N−T$_1$)th year,
(7) Projecting the cash flows and the sum of cash flows from the trial price, the projected income, expenses, and other financial factors,
(8) Adding the last year cash from resale, which can be determined from the final resale price, to the sum of cash flows from (7),
(9) Checking to see if the (N−T$_1$)th year price is within tolerance range of accuracy of the trial price from (6),
(10) If (9) does not check, repeating (6) to (9) until (9) checks which means that the trial price picked is the correct price for the (N−T$_1$)th year,
(11) Using the (N−T$_1$)th year price found in (10) as the resale price in the determination of the price for the (N−T$_1$−T$_2$)th year where T$_2$ is the investment period from the (N−T$_1$−T$_2$)th year to the (N−T$_1$)th year,
(12) Repeating (5) to (10) for the (N−T$_1$−T$_2$)th year,
(13) Advancing backward in time in the steps as in (5) to (11) to find all the required prices,
(14) Determining the present price in the final step, if the sum of all the investment periods, T$_1$, T$_2$, T$_3$, T$_4$, etc., equals N.

FIGS. 15, 16, 17, 18, 19, and later 21 and 27 are related to a sample appraisal using hypothetical inputs for a real estate investment involving development of land and sales and lease back. In FIG. 15, Item #2 Annual Gross Income of the input represents step increase of income every five years for twenty years, and thereafter the rent increases at 4% per year. There is also an adjustment of rent at the end of twenty years in the amount of minus 10% in Item #6 at the bottom of FIG. 15 to correspond to the expected realistic rent in twenty years. Since it is a sale and lease back, where an owner sells a property to a buyer and then leases it back under a long-term lease, there are no vacancies and no expenses in Items #3 and #4.

The sample appraisal in FIGS. 15, 16, 17 and 18 illustrates the deterministic method in actual practice. Two other items of interest are #29 and #30 in FIGS. 15 and 18 for the investment periods and #31 and #32 in the same figures showing the rates of return. A rate of return of 15% per year is assumed. Price is not shown in the inputs in FIGS. 15 and 18 and is to be determined.

On the output page in FIG. 16, Item #16 Price is found to be $1,061,540. Both the inputs and the outputs extend to infinity in time. However, by expressing the inputs in the form of market invariant variables, there is no need to print out all the inputs, and the outputs can be printed out to infinity, in principle. To check that the outputs satisfy the requirements of the inputs, Item #24% Average investment return for the fourth year at the most bottom right of FIG. 16 shows a value of 15.00% as required by Item #32 of the inputs in FIG. 15. FIG. 16 is a realistic representation of an infinite spreadsheet.

FIG. 17 is the graphic representation of the income and the price and the resale prices of the sample input and output in FIGS. 15 and 16 respectively. FIG. 18 is a demonstration of the assumption of equivalent time-invariant variables for the sample price determination of FIGS. 15, 16 and 17. It turns out that the equivalent rate of increase of the net income is 6%, in agreement with the market rate of increase of net income.

FIG. 17 gives a graphic example of the income and the resulting prices of the deterministic method of price determination. The income is a typical sale and lease back situation in real estate transaction, where a long-term lease is set by the seller, who will also be the lessee, at the time of the sale. The top graph 171 of FIG. 17 shows a 20 years lease which increases in steps every five years. The first 20 years the income is time-varying. After 20 years, a stabilization condition is assumed with a reasonable initial income at the year 20. The step-wise income curve produces a smooth price curve as shown in graph 172 of FIG. 17.

An important point to be noted in FIG. 17 is the time of the final resale price. This time should obviously be greater than the time-varying period. But, it does not necessarily have to start right as the end of the time-varying period. In graph 172 of FIG. 17, the final resale price is shown to start in about the 28th year, which, assuming a investment period of four years, is seven times the investment period. Laboratory tests of this kind of calculation indicate that in an inflationary economy, with inflation greater than three percent, choice of the time of the final resale price has very little effect on the present price, if the time is greater than 20 years.

FIG. 19 shows an example of market comparable survey using the real estate and the business investment markets and is a very important part of the overall deterministic method of price determination. The survey makes the inputs not only reliable, but also deterministic. For instance, each of the six listings in a Section 192 of FIG. 19, must use the same, or similar, value for the rate of increase of net income %N, whose definition is given in a Section 191 of FIG. 19.

To be noted in Section 192 of FIG. 19 are the first two records, which correspond to the sale and lease back transaction of FIGS. 15, 16, 17, 18, and 21. In particular, Record #1 is derived directly from FIG. 18, and Record #2, from FIG. 21. In practice, FIG. 19 could provide one of the most useful evidences to convince investors the validity of the price calculated using the deterministic method of price determination.

Furthermore, the real estate market due to its very mature information system usually provides one more than the number of input data which are required by the deterministic valuation system. Market surveys using the deterministic method of price determination have shown that the market price is generally inconsistent with the investment expectations; the irrational market participants, who do not have access to a rational method of valuation, have created an irrational market. Thus, it can also be suspected that the discrepancy between the market price and the calculated price has been the main cause of most economic disasters in the past.

Since the market price is generally incorrect, its availability, in principle, is not always necessary in valuation practices. In particular, the value of intellectual properties, for example, even without a market can be determined by the infinite spreadsheet where the rate of return is inferred theoretically from a comparison with the known rates of return surveyed from the market. Adjustments can be made by extrapolation and only approximate value is needed to make the rate of return a reasonable input.

From the hypothetical appraisal, it can be seen that the problem of valuation in real estate finally boils down mainly to the collection of input data for Item #2, the income, and Item #3, the expenditure. Valuation is further simplified by the flexible requirement that the income and the expenditure need only to be reasonable estimations. The accuracy will improve naturally with experience. However, the decisions will not be affected significantly by the improved accuracy, for social science, unlike physical science, does not seem to need to be exact; it only needs to be quantitative and reasonably accurate.

Figure 20:
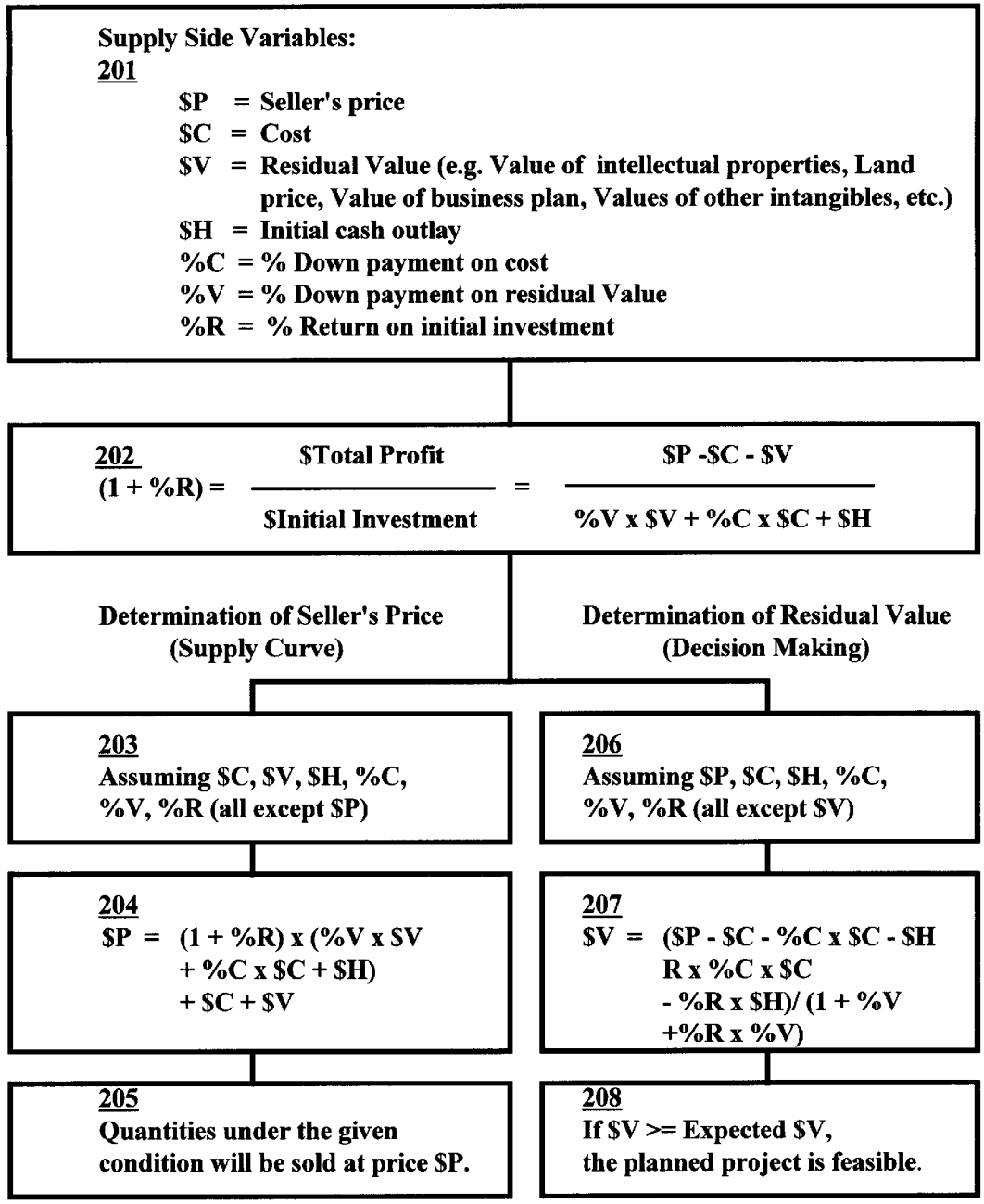
FIG. 20 is a flow diagram for the cost approach calculating deterministically the price or the residual value which can represent intangibles, such as intellectual properties, such as an idea or a proposal for a research project, or tangibles, such as land exemplifying a deterministic method for constructing the supply curve in the supply and demand model.

FIG. 20 is a flow diagram for the cost approach intended to calculate deterministically the price or the residual value. The cost approach corresponds to the supply curve of the supply and demand model. The supply side variables are:

$P=Seller's price $C=Cost $V=Residual Value (e.g. Value of intellectual properties, Land price, Value of business plan, Values of other intangibles, etc.)

$H=Initial cash outlay

%C=% Down payment on cost

%V=% Down payment on residual Value

%R=% Return on initial investment

The equation that relates all the above variables is the same equation used in the deterministic method, namely the equation for calculating the monetary return:

$$(1 + \%R) = \frac{\$\text{Total Profit}}{\$\text{Initial Investment}} = \frac{\$P - \$C - \$V}{\%V \times \$V + \%C \times \$C + \$H}.$$

In the determination of the seller's price used in the supply curve, all the variables $C, $V, $H, %C, %V, and %R are to be assumed, except $P, which is to be determined. The equation for the price is $P=(1+%R)×(%V×$V+%C×$C+$H)+$C+$V.

The number of quantities for the price determined can be more than one. The price should be divided by the number of quantities to arrive at the price per quantity. Thus, the quantities under the given condition will be sold at price $P/Number of quantities.

In the determination of residual value for decision making, all the variables $P, $C, $H, %C, %V, and %R will be assumed except $V, which is to be calculated using the equation:

$$\$V = \frac{(\$P - \$C - \%C \times \$C - \$H - \%R \times \%C \times \$C - \%R \times \$H)}{(1 + \%V + \%R \times \%V)}$$

In the above equation if $V>=expected $V, the planned project is feasible.

Because of the prevalent misuse of the cost approach, a simple illustrative example is given in FIG. 21, which is related to the example of the deterministic method given in FIGS. 15, 16, 17, 18 and 19. If it costs a real estate developer $400,000 to build a warehouse intended for sale and lease back, the developer would not sell the warehouse for $400,000, but for $1,000,000 as indicated by FIG. 21. The point here is that the cost is not the price.

In order to determine the price from the cost, FIG. 21 shows that the values of land, the Initial cash outlay, the % Down payment on cost, the % Down payment on residual value, and the % Return on initial investment are needed. Usually, in an actual investment, it would be more logical to determine the land price instead of the price because the land price is the residual value, which represent the final remaining value after satisfying all the market requirements. Also, the price of $1,000,000 is valid only if a buyer is willing to pay $1,000,000 for the property.

The correct procedure in price determination should again be starting from the infinite future and work backward to the price of the land. More exactly, the deterministic method should start from the final resale price beyond the twenty years of the lease, in the twenty eighth year. The calculation proceeds backward in time to the determination of the price, which is found to be $1,000,000. From this price the land price is calculated. If the calculated land price is greater than the expected land price, the development project should be carried out; otherwise, it should be canceled.

In FIG. 21, the cost approach is used in the determination of the land price based on the residue of the developed property over the construction cost using the equation for the monetary return. The inputs for the determination of the land price are the price of the developed property, which is determined by the deterministic method, the cost, the required return on investment, and all the other economic factors. The land price is found to be $262,500.

If the inputs used are realistic values, the calculated result of a positive land price is in favor of carrying out the development project. Actually the size of the positive price will decide how much leeway the project will have. Past experience in investment analyses and valuation seems to indicate that the accuracy of the inputs is usually of secondary importance; as long as they are within a reasonably accurate range, they will not be the eventual cause of failure. When market over-valuation occurs, it is generally impossible to justify an investment decision with any set of reasonable inputs.

The deterministic solution to price unifies the three traditional approaches of real estate appraisal. The deterministic method has successfully predicted real estate prices. The real estate market is easy to predict because of the size of the market and the long-term nature of real estate investments. The large size of the real estate market makes it less susceptible to outside forces or effects of microeconomics than most other markets. The long-term nature of the investments makes the real estate market relatively stable compared to other business sectors.

Most real estate appraisals based on cash flow analyses and economic consideration can make the price arbitrarily large or small by manipulating the value of the resale price. The real estate valuation method based on the infinite spreadsheet does not need to ask for any resale price or any rate of price increase in the determination of the price. Resale prices in the deterministic method are subjected to exactly the same mathematical relationships as the price and, thus, are determined in the same way as the price is determined.

What makes the deterministic method non-arbitrary is that once all the inputs are assigned, the price is non-arbitrarily determined according to rigorous mathematical relationships between the price and the inputs. Furthermore, most of the inputs to the deterministic method cannot be arbitrarily assigned; they arc market comparable data which are non-arbitrarily determined from expected or sales data, including known prices.

The deterministic solution to real estate appraisal has combined the three traditional approaches of real estate appraisal into one unified method of appraisal. The traditional market comparison approach compares only the price, but the deterministic method has been designed to compare, in addition to the price, the economic factors affecting the price as illustrated in FIGS. 11 and 19. The results of the comparisons can then be used as inputs in the income approach, which corresponds to the equation for the monetary return, to determine the price or any other economic variables when the price is known from sales data as described in FIGS. 9 and 10 and also in FIGS. 12, 13, and 14.

The unified method is represented by the deterministic method described in FIG. 9 or jointly by the income approach described in FIGS. 12, 13, and 14, the market comparison approach in FIG. 19, and the cost approach in FIG. 20. Instead of appraising three different prices individually using the three traditional approaches, the unified method has managed to put each approach in its proper place within this one single method and has, finally, reconciled, in a natural way, the three generally different prices for the same property into one single price. Thus, no longer will there be the need for the appraiser to face the embarrassing situation of having to choose one out of the three, often conflicting, prices, whose determination could be required by traditional appraisal standards.

The deterministic solution to price has extended its applications beyond real estate valuation into economics. The central problem of economics is price determination. For example, an economic stagnation is the result of an over-valued market, in which buyers refuse to buy, or sellers refuse to sell. The deterministic solution to price can solve the problem of economic stagnation by providing market participants with a method for determining the correct prices which are justified by rates of returns on investment.

For example, two of the main problems of the economy is over-valuation and under-valuation, which may lead to the over-valuation. Over-valuation occurs when the actual market price, or the selling price, is over the economic value. The economic value is a theoretical price determined based on economic considerations; it is a price justified economically.

The problem with the market price is that its responses to economic changes are often inflexible and/or delayed. The market price is usually a price which has not fully responded to the economic changes and thus is either higher or lower than the economic value. For example, a change in tax laws changes the economic value immediately but affects the market price only gradually.

One of the most important economic considerations in the determination of the economic value is the expected rate of return on investment. The rate of return plays a central role in the working of a social economic system. In economic theories, it can serve to unify monetarism and Keynesian economics. For example, fiscal and monetary policies can be explained from the point of view of the rate of return. For both types of policies, the basic idea is to stimulate or slow down social and economic activities by changing the availability of credit or resources. Fiscal policies are designed to artificially increase or decrease the rate of return. Monetary policies adjust the relative levels of various "interest rates," of which the rate of return is but one. Both monetary and fiscal policies try to affect the price indirectly, while the deterministic solution to price goes directly to the source of the problem, namely, the price. The problem with these indirect approaches for fine-tuning the economy is that their consequences or side-effects are often unpredictable or unexpected and, thus, may become destabilizing factors and contribute to uncertainty in the economy.

Many economic trends can be explained by comparing the various "rates of returns." The interest rate is a return on money; the inflation rate is a return on goods and services other than money, the universal goods and services. From an investment point of view, the logical order of these rates of return is that the rate of return on investment should be higher than the interest rate in order for people to borrow money for their investments, and that the interest rate should be higher than the inflation rate in order for lenders to be willing to lend. This constraint on the relative levels of the three rates is the main reason that inflation cannot be too high; inflation should be lower than the interest rate which should be lower than the long-term rate of return, which is an approximate time-invariant variable and, therefore, provides an inflexible upper ceiling for the inflation rate. Since only the deterministic method can correctly determine the rate of return on investment, only the deterministic solution to price can explain fully the main problem with high inflation.

Figure 22:
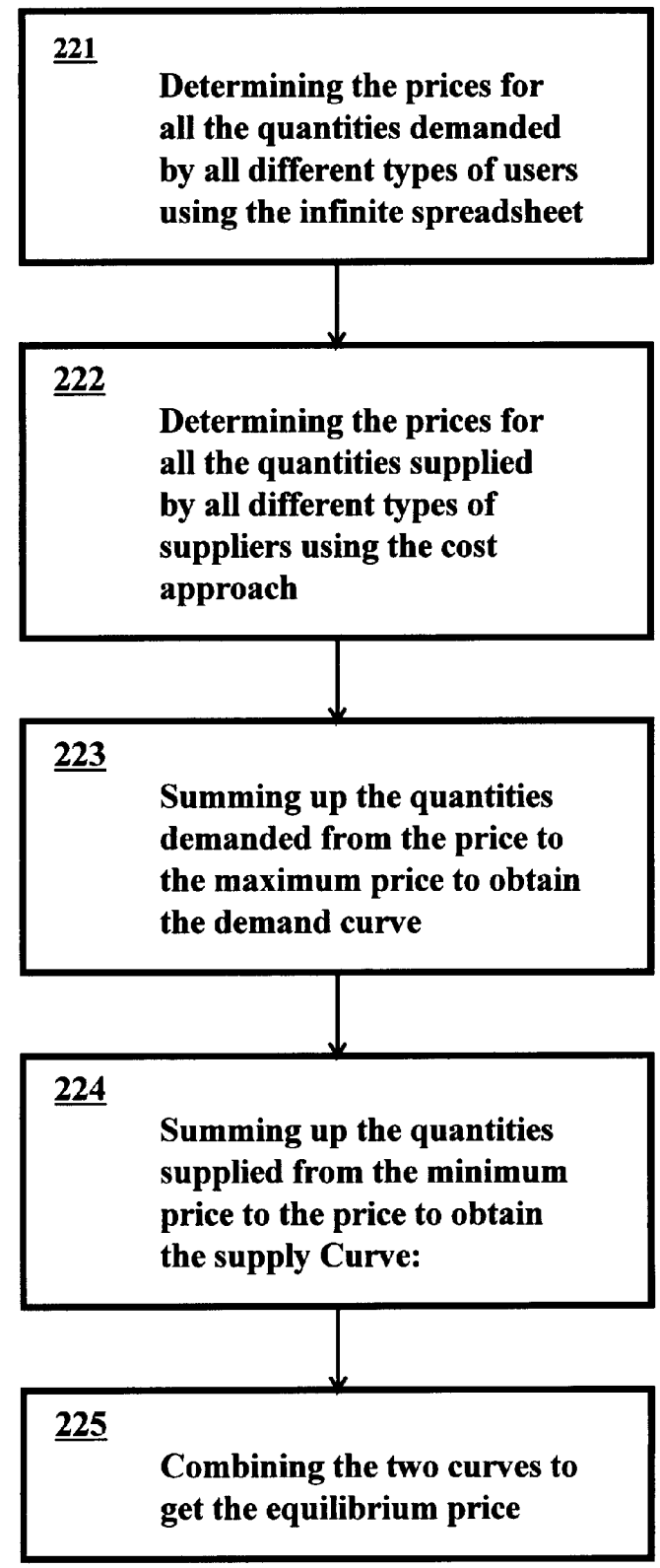
FIG. 22 is a flow diagram for the quantitative supply and demand model showing the deterministic process for determining graphically a uniform price for all the functionally similar commodities.

FIG. 22 shows that the deterministic method merges with the general economic equilibrium analysis at the level of the supply and demand model. The deterministic method starts from the temporal consideration of one commodity, and the general economic equilibrium analysis emphasizes the spatial dependence of all the commodities. The deterministic method can be used to calculate the number of willing buyers and sellers, or of transactions, to determine the quantity q at a price p. The demand curve is then the integral from p to a p-maximum of q dp resulting generally in a decreasing function, and the supply curve, from p-minimum to p resulting generally in an increasing function.

FIG. 22 summarizes the procedure for determining quantitatively and deterministically a uniform price for all the functionally similar commodities of goods and services. The infinite spreadsheet is designed to solve for the price of a single unique commodity. FIG. 22 extends the infinite spreadsheet for single commodity to the supply and demand model for multiple commodities.

The supply and demand model of current economics generally can only produce qualitative results. The most famous of these results is the condition for general economic equilibrium. The deterministic method of this invention derives deterministically a quantitative supply and demand model, which can produce quantitative price.

In the case of multiple commodities, which are all functionally similar, there is a need to determine a uniform price. The commodities are supplied to the market at various costs to the suppliers due to, for example, efficiency of manufacturing process, and are demanded by the market by different types of users who with different expected rate of returns are willing to pay different prices. The market will arrive at a uniform price based on the expected supply and the demand at various prices of the commodities.

In FIG. 22 the steps in arriving at a uniform price are described:

(1) Determining the prices for all the quantities demanded by all different types of users using the infinite spreadsheet of FIG. 9.

(2) Determining the prices for all the quantities supplied by all different types of suppliers using the method outlined in FIG. 20. A novel feature in the determination of the price for quantities supplied is that the preassigned inputs for price determination in FIG. 20 are fixed for any given amount of commodities for the determination of the price for the supplier. The inputs form a fixed set of values corresponding to a certain quantity of products. For example, if a supplier has one set of inputs for one batch of commodities and another set for a second batch, the supplier should use the first set of inputs to calculate the price for the first batch of commodity, and the second set, for the second batch. The two sets should not be mixed, even for the same supplier.

(3) Summing up the quantities demanded from the PRICE=P to PRICE=P-maximum to obtain the demand curve:

QUANTITIES demanded at PRICE(P)=SUM of all QUANTITIES from P to P-maximum.

Figure 24:
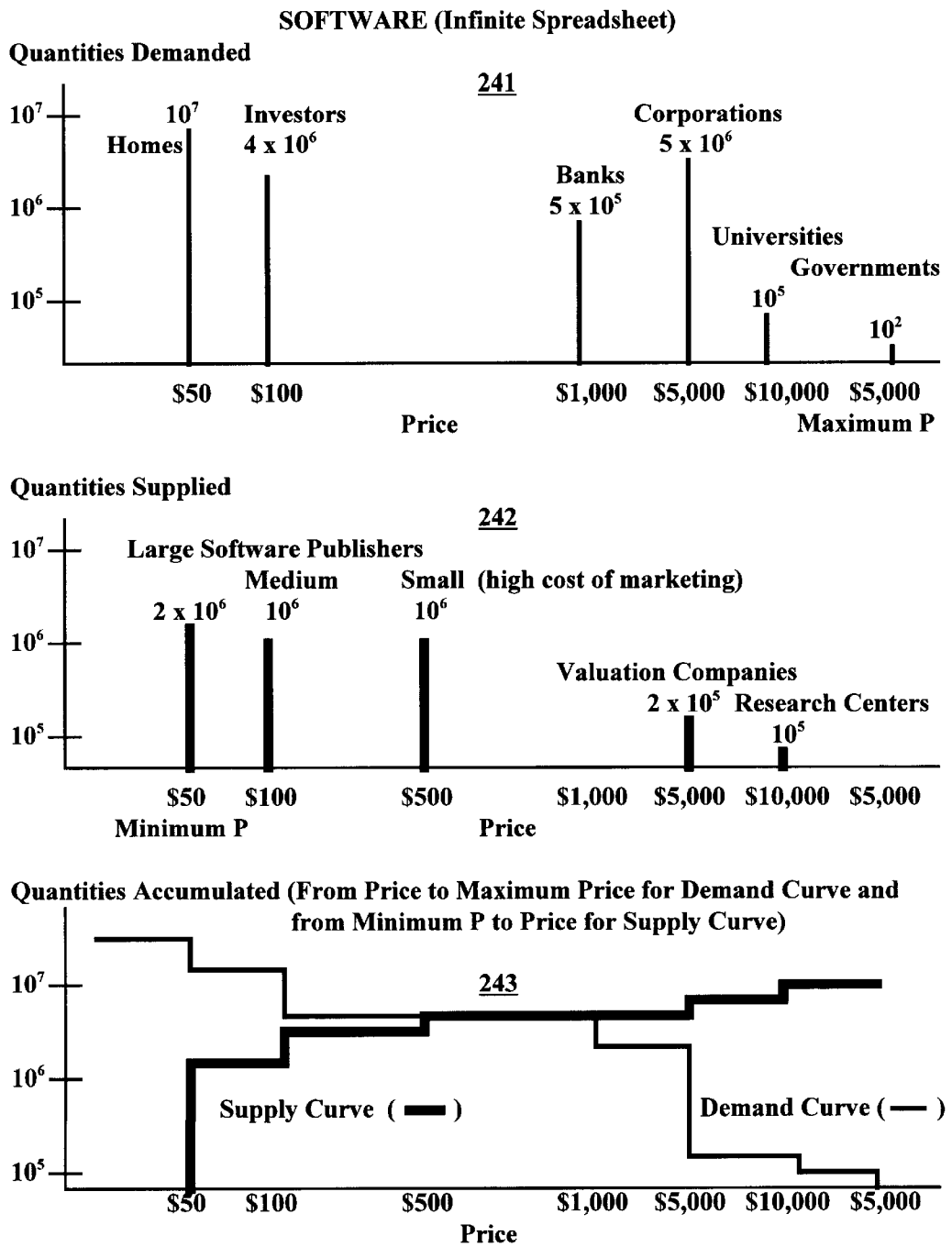
FIG. 24 is an illustration of the quantitative supply and demand model of FIG. 22 by a rough sketch of the price determination for multiple-commodity software packages with the same price.
Figure 25:
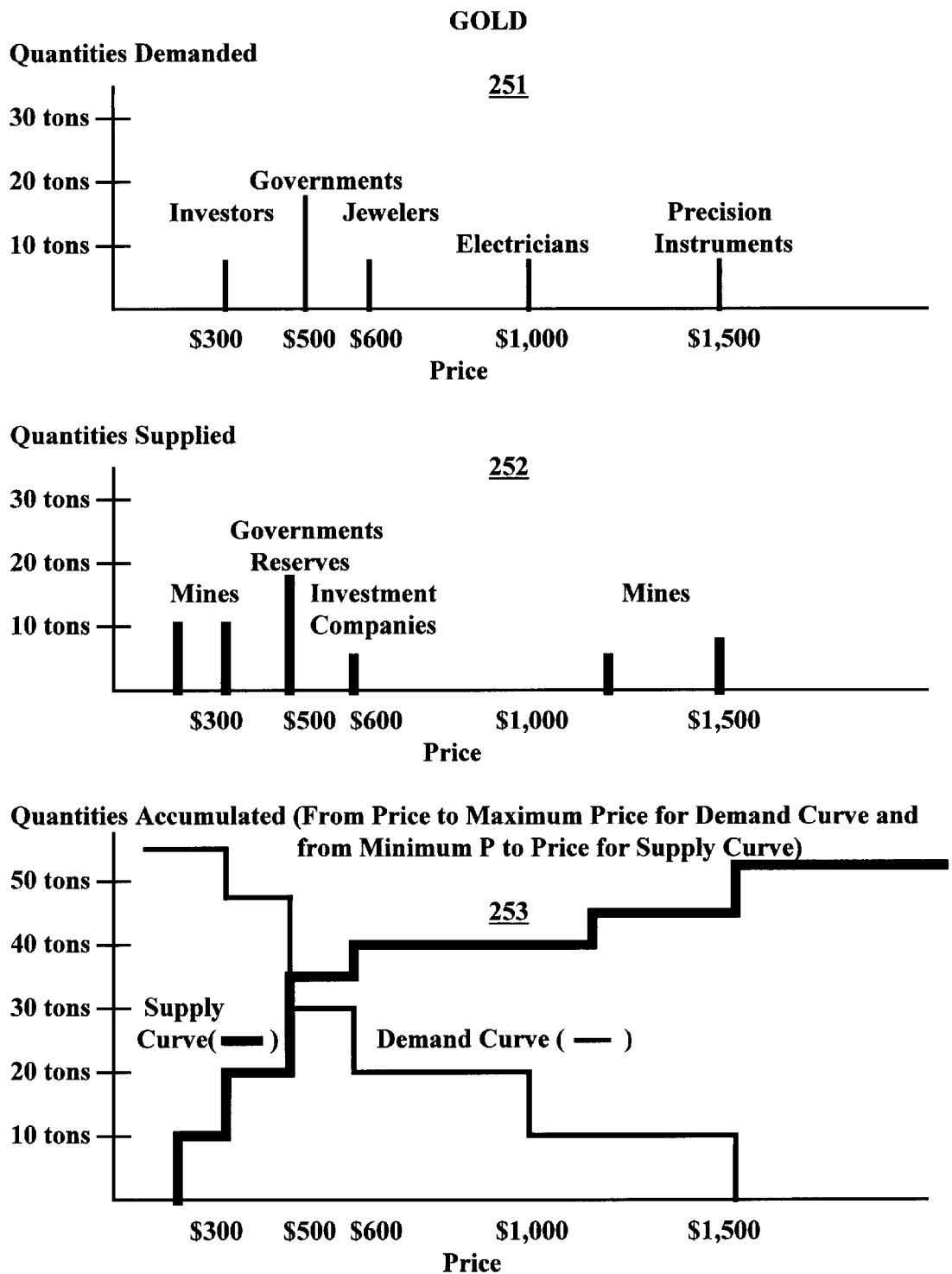
FIG. 25 is an illustration of the quantitative supply and demand model of FIG. 22 by a rough sketch of the price determination for multiple-commodity gold.
Figure 26:
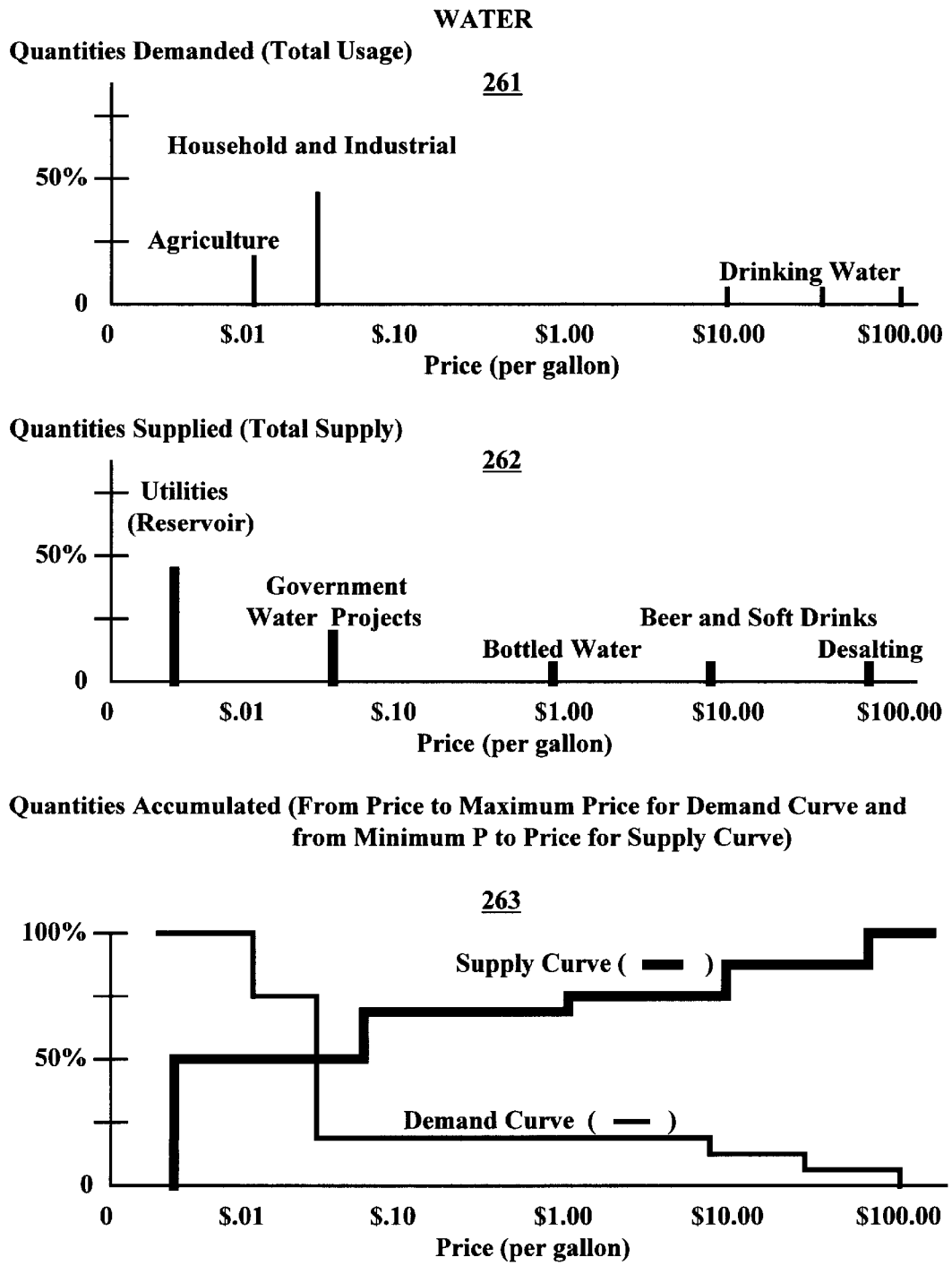
FIG. 26 is an illustration of the quantitative supply and demand model of FIG. 22 by a rough sketch of the price determination for multiple-commodity water.

(4) Summing up the quantities supplied from PRICE=P-minimum to the PRICE=P to obtain the supply Curve:

QUANTITIES supplied at PRICE(P)=SUM of all QUANTITIES from P-minimum to P (5) Plotting the two curves onto one graph to get PRICE from their intersection as in the examples shown in graph 243, 253, 265, and 273 of FIGS. 24, 25, 26, respectively and 27, respectively the last of which is a one unique commodity situation and is used to show the consistency of the infinite spreadsheet and the quantitative supply and demand model.

Figure 27:
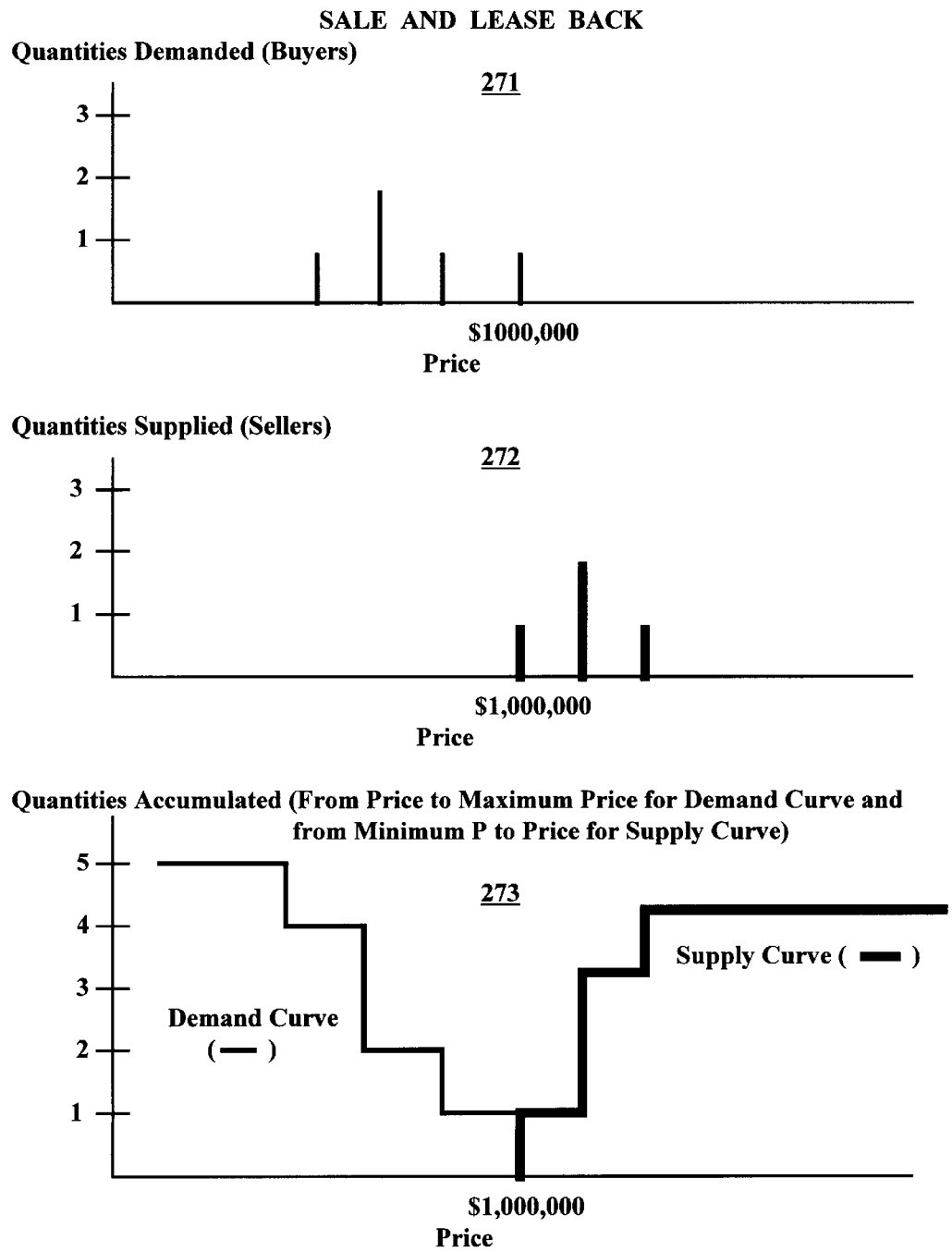
FIG. 27 is an illustration of the quantitative supply and demand model of FIG. 22 by a rough sketch of the price determination for the special single-commodity case of the sale and lease back of FIGS. 15, 16, 17, 18, 19, and 21 representing a unique commodity exemplifying the conceptual similarity between the single and the multiple-commodity situations.

Conceptually, in the deterministic method for a single unique commodity as shown in FIG. 27, a seller and a buyer of the one quantity signify two points representing two prices. A transaction is possible when the two points meet. The deterministic method for unique commodities is actually a special case of the general supply and demand model for multiple commodities. In the supply and demand model, all the quantities of functionally similar commodities must be simultaneously considered. The limited number of points from the single unique commodity of the deterministic model is then turning into the two curves representing the entire market for the commodity in the supply and demand model. A uniform price is determined when the two curves meet over a range or at a point.

FIG. 23 is intended to give a rough idea of how FIG. 24 is constructed. Due to the enormous amount of survey data needed to construct the supply and demand curves, no attempt has been made to make the description and the values exact in FIGS. 23, 24, and later 25, 26, and 27.

For the demand curve for software in FIG. 24, block 231 in FIG. 23 shows that the primary demand factors are:

(1) Population
(2) Income
(3) Education.

There are generally two types of buyers: those switching from manual to computerization and those from old to new versions of software. The first group of buyers derive the inputs for the deterministic method using the following guidelines:

Income=Hour of work saved per year×$ per hour.

Examples of time saved typically are:

Spreadsheet: 90% time saved over manual process

Mathematics, Engineering, and Science: 95% time saved

Word processor: 50% time saved

Accounting Data Management: 30% time saved.

The contributions to the initial and the future expenses are:

Initial hardware cost

Learning Curve

Maintenance

Obsolescence.

The type of buyers who are updating from old to new versions of software generally derives less benefits are those who are computerizing for the first time. However, the learning curve should be much less than the first time, and the software developer will incur smaller cost than that required to develop the software the first time. The benefits and the expenses are:

Income=Speed increases in hours/year×$ per hour

Reduction of learning curve

Reduction of maintenance expenses

Reduction of Obsolescence.

Expenses contributions are from:

Additional hardware cost

Additional learning Curve

Additional maintenance

Additional obsolescence.

The supply curve is far easier to obtain conceptually than the demand curve because it does not generally involve infinity. In block 232 in FIG. 23, a list of the cost factors is given:

Quantities of commodities

Economy of scale

Software Metrics

Technology

Efficiency in manufacturing

Cost of raw materials

Transportation

Labor cost

Marketing cost

Packaging

Documentation.

The supply curve also involves the population, the incomes of the population, and the overall education level of the population, in addition to the above factors.

FIG. 24 is an illustration of the quantitative supply and demand model of FIG. 22 by a rough sketch of the price determination for multiple-commodity software packages with the same price.

Based on FIG. 23, the demand curve of graph 241 of FIG. 24 is derived quantitatively from the following rough estimations using the deterministic method. In graph A, 5% of the 200,000,000 total computer owners and/or users will buy the current invention in a software package if the price is $50, which is determined by the determined method.

The inputs to the deterministic method are $10 per hour and 10 hours per year for the income input, and $10 per hour and 25 hours for the initial learning period as the one-time initial expense. The other income and expense contributions are assumed to be negligible. The price comes out to be approximately $50; the exact calculated price by the infinite spreadsheet is $53.

For the $100 buyers in graph 241, the number of hours involved is twice as high, and, therefore, the price is also twice as high. Banks and corporations would use the valuation system far more frequently than the investors with additional benefits from the accuracy of the deterministic calculation.

The researchers in universities should be willing to obtain the novel software at a price within their funding limits. The government usually buys if there is a need. All the price determinations for the demand curve involve infinity in time.

The supply curve of graph 242 of FIG. 24 does not involve infinity. For a large software publisher, which has the advantage of large scale of production, the market cost, which is the bulk of the expenses, is minimal. For a negligible license fee for the software, large software publishers should be able to sell the valuation software package for $40, which is mainly for packaging and marketing, and still make a 100% rate of return on investment. The cost of manufacturing should be divided by the total quantities manufactured to arrive at cost per unit. The exact calculation should be done using the cost approach outlined in FIG. 20.

Other quantities for the supply curve are estimated in the similar fashion as the above determination. In actual practice, the consideration of the spatial infinity should be thorough. However, since the population is finite, there is generally no need to involve infinite space, except in concept.

When the supply and the demand curves are summed according to the procedures outlined in FIG. 22 and plotted on the same graph as in graph 243 of FIG. 24, the deterministic price is shown to be from $500 to $1,000. The fact that for just a rough estimation this resulting price is close to the realistic situation implies that the quantitative supply and demand model could produce useful results in practice.

FIG. 25 is an illustration of the quantitative supply and demand model of FIG. 22 by a rough sketch of the price determination for multiple-commodity gold. FIG. 26 is an illustration of the quantitative supply and demand model of FIG. 22 by a rough sketch of the price determination for multiple-commodity water.

The reason for using gold in FIG. 25 and water in FIG. 26 as examples is to demonstrate the versatility of the newly invented quantitative supply and demand model. FIGS. 25 and 26 offer plausible justification for the realistic prices for gold and water in a approximate but quantitative way. One of the most useful applications of the quantitative supply and demand model is in the area of agricultural products. Due to the complexity involved in the price determination of agricultural products, it is not attempted here.

FIG. 27 shows the sale and lease back and real estate development project described in detail in FIGS. 15, 16, 17, 18, 19, and 21. The number of quantities involved is far smaller that those in FIGS. 24, 25, and 26. Therefore, there is no need to survey the entire population or market. In FIG. 27, the highest bidder in graph 271 of the demand curve and the most efficient builder in graph 272 meet in graph 273 at the price of $1,000,000. FIG. 27 exemplifies the conceptual similarity between the single and the multiple-commodity situations.

From the infinite spreadsheet and the quantitative supply and demand model, which is derived based on the infinite spreadsheet, it appears that post-scientific social science is quantitative in nature. In contrast to the precise nature of the calculations in physical science, the deterministic method of price determination only requires estimated, but reasonable, inputs, and approximate, equivalent time-invariant variables. The inputs only need to be within reasonable ranges, but they must be quantitative. In conclusion, while physical science is precise, post-scientific social science is quantitative. And, while physical science allows us to control the physical world, post-scientific social science will make us into rational human beings.

Figure 29:
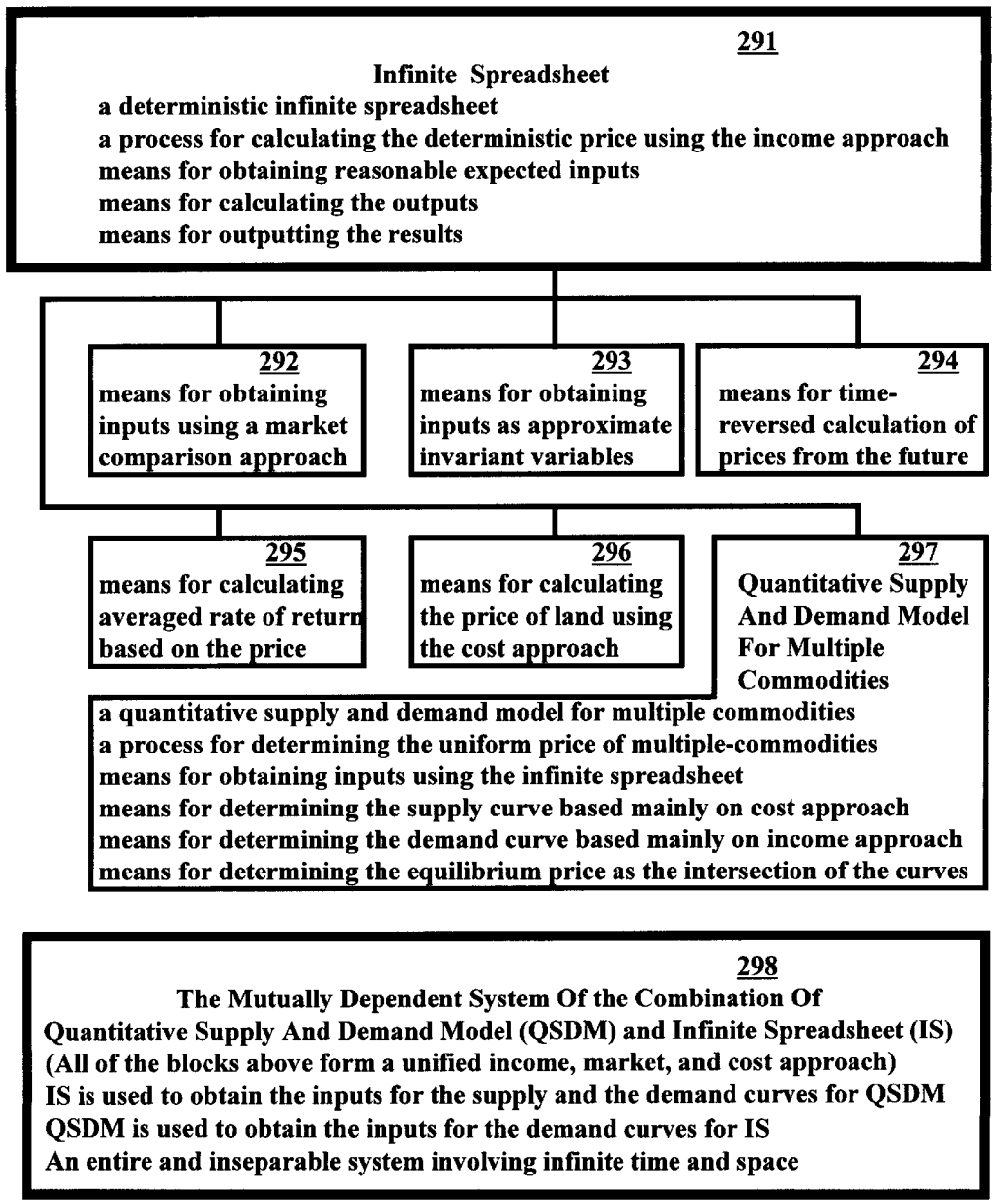
FIG. 29 is intended as an illustration of a novel contribution to patent writing by a graphic representation of all the claims on a map.

FIG. 28 is a knowledge map based on a knowledge tree for this invention to be read roughly from top down and left to right for increasing figure numbers, except FIG. 29 which summarizes the claims of the invention. It also shows that the single-commodity calculation, exemplified by the unified method of real estate appraisal in FIG. 9 and the quantitative supply and demand model FIG. 22 together form the complete deterministic method for price determination of the present invention. Major drawings are enclosed in dark boxes with the word FIGURE unabbreviated.

The top of FIG. 28 shows that our detectable universe consists of the material world and knowledge. Knowledge progresses from pre-scientific knowledge to scientific knowledge and then to post-scientific knowledge, in which the current invention belongs. In post-scientific knowledge, physical science becomes a part of social science, and social science, a part of life science. In the previous patent application on a completely automated software system, "Completely Automated And Self-generating Software System," it was concluded that completely automated systems belong to post-scientific life science, which has its essence in DNA—a permanent software and possibly the accumulated wisdom of the universe.

FIG. 28 also serves as an epilogue for this invention. It points out the misconception in the scientific method and the fallacy of the idea of objectivity. The deterministic solution to price cannot be solved by the scientific method, which relies on the concept of empirical verification. On the other hand, all the problems in physical science are solvable by the method of post-scientific social science, which deals with the expected future. Physical science is really also dealing with the expected future, but, because of the finite duration of it phenomena, empirical verification has been misconstrued as its standard of acceptance.

The correct and general interpretation of the method of post-scientific knowledge is that if the expected future becomes the expected past, the knowledge has not yet been disapproved. It holds true for both physical and social sciences. The requirement for solution in post-scientific knowledge is, therefore, to make the best future expectations which will match the expected past. The evolutionary history in post-scientific life science is probably the best example of expected past. And only the creators know the expected future, which they have designed. Dealing with the expected space, the post-scientific method makes it unnecessary to appeal to the law of uniformity, which is the idea that what happens in the past will happen in the future and can never be empirically verified.

One of the central theoretical discoveries in this invention is the concept of expected past. If the expected future is fulfilled, it becomes the expected past. The past data in physical science can be considered both as actual past data and expected past data. The preoccupation of physical science with the past is actually a misconception. As shown in this invention, most unfulfilled past social phenomena are unexpected past data and are generally useless information. Physical science and social science are concerned with future expectations and finite past expectations. However, faulty designs in life science or in completely automated computer systems need to be traced back to their origin, which could occur in the infinite past.

Another misconception in the scientific method concerns the use of models and abstractions to describe partial reality. Physical science deals with partial solutions and its problems can usually be described by several variables. The problem in physical science can be greatly distorted by abstractions in order, for example, to obtain an elegant analytic solution or to make the problem easy to understand. These are not always good habits when computers can be exact calculations and should not always be copied in social science. Having to solve problems in their entirety, social science involves an order of magnitude more variables than those of physical science and must formulate problems according to the realistic situation in order to make sure that all the variables have been accounted for.

FIG. 28 divides knowledge into pre-scientific, scientific, and post-scientific knowledge. What is meant by objectivity today is simply that an idea conforms to the scientific method. Objectivity from the point of view of physical science is different and generally inferior to that from those of social or life science. For example, the correctness of price can never be empirically verified, and DNA is basically permanent information, which has little bearing on the materialistic interpretations of the universe by physical science. DNA, as a permanent creation undergoing evolutionary changes, does not stay constant for empirical verification.

Furthermore, social science may appear important to a culture dominated by physical science. It can be used to determine the value of the temporary creations of physical science, which generally have finite values. However, the usefulness of social science with its ability to consider phenomena of infinite duration will not be fully realized until it is used to value permanent creations, especially permanent software or knowledge stored in a permanent format. Permanent creations, such as permanent software and DNA, should be infinitely more valuable than temporary creations. Thus, post-scientific life science will change our perceptions of physical and social sciences.

Life science with nearly unlimited and virtually unrestricted complexity is willing to settle for any qualitative workable results. Thus, life science might be mainly qualitative in nature. As shown in this invention, social science is quantitative in nature. Only the simple physical science can claim exact solution. It appears that the product of complexity and accuracy could be a sort of invariance.

Of all the drawings to help readers understand the patent, what is really needed is a pictorial outline of the complex maze of the claim section. The outline should especially show the seemingly redundant interplay of all the claims. FIG. 29 shows a map of the claims and illustrates this novel suggestion in patent writing. It should also be helpful to the inventor(s) in planning and structuring the claims in graphical form before the inventor(s) describes the claims in words. It should be very helpful to the examiners, who are new to the ideas in the invention.

In FIG. 29, blocks 291 to 298 are the claims for the infinite spreadsheet and the mutually dependent system of the combination of the quantitative supply and demand model and the infinite spreadsheet. The map has simplified considerably the organization of the claims and has reduced appreciably their number.

There does not seem to be any patented prior art devices for price determination. The novel design specifications of this device not only enable the deterministic calculation of price, but also greatly simplify the construction of such a device for price determination. It appears that this device and the objects which it tries to achieve are completely original and novel.

It should be apparent from the foregoing description of the invention, in its form of a device for price determination, that it will fulfill all the objects attributable thereto, and the invention shall not be limited to the present model or to the sole determination of price. The invention could be of a mechanical, chemical as well as an electrical device. While the preferred embodiments of the invention have been illustrated and described, it is to be understood that the actual apparatus is not limited to the precise construction herein disclosed and the right is reserved to all changes and modifications coming within the scope of this completely novel invention as defined by the appended claims.

What is claimed is:

1. A process for determining a real estate or business price using an infinite spreadsheet involving a plurality of buyers each occupying a finite duration (investment period) on said infinite spreadsheet and each having a price and a resale price for each finite duration, the process comprising the steps of:
   a) Choosing a set of initial input values of financial factors in the determination of the price of the real estate or business for the determination of the cash investment return, which is equal to the cash flows plus the cash from resale;
   b) Projecting the net income to the last or Tth year where T is finite and an integer multiple of a constant investment period or equals the sum of all the distinct investment periods represented by $t_1, t_2, t_3, \ldots, t_{n-1}, t_n$;
   c) Finding the final price at the Tth year by an iterative process described in f) to k) below using inputs derived from an equivalent stable financial condition, in which the resale price increases at the same rate as the net income, which increases at a constant rate to infinity in time;
   d) Projecting the net income from the last or Tth to $(T+t_{n+1})$th year;
   e) Determining the ratio of the price (price at T) and the resale price (price at $T+t_{n+1}$) of the investment period from T to $T+t_{n+1}$ from the ratio of the net income at T and the net income at $T+t_{n+1}$;
   f) Picking a trial price for the Fth year and determining the trial resale price (price at $T+t_{n+1}$) as the trial price multiplied by the ratio of the net income at T and the net income at $T+t_{n+1}$;
   g) Projecting the cash flows and the sum of cash flows from the trial price, projected income, expenses, and other financial factors from the last or Tth to $(T+t_{n+1})$th year;
   h) Determining the last year cash from resale using the resale price;
   i) Adding the cash from resale to the sum of cash flows from g);
   j) Checking if the calculated average rate of return on investment, which is determined from the cash flows based on the price and the cash from resale based on the resale price is within a pre-assigned accuracy of the expected average rate of return on investment;
   k) Repeating f) to j) if j) does not check, until j) does check thus indicating a correct price for the Tth year;
   l) Using the price of the real estate or business found in k) as the resale price in the determination of the price for the $(T-t_n)$th year where $t_n$ is the investment period from the $(T-t_n)$th to the Tth year;
   m) Advancing backwards in time by repeating f) to l) for the $(T-t_n-t_{n-1})$th and all prior years to find all resale prices;
   n) Determining the present price of the real estate or business as the final iteration of step k) when the sum of all the investment periods $t_1+t_2+t_3+ \ldots +t_{n-1}+t_n=T$.

* * * * *